US007660226B2

(12) United States Patent
Ogata

(10) Patent No.: US 7,660,226 B2
(45) Date of Patent: Feb. 9, 2010

(54) OPTICAL SYSTEM, OPTICAL PICKUP APPARATUS, AND OPTICAL DISK APPARATUS

(75) Inventor: Tetsuya Ogata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 596 days.

(21) Appl. No.: 10/593,409

(22) PCT Filed: Mar. 2, 2006

(86) PCT No.: PCT/JP2006/304516

§ 371 (c)(1),
(2), (4) Date: Sep. 19, 2006

(87) PCT Pub. No.: WO2006/093326

PCT Pub. Date: Sep. 8, 2006

(65) Prior Publication Data

US 2008/0247298 A1    Oct. 9, 2008

(30) Foreign Application Priority Data

| Mar. 2, 2005 | (JP) | 2005-056976 |
| Mar. 14, 2005 | (JP) | 2005-070366 |
| Mar. 15, 2005 | (JP) | 2005-074031 |
| Mar. 31, 2005 | (JP) | 2005-103441 |
| May 9, 2005 | (JP) | 2005-135509 |
| Aug. 30, 2005 | (JP) | 2005-248548 |

(51) Int. Cl.
*G11B 7/00* (2006.01)
(52) U.S. Cl. .............. 369/112.18; 369/112.29
(58) Field of Classification Search ............ None
See application file for complete search history.

(56) References Cited

U.S. PATENT DOCUMENTS

| 5,414,451 | A | 5/1995 | Sugiyama et al. |
| 6,154,433 | A * | 11/2000 | Hoshino et al. ........ 369/112.04 |
| 2002/0070328 | A1 | 6/2002 | Kimura et al. |
| 2003/0214898 | A1 | 11/2003 | Ogata et al. |
| 2003/0223345 | A1* | 12/2003 | Uno et al. .............. 369/112.16 |
| 2004/0165518 | A1* | 8/2004 | Horimai et al. ............... 369/94 |
| 2004/0213109 | A1 | 10/2004 | Ogata et al. |

(Continued)

FOREIGN PATENT DOCUMENTS

JP     8-185640 A    7/1996

(Continued)

OTHER PUBLICATIONS

Shintani T et al, "Analyses for Design and Disks for Dual-layer Phase Change Optical Disks", Optical Data Storage Topical meeting 2003 Technical Digest, 2003.

*Primary Examiner*—Paul Huber
(74) *Attorney, Agent, or Firm*—Dickstein Shapiro LLP

(57) ABSTRACT

The present invention discloses an optical system for extracting signal light components from a beam including the signal light components and stray light components. The optical system includes a condensing optical element situated on an optical path of the beam for condensing the beam, a polarization changing unit for changing the state of polarization of at least one of the signal light components and the stray light components included in the incident beam transmitted through the condensing optical element, and an extracting element for extracting the signal light components included in the beam transmitted through the polarization changing unit.

10 Claims, 58 Drawing Sheets

U.S. PATENT DOCUMENTS

| | | |
|---|---|---|
| 2005/0122879 A1 | 6/2005 | Hirai et al. |
| 2005/0174918 A1 | 8/2005 | Ogata |
| 2005/0201248 A1 | 9/2005 | Kitabayashi et al. |

FOREIGN PATENT DOCUMENTS

| | | |
|---|---|---|
| JP | 2624255 B2 | 4/1997 |
| JP | 2000-163795 A | 6/2000 |
| JP | 2002-251768 A | 9/2000 |
| JP | 2001-273640 A | 10/2001 |
| JP | 2002-367211 A | 12/2002 |
| JP | 2003-323736 A | 11/2003 |
| WO | WO-2005/078714 A1 | 8/2005 |

* cited by examiner

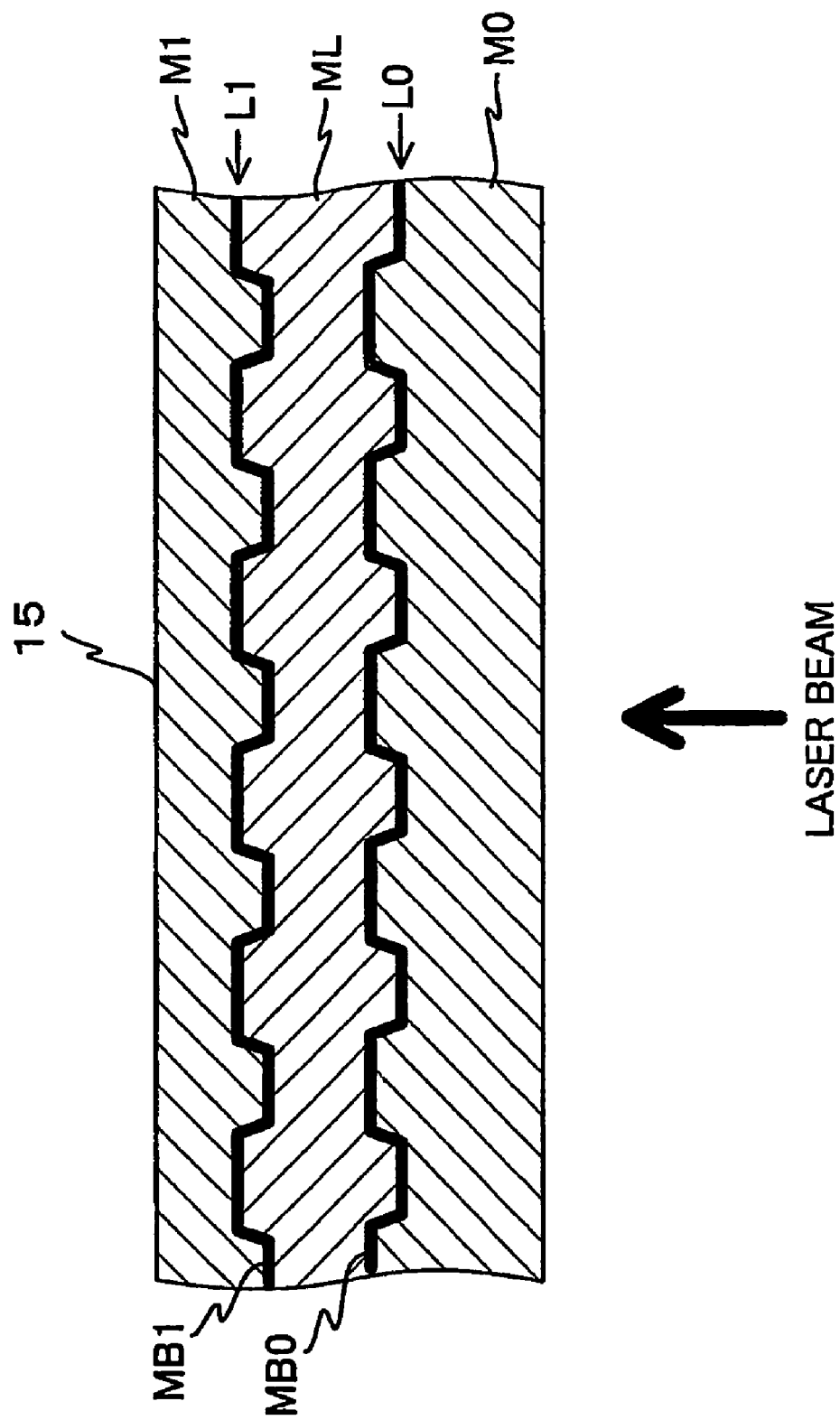

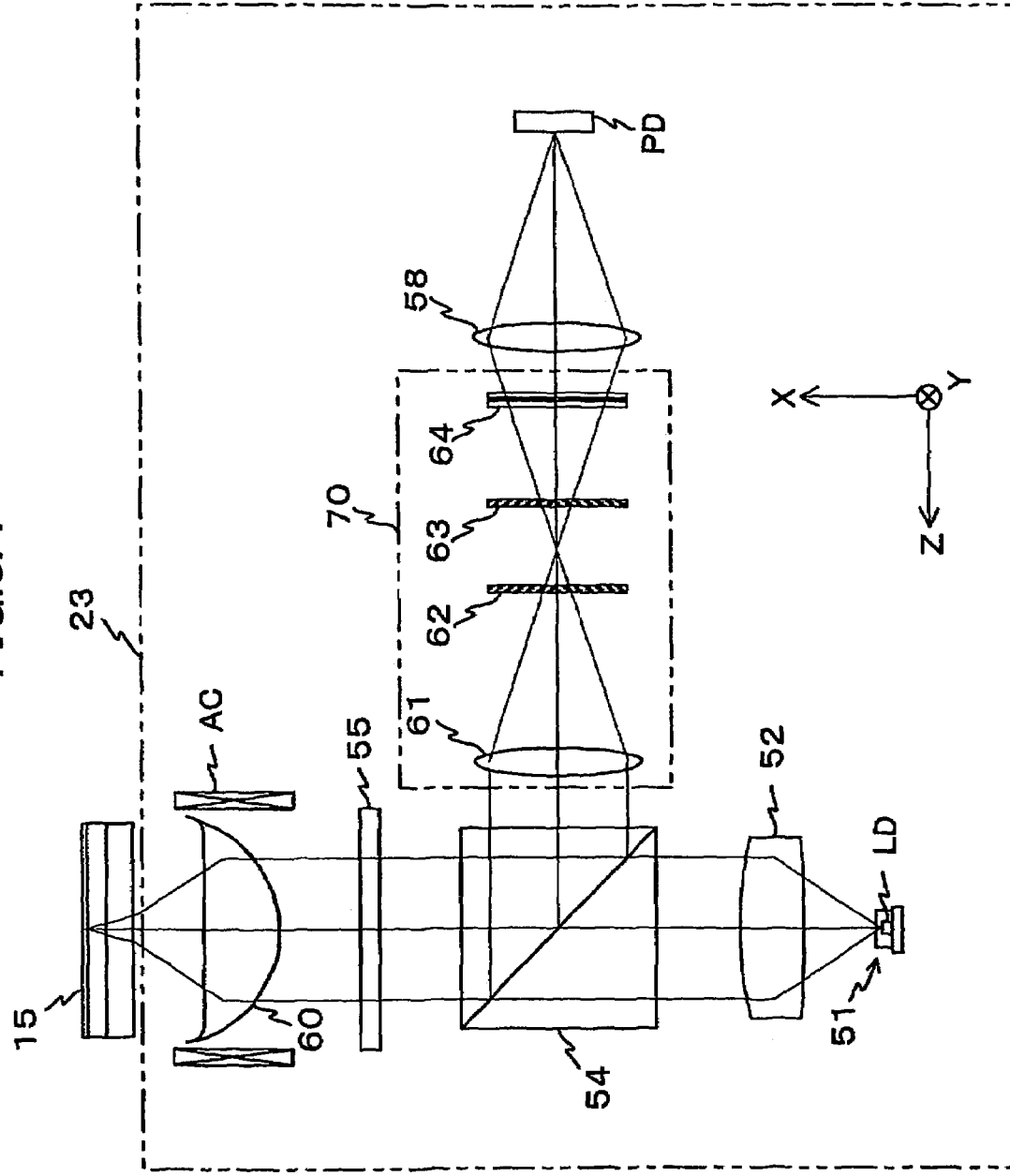

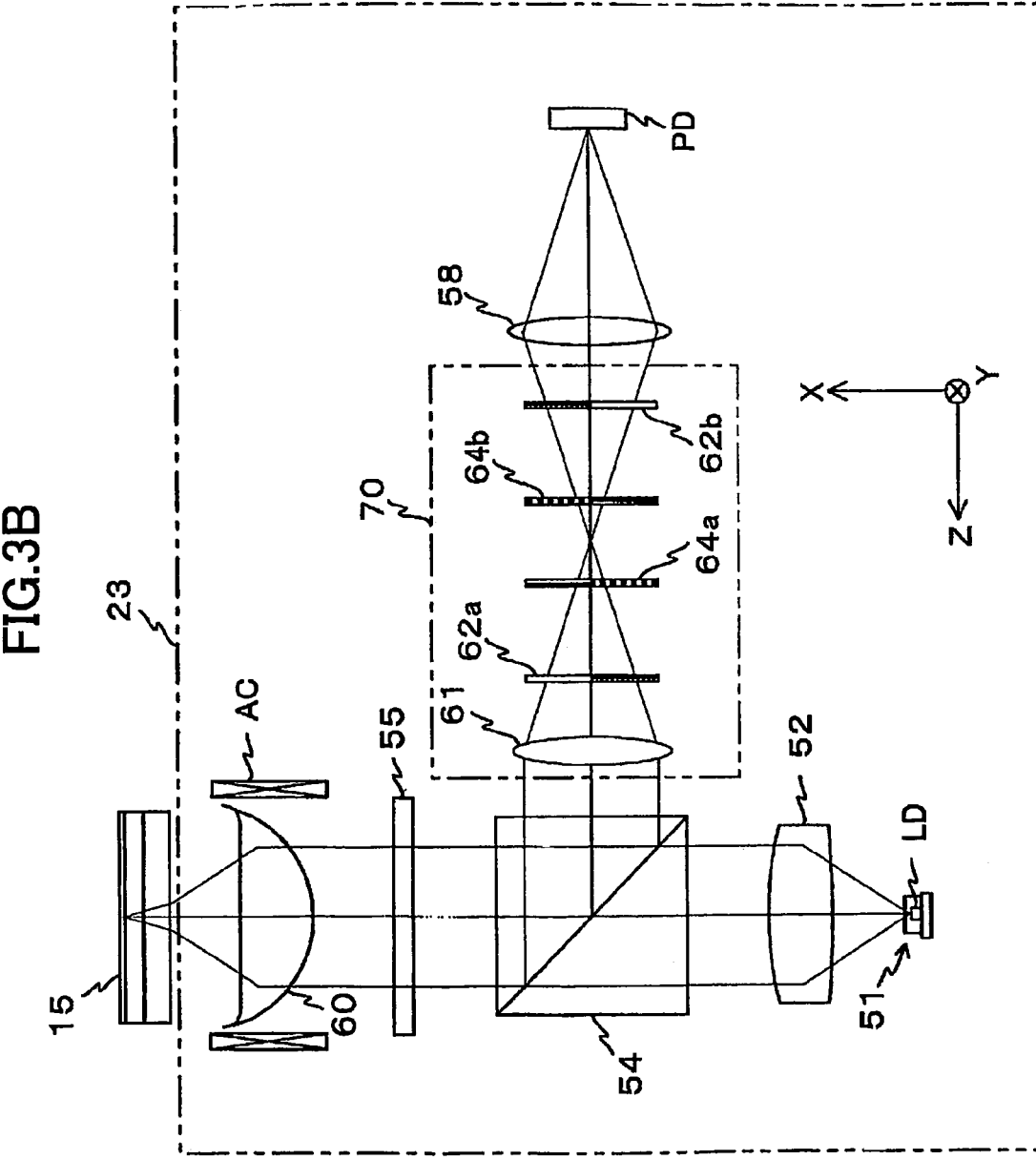

※K2<K1

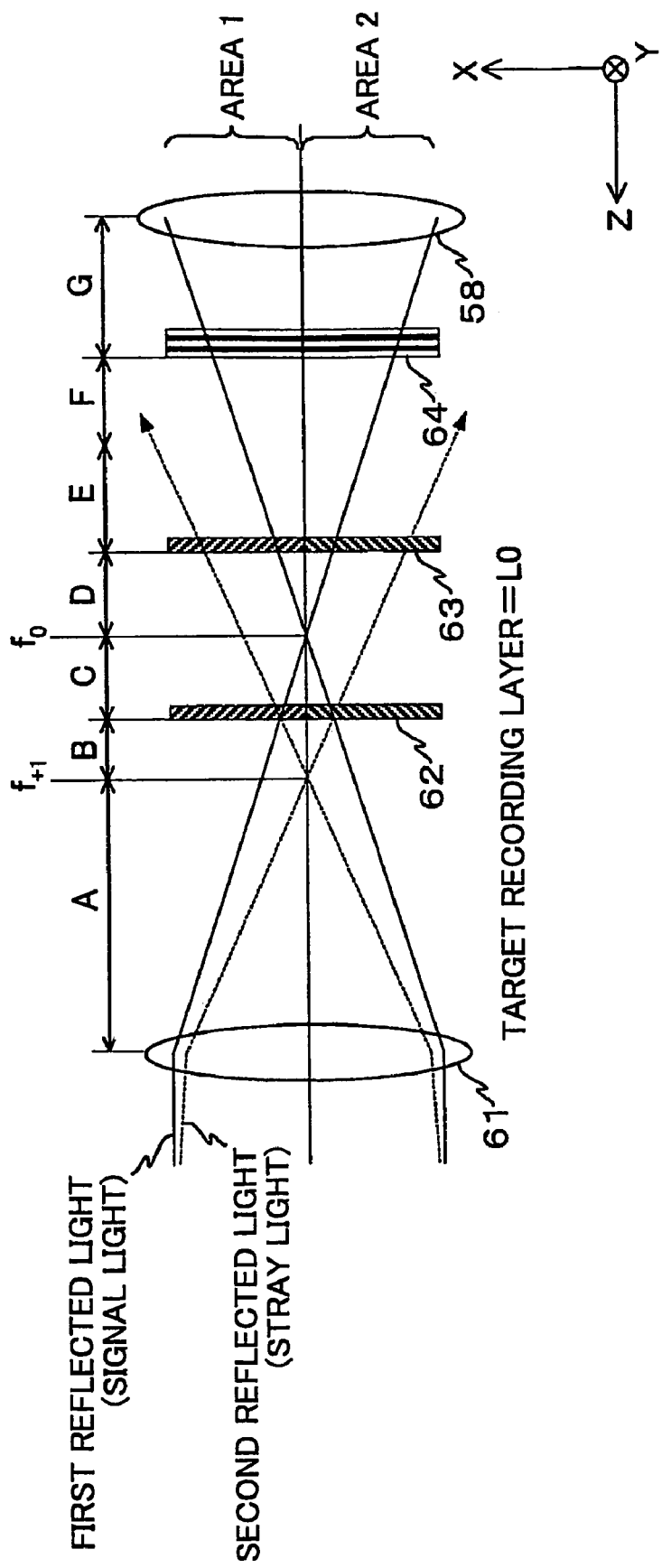

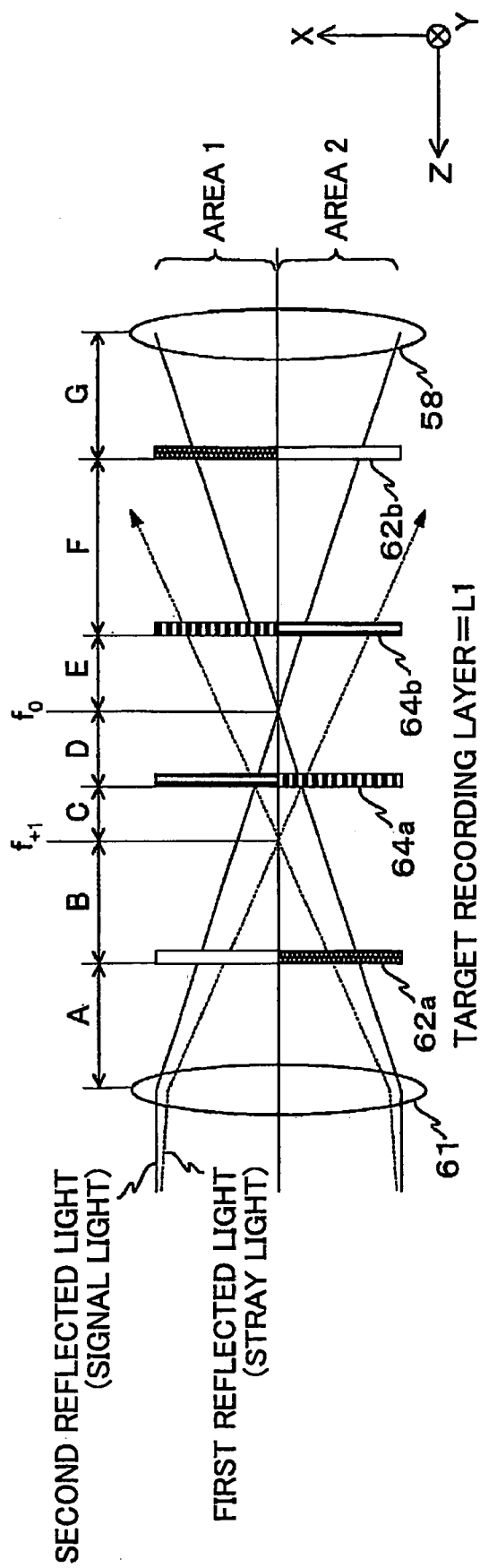

FIG.8A

| TARGET RECORDING LAYER | BEAM | | A | B | C | D | E | F | G |
|---|---|---|---|---|---|---|---|---|---|
| | | | | | | OPTICAL PATH | | | |
| FIRST RECORDING LAYER | FIRST REFLECTED LIGHT (SIGNAL LIGHT) | AREA 1 | S | S | R | L | S | S | S |
| | | AREA 2 | S | S | L | R | S | S | S |
| | SECOND REFLECTED LIGHT (STRAY LIGHT) | AREA 1 | S | S | R | R | P | P | — |
| | | AREA 2 | S | S | L | L | P | P | — |
| SECOND RECORDING LAYER | FIRST REFLECTED LIGHT (STRAY LIGHT) | AREA 1 | S | S | R | R | P | P | — |
| | | AREA 2 | S | S | L | L | P | P | — |
| | SECOND REFLECTED LIGHT (SIGNAL LIGHT) | AREA 1 | S | S | R | L | S | S | S |
| | | AREA 2 | S | S | L | R | S | S | S |

FIG.8B

| TARGET RECORDING LAYER | BEAM | | OPTICAL PATH | | | | | | | |
|---|---|---|---|---|---|---|---|---|---|---|
| | | | A | B | C | D | E | F | G |
| FIRST RECORDING LAYER | FIRST REFLECTED LIGHT (SIGNAL LIGHT) | AREA 1 | S | S | S | S | P | P | S |
| | | AREA 2 | S | P | P | P | S | S | S |
| | SECOND REFLECTED LIGHT (STRAY LIGHT) | AREA 1 | S | S | S | S | S | — | — |
| | | AREA 2 | S | P | P | P | P | — | — |
| SECOND RECORDING LAYER | FIRST REFLECTED LIGHT (STRAY LIGHT) | AREA 1 | S | S | S | — | — | — | — |
| | | AREA 2 | S | P | S | — | — | — | — |
| | SECOND REFLECTED LIGHT (SIGNAL LIGHT) | AREA 1 | S | S | P | S | P | P | S |
| | | AREA 2 | S | P | P | P | S | S | S |

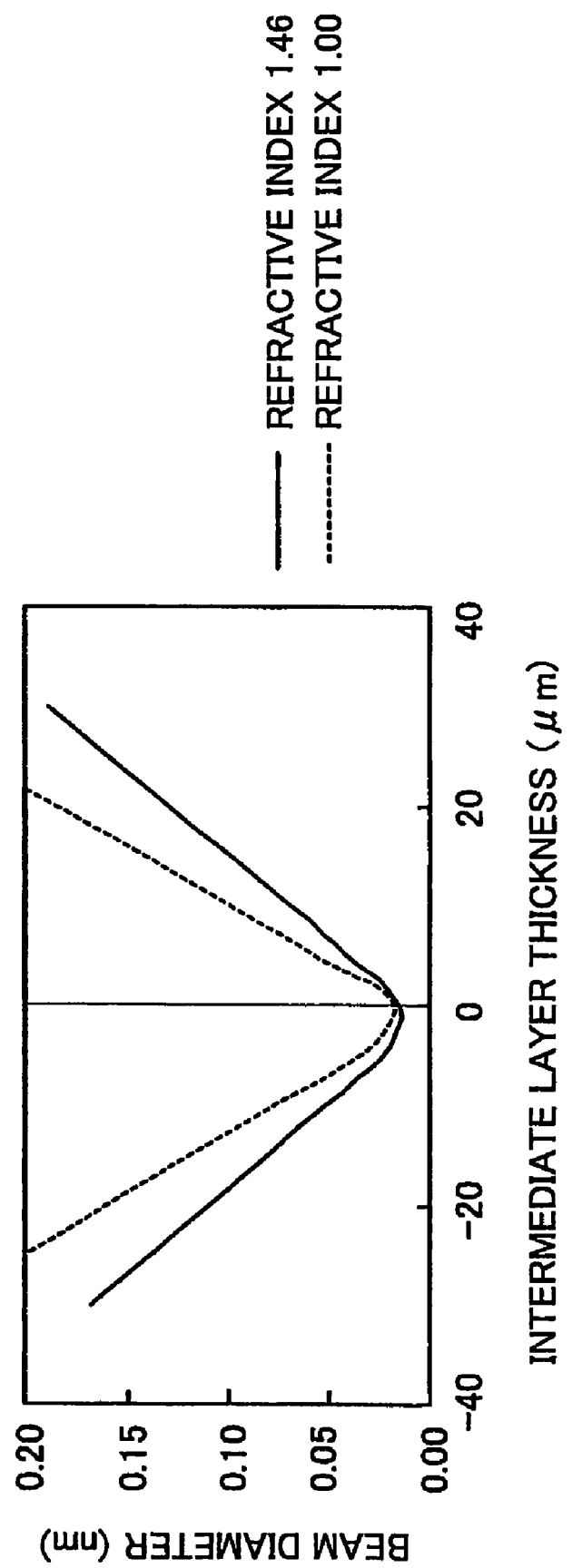

FIG.20

| TARGET RECORDING LAYER | BEAM | | OPTICAL PATH | | | | | | | |
|---|---|---|---|---|---|---|---|---|---|---|
| | | | A | B | C | D | E | F | G |
| FIRST RECORDING LAYER | FIRST REFLECTED LIGHT (SIGNAL LIGHT) | AREA 1 | S | S | R | L | P | P | P |
| | | AREA 2 | S | S | L | R | P | P | P |
| | SECOND REFLECTED LIGHT (STRAY LIGHT) | AREA 1 | S | S | R | R | S | S | – |
| | | AREA 2 | S | S | L | L | S | S | – |
| SECOND RECORDING LAYER | FIRST REFLECTED LIGHT (STRAY LIGHT) | AREA 1 | S | S | R | R | S | S | – |
| | | AREA 2 | S | S | L | L | S | S | – |
| | SECOND REFLECTED LIGHT (SIGNAL LIGHT) | AREA 1 | S | S | R | L | P | P | P |
| | | AREA 2 | S | S | L | R | P | P | P |

FIG.23

| TARGET RECORDING LAYER | BEAM | | OPTICAL PATH | | | | | | | |
|---|---|---|---|---|---|---|---|---|---|---|
| | | | A | B | C | D | E | F | G |
| FIRST RECORDING LAYER | FIRST REFLECTED LIGHT (SIGNAL LIGHT) | AREA 1 | S | S | P | S | S | S | S |
| | | AREA 2 | S | S | S | P | S | S | S |
| | SECOND REFLECTED LIGHT (STRAY LIGHT) | AREA 1 | S | S | P | P | P | P | — |
| | | AREA 2 | S | S | S | P | P | P | — |
| SECOND RECORDING LAYER | FIRST REFLECTED LIGHT (STRAY LIGHT) | AREA 1 | S | S | P | S | P | P | — |
| | | AREA 2 | S | S | P | S | S | S | S |
| | SECOND REFLECTED LIGHT (SIGNAL LIGHT) | AREA 1 | S | S | P | S | S | S | S |
| | | AREA 2 | S | S | S | P | S | S | S |

FIG.24

| TARGET RECORDING LAYER | BEAM | | OPTICAL PATH | | | | | | | |
|---|---|---|---|---|---|---|---|---|---|---|
| | | | A | B | C | D | E | F | G |
| FIRST RECORDING LAYER | FIRST REFLECTED LIGHT (SIGNAL LIGHT) | AREA 1 | S | S | P | S | P | P | P |
| | | AREA 2 | S | S | S | P | P | P | P |
| | SECOND REFLECTED LIGHT (STRAY LIGHT) | AREA 1 | S | S | P | P | S | S | — |
| | | AREA 2 | S | S | S | S | S | S | — |
| SECOND RECORDING LAYER | FIRST REFLECTED LIGHT (STRAY LIGHT) | AREA 1 | S | S | P | S | S | S | — |
| | | AREA 2 | S | S | S | S | S | S | — |
| | SECOND REFLECTED LIGHT (SIGNAL LIGHT) | AREA 1 | S | S | P | S | P | P | P |
| | | AREA 2 | S | S | S | P | P | P | P |

FIG.27

| TARGET RECORDING LAYER | BEAM | | OPTICAL PATH | | | | | | | |
|---|---|---|---|---|---|---|---|---|---|---|
| | | | A | B | C | D | E | F | G |
| FIRST RECORDING LAYER | FIRST REFLECTED LIGHT (SIGNAL LIGHT) | AREA 1 | 0 | 0 | +45 | -45 | 0 | 0 | 0 |
| | | AREA 2 | 0 | 0 | -45 | +45 | 0 | 0 | 0 |
| | SECOND REFLECTED LIGHT (STRAY LIGHT) | AREA 1 | 0 | 0 | +45 | +45 | +90 | +90 | 1 |
| | | AREA 2 | 0 | 0 | -45 | -45 | -90 | -90 | 1 |
| SECOND RECORDING LAYER | FIRST REFLECTED LIGHT (STRAY LIGHT) | AREA 1 | 0 | 0 | +45 | +45 | +90 | -90 | 1 |
| | | AREA 2 | 0 | 0 | -45 | -45 | -90 | +90 | 1 |
| | SECOND REFLECTED LIGHT (SIGNAL LIGHT) | AREA 1 | 0 | 0 | +45 | -45 | 0 | 0 | 0 |
| | | AREA 2 | 0 | 0 | -45 | +45 | 0 | 0 | 0 |

FIG.28

| TARGET RECORDING LAYER | BEAM | | OPTICAL PATH | | | | | | |
|---|---|---|---|---|---|---|---|---|---|
| | | | A | B | C | D | E | F | G |
| FIRST RECORDING LAYER | FIRST REFLECTED LIGHT (SIGNAL LIGHT) | AREA 1 | 0 | 0 | +45 | −45 | −90 | −90 | −90 |
| | | AREA 2 | 0 | 0 | −45 | +45 | +90 | +90 | − |
| | SECOND REFLECTED LIGHT (STRAY LIGHT) | AREA 1 | 0 | 0 | +45 | +45 | 0 | 0 | − |
| | | AREA 2 | 0 | 0 | −45 | −45 | 0 | 0 | − |
| SECOND RECORDING LAYER | FIRST REFLECTED LIGHT (STRAY LIGHT) | AREA 1 | 0 | 0 | +45 | −45 | 0 | 0 | − |
| | | AREA 2 | 0 | 0 | −45 | +45 | 0 | 0 | − |
| | SECOND REFLECTED LIGHT (SIGNAL LIGHT) | AREA 1 | 0 | 0 | +45 | −45 | −90 | −90 | −90 |
| | | AREA 2 | 0 | 0 | −45 | +45 | +90 | +90 | − |

FIG.32

| TARGET RECORDING LAYER | BEAM | | OPTICAL PATH | | | | | | | |
|---|---|---|---|---|---|---|---|---|---|---|
| | | | A | B | C | D | E | F | G |
| FIRST RECORDING LAYER | FIRST REFLECTED LIGHT (SIGNAL LIGHT) | AREA 1 | S | S | P | S | P | P | P |
| | | AREA 2 | S | S | S | P | P | P | P |
| | SECOND REFLECTED LIGHT (STRAY LIGHT) | AREA 1 | S | S | P | P | S | S | — |
| | | AREA 2 | S | S | S | P | S | S | — |
| SECOND RECORDING LAYER | FIRST REFLECTED LIGHT (STRAY LIGHT) | AREA 1 | S | S | P | S | S | S | — |
| | | AREA 2 | S | S | S | S | S | S | — |
| | SECOND REFLECTED LIGHT (SIGNAL LIGHT) | AREA 1 | S | S | P | P | P | P | P |
| | | AREA 2 | S | S | S | P | P | P | P |

FIG.35

| TARGET RECORDING LAYER | BEAM | | A | B | C | D | E | F | G |
|---|---|---|---|---|---|---|---|---|---|
| FIRST RECORDING LAYER | FIRST REFLECTED LIGHT (SIGNAL LIGHT) | AREA 1 | S | S | P | S | P | P | G |
| | | AREA 2 | S | S | S | P | P | P | P |
| | SECOND REFLECTED LIGHT (STRAY LIGHT) | AREA 1 | S | S | P | P | S | S | P |
| | | AREA 2 | S | S | S | S | S | S | — |
| SECOND RECORDING LAYER | FIRST REFLECTED LIGHT (STRAY LIGHT) | AREA 1 | S | S | P | S | S | S | — |
| | | AREA 2 | S | S | S | S | S | S | — |
| | SECOND REFLECTED LIGHT (SIGNAL LIGHT) | AREA 1 | S | S | P | S | P | P | P |
| | | AREA 2 | S | S | S | P | P | P | P |

OPTICAL PATH

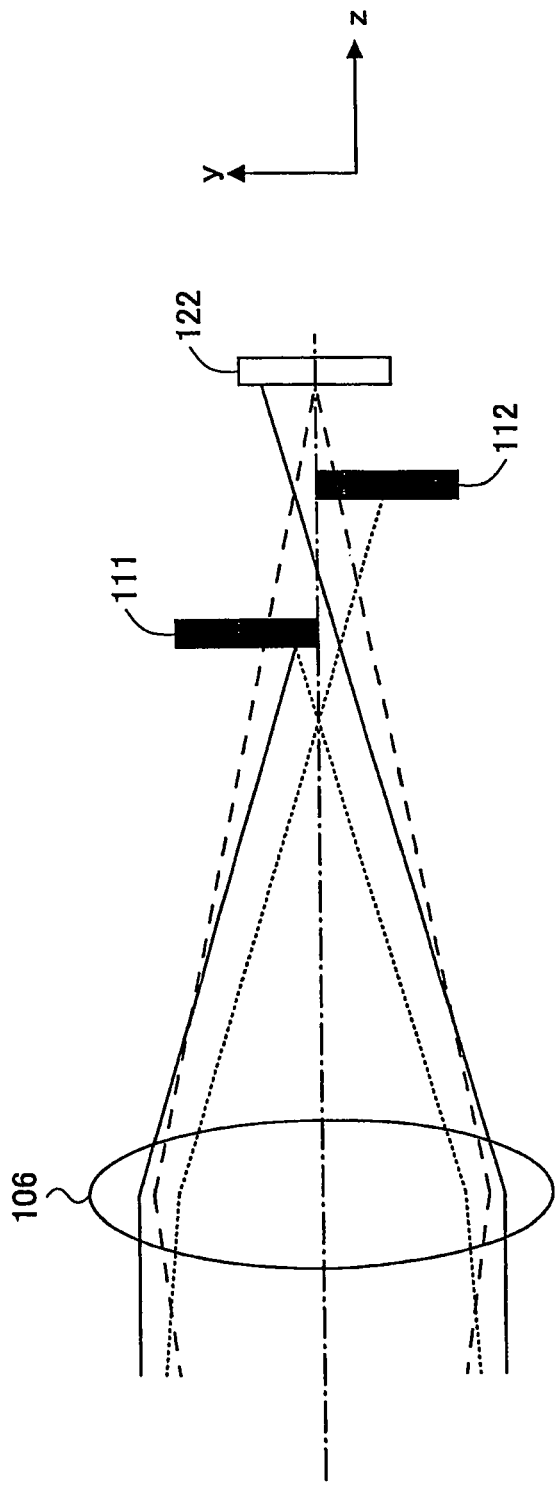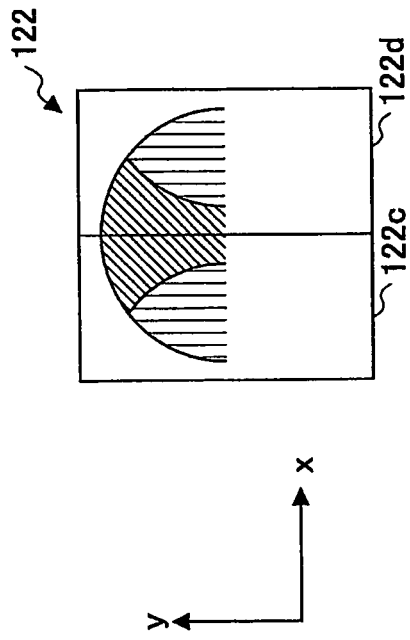
FIG.46A
FIG.46B

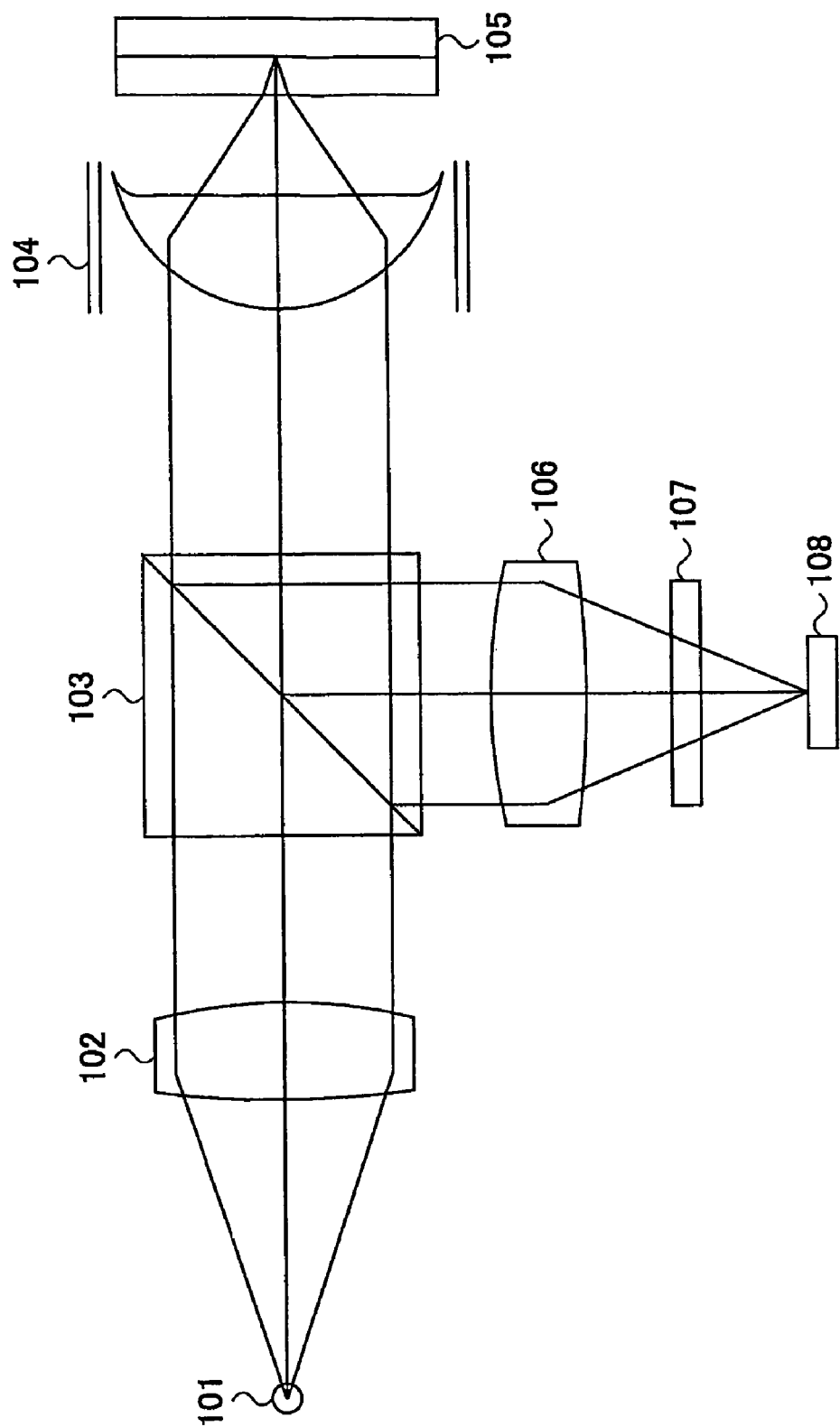

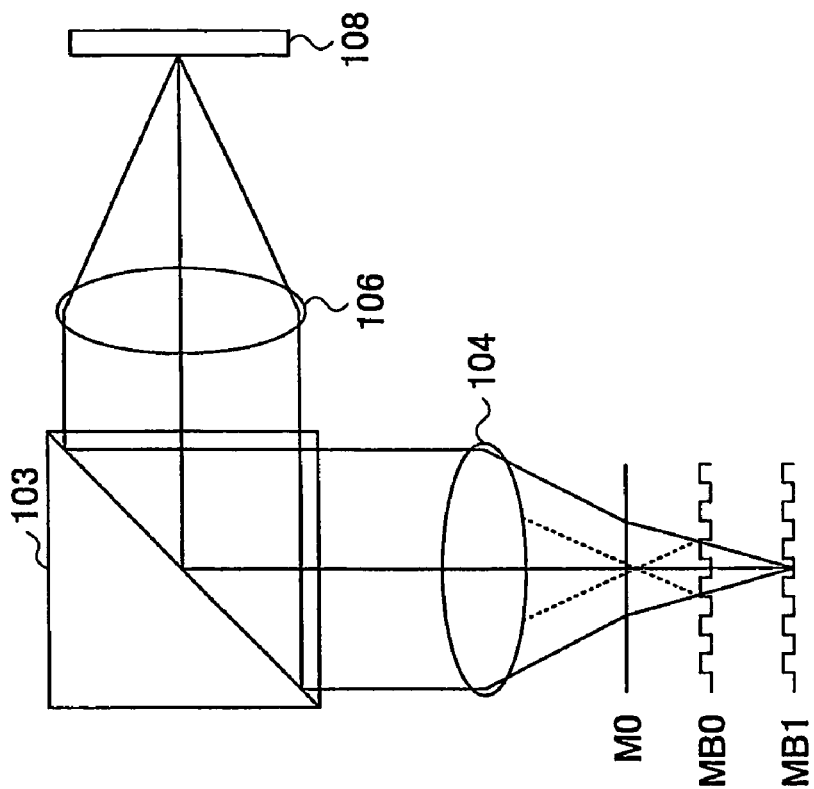
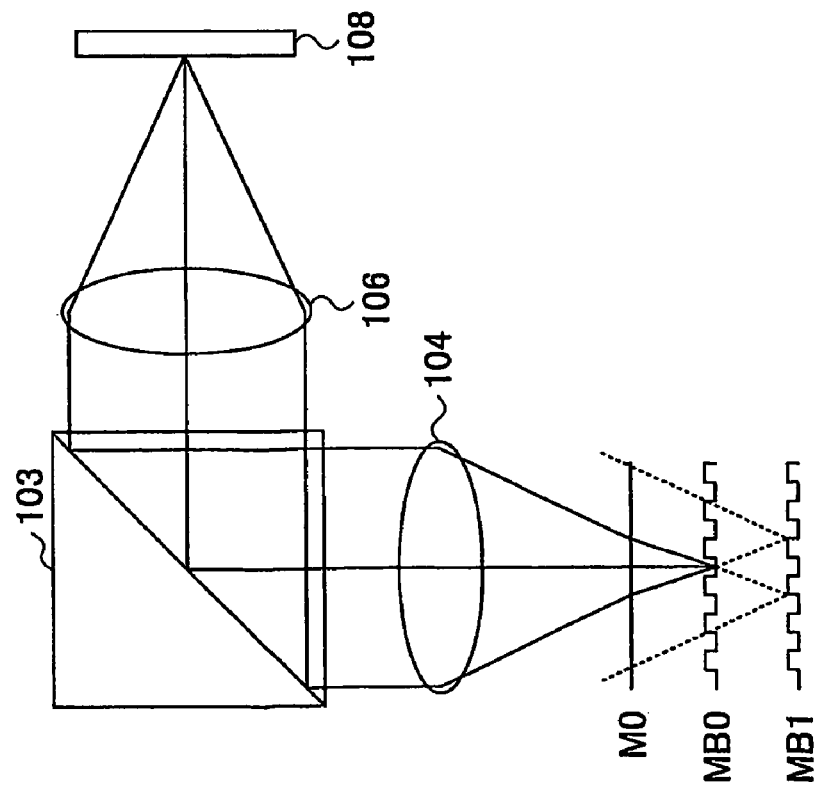

OPTICAL SYSTEM, OPTICAL PICKUP APPARATUS, AND OPTICAL DISK APPARATUS

This application is a 371 of PCT/JP2006/304516, filed Mar. 2, 2006.

TECHNICAL FIELD

The present invention relates to an optical system, an optical pickup apparatus, and an optical disk apparatus, and more particularly to an optical system for extracting signal light components from a beam, an optical pickup apparatus including the optical system, and an optical disk apparatus including the optical pickup apparatus.

BACKGROUND ART

In recent years and continuing, optical disks (e.g., CDs (Compact Disc) and DVDs (Digital Versatile Disc)) serving to record computer programs, audio information, video information (hereinafter referred to as "contents") are drawing greater attention owing to the advances in digital technology and the improvements in data compression technology. Accordingly, as the optical disks become less expensive, optical disk apparatuses for reading out the information recorded in the optical disks have grown to become widely used.

The amount of information to be recorded in the optical disks is growing year by year. Therefore, further increase in the recording capacity of a single optical disk is expected. As for measures that are being developed for increasing the recording capacity of the optical disk, there is, for example, increasing the number of recording layers. Accordingly, vigorous research is being made on optical disks having plural recording layers (hereinafter referred to as "multilayer disk") and optical disk apparatuses that access the multilayered disks.

In the multilayer disks, there is a possibility that the signals from a target recording layer be adversely affected by spherical aberration if the spaces between the recording layers are too large. Accordingly, there is a trend of reducing the space between the recording layers. However, reducing the space between the recording layers causes cross-talk between the recording layers (so-called "interlayer cross-talk"). As a result, the beam returning (reflected) from the multilayer disk contains not only desired beams reflected from a target recording layer (hereinafter referred to as "signal light") but also a significant amount of undesired beams reflected from recording layers besides the target recording layer (hereinafter referred to as "stray light"). This leads to the decrease in S/N ratio of reproduction signals.

For example, FIGS. 50A and 50B are schematic drawings for describing an operation of reading out information from a dual layer recording medium. FIG. 50A is a ray diagram showing a case of reading information recorded in a first recording layer L' 0, and FIG. 50B is a ray diagram showing a case of reading information recorded in a second recording layer L' 1 (See also FIG. 2).

In FIG. 50A, the objective lens 104 is positioned away from the substrate surface to form a fine beam spot on the first layer L' 0. In FIG. 50B, the objective lens 104 is positioned closer to the substrate surface to form a fine beam spot on the second layer L' 1. As shown in both FIGS. 50A and 50B, the signal light rays reflected from the first and second layers L' 0, L' 1 are changed to parallel rays when they are transmitted through the objective lens 104, and are condensed and detected at the same light reception surface 108 if the detection lens 106 is arranged at a fixed position.

FIG. 51 shows the results observing the degradation of jitter of the signal reproduced from the first layer MB0 in a case of reducing the thickness of an intermediate layer between the first and second layers MB0 and MB1 of a dual layer DVD disk.

In a case of reading out information from the first layer MB0, stray light is generated from the second layer MB1, as shown with the dotted lines in FIG. 51A. In a case of reading out information from the second layer MB1, stray light is generated from the first recording layer MB0, as shown with the dotted lines in FIG. 51B. A portion of the stray light overlaps with a beam reflected from the target recording layer and is detected at the optical detector 108.

This stray light is generally detected as the offset for various signals (described in further detail in "Analyses for Design of Drives and Disks for Dual-layer Phase Change Optical Disks", pp. 281-283, Shintani et. al).

Furthermore, in a case of reducing the thickness of the intermediate layer, interference between the signal light and the stray light before reaching the optical detecting unit 108. This interference creates noise components for focus error signals, track error signals, and disk reproduction signals (jitter). For example, in observing the jitter of the signals reproduced from the first recording layer MB0, FIG. 52 shows that the jitter is adversely affected when the intermediate layer is formed with a thickness less than 30 μm. This phenomenon is typically referred to as cross-talk. Accordingly, in a case of reducing the thickness of the intermediate layer of a dual layer recording medium, it is desired to eliminate or reduce the stray light in an optical pickup apparatus.

In one related art example, offset caused by stray light may be eliminated by providing a diffraction grating in an optical detecting system for dividing the signal light and the stray light into primary light and secondary light, detecting the stray light from plural layers with different optical detectors, and calculating the difference between the signal light and the stray light (see Japanese Laid-Open Patent Application No. 2001-273640). However, with this related art example, not only is the stray light diffracted by the diffraction grating but the signal light is also subjected to the diffraction. This causes loss of signal light components included in the beam reflected from the optical disk. Furthermore, this related art cannot eliminate the changes in the quantity of light caused by the interference between the signal light and stray light prior to reaching the optical detecting surface, to thereby cause the strength of the signal light to vary.

In another related art example, the effects of the stray light may be reduced by providing a condenser lens and a pin hole in an optical detecting system (see Japanese Laid-Open Patent Application No. 2003-323736). However, with this related art example, the strongest component of the stray light may pass through the pin hole and be detected by the optical detector. Therefore, detection of the stray light cannot be sufficiently prevented. Furthermore, since the objective lens typically is driven in the tracking direction, deviation of the optical axis is likely to occur. In such a case, the signal light may be blocked due to the position of the pin hole, to thereby lead to a change in the strength of the signal light.

As another related art example, Japanese Registered Patent No. 2624255 proposes an apparatus for reducing interlayer cross-talk when reading out from a multilayer disk.

This apparatus requires to further reduce the diameter of a pin hole of its detector for reducing the components of the stray light that is incident on the detector. However, reducing the diameter of the pin hole also causes loss of the components of the signal light that is incident on the detector.

DISCLOSURE OF INVENTION

It is a general object of the present invention to provide an optical system, an optical pickup apparatus, and an optical disk apparatus that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention can be realized and attained by an optical system, an optical pickup apparatus, and an optical disk apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the present invention provides an optical system for extracting signal light components from a beam including the signal light components and stray light components, the optical system including: a condensing optical element situated on an optical path of the beam for condensing the beam; a polarization changing unit for changing the state of polarization of at least one of the signal light components and the stray light components included in the incident beam transmitted through the condensing optical element; and an extracting element for extracting the signal light components included in the beam transmitted through the polarization changing unit.

Furthermore, an optical system for extracting signal light components from a beam including the signal light components and stray light components, the optical system comprising: a condensing optical element situated on an optical path of the beam for condensing the beam; a polarization changing unit including a combination of a polarization changing element and a reflecting part for changing the state of polarization of at least one of the signal light components and the stray light components included in the incident beam transmitted through the condensing optical element; and an extracting element for extracting the signal light components included in the beam transmitted through the polarization changing unit.

Furthermore, the present invention provides an optical pickup apparatus including: a light source for irradiating a beam; an optical system including an objective lens for condensing the beam to a target recording layer of an optical disk having a plurality of recording layers; the optical system according to an embodiment of the present invention; and an optical detecting system for generating signals in accordance with the amount of light of the extracted signal light components.

Furthermore, the present invention provides an optical disk apparatus including: the optical pickup apparatus according to an embodiment of the present invention; and a processing apparatus for reading out information recorded in the optical disk in accordance with the signals generated by the optical detecting system.

Furthermore, the present invention provides an optical system for extracting signal light components from a beam including the signal light components and stray light components, the optical system including: a condensing optical element situated on an optical path of the beam for condensing the beam, the condensing optical element condensing the signal light components at a first focus point and the stray light components at a second focus point; a first polarization changing element positioned between the condensing optical element and the second focus point that is situated closer to the condensing optical element than the first focus point, the first polarization changing element including first and second areas that are divided by a line perpendicularly intersecting with the optical axis of the condensing optical element, the first polarization changing element having an optical characteristic of changing the polarization direction of the beam incident on the first area to an angle of 90 degrees; a first separating element being positioned between the first and second focus points, the first separating element being operable to reflect or absorb the stray light components condensed more toward the condensing optical element than the first focus point; a second separating element positioned between the first focus point and a third focus point at which the stray light components transmitted through first separating element are condensed, the second separating element being operable to reflect or absorb the stray light components transmitted through the first separating element; and a second polarization changing element including first and second areas that are divided by a line perpendicularly intersecting with the optical axis of the condensing optical element, the second polarization changing element having an optical characteristic of changing the polarization direction of the beam incident on at least one of the first area and the second area of the second polarization changing element to an angle of 90 degrees.

Furthermore, the present invention provides an optical pickup apparatus including: a light source for irradiating a beam; an optical system including an objective lens for condensing the beam to a target recording layer of an optical disk having a plurality of recording layers, and the optical system according to an embodiment of the present invention; and an optical detecting system for generating signals in accordance with the amount of light of the extracted signal light components.

Furthermore, the present invention provides an optical disk apparatus including: the optical pickup apparatus according to an embodiment of the present invention; and a processing apparatus for reading out information recorded in the optical disk in accordance with the signals generated by the optical detecting system.

Furthermore, the present invention provides an optical pickup apparatus provided with a light source, a collimator lens, a detector and separating part, an objective lens, an optical detecting system, and an optical detector for recording and reading out information to and from an optical disk having a plurality of layers, the optical pickup apparatus including: a condensing optical element for condensing a beam reflected from the plural layers of the optical disk, the beam including a signal light beam Lm that is reflected from an $m^{th}$ layer of the plural layers, a first stray light beam Lm+1 that is reflected from a $m+1^{th}$ layer of the plural layers, and a second stray light beam Lm−1 that is reflected from a $m-1^{th}$ layer of the plural layers, the signal light beam Lm being condensed at a first focus point fm, the first stray light beam Lm+1 being condensed at a second focus point fm+1, and the second stray light beam Lm−1 being condensed at a third focus point fm−1; a front shielding part positioned between the first focus point fm and the second focus point fm+1 for shielding the beam oriented to a first area; and a rear shielding part positioned between the first focus point fm and the third focus point fm−1 for shielding the beam oriented to a second area;

wherein the first and second areas are divided by an optical axis of the condensing optical element.

Furthermore, the present invention provides an optical pickup apparatus provided with a light source, a collimator lens, a detector and separating part, an objective lens, an optical detecting system, and an optical detector for recording and reading out information to and from an optical disk having a plurality of layers, the optical pickup apparatus including: a condensing optical element for condensing a beam reflected from the plural layers of the optical disk, the beam including a signal light beam Lm that is reflected from an m$^{th}$ layer of the plural layers, a first stray light beam Lm+1 that is reflected from a m+1$^{th}$ layer of the plural layers, and a second stray light beam Lm−1 that is reflected from a m−1$^{th}$ layer of the plural layers, the signal light beam Lm being condensed at a first focus point fm, the first stray light beam Lm+1 being condensed at a second focus point fm+1, and the second stray light beam Lm−1 being condensed at a third focus point fm−1; a beam splitting part positioned closer to the condenser part than the second focus point fm+1 for splitting the beam into first and second areas divided by an optical axis of the condensing optical element; a front shielding part positioned between the first focus point fm and the second focus point fm+1 on the side of the first area for shielding the first stray light beam Lm+1; and a rear shielding part positioned between the first focus point fm and the third focus point fm−1 on the side of the second area for shielding the second stray light beam Lm−1.

Furthermore, the present invention provides an optical pickup apparatus provided with a light source, a collimator lens, a detector and separating part, an objective lens, an optical detecting system, and an optical detector for recording and reading out information to and from an optical disk having a plurality of layers, the optical pickup apparatus including: a condensing optical element for condensing a beam reflected from the plural layers of the optical disk, the beam including a signal light beam Lm that is reflected from an m$^{th}$ layer of the plural layers, a first stray light beam Lm+1 that is reflected from a m+1$^{th}$ layer of the plural layers, and a second stray light beam Lm−1 that is reflected from a m−1$^{th}$ layer of the plural layers, the signal light beam Lm being condensed at a first focus point fm, the first stray light beam Lm+1 being condensed at a second focus point fm+1, and the second stray light beam Lm−1 being condensed at a third focus point fm−1; a beam splitting part positioned between the first focus point fm and the second focus point fm+1 for splitting the beam into first and second areas divided by an optical axis of the condensing optical element; and a shielding part positioned between the first focus point fm and the third focus point fm−1 for shielding the first stray light beam Lm+1 and the second stray light beam Lm−1.

Furthermore, the present invention provides an optical recording apparatus including: the optical pickup apparatus according to an embodiment of the present invention.

Furthermore, the present invention provides an optical reproduction apparatus includes: the optical pickup apparatus according to an embodiment of the present invention.

Furthermore, the present invention provides an optical recording and reproduction apparatus including: the optical pickup apparatus according to an embodiment of the present invention.

BRIEF DESCRIPTION OF DRAWINGS

FIG. 2 is a schematic drawing for describing a configuration of an optical disk according to an embodiment of the present invention;

FIG. 3A is a schematic drawing for describing an optical system and an optical pickup apparatus including the optical system according to an embodiment of the present invention;

FIG. 3B is a schematic drawing for describing an optical system and an optical pickup apparatus including the optical system according to another embodiment of the present invention;

FIGS. 5A and 5B are schematic drawings for describing an exemplary operation of the optical system shown in FIG. 3A;

FIGS. 5C and 5D are schematic drawings for describing an exemplary operation of the optical system shown in FIG. 3B;

FIG. 8A is a table showing the operation (effect) of the optical system shown in FIG. 3A according to an embodiment of the present invention;

FIG. 8B is a table showing the operation (effect) of the optical system shown in FIG. 3B according to another embodiment of the present invention;

FIG. 14 is a graph for describing the relationship between the beam diameter and the thickness of an intermediate layer of an optical disk according to the optical systems shown in FIGS. 13A and 13B.

FIG. 20 is a table showing the operation (effect) of the optical system shown in FIG. 3A according to an embodiment of the present invention in a case where a ¼ wave plate is rotated 180 degrees;

FIG. 23 is a table showing the operation (effect) of the optical system using the ½ wave plates shown in FIGS. 21 and 22 according to an embodiment of the present invention;

FIG. 24 is a table showing the operation (effect) of the optical system in a case where the other ½ wave plate is rotated 180 degrees according to an embodiment of the present invention;

FIG. 27 is a table showing the operation (effect) of the optical system using the rotators shown in FIGS. 25 and 26 according to an embodiment of the present invention;

FIG. 28 is a table showing the operation (effect) of the optical system in a case where the other rotator is rotated 180 degrees according to an embodiment of the present invention;

FIG. 32 is a table showing the operation (effect) of the optical system shown in FIG. 29 according to an embodiment of the present invention;

FIG. 35 is a table showing the operation (effect) of the optical system shown in FIG. 33 according to an embodiment of the present invention;

FIGS. 46A and 46B are schematic drawings showing an exemplary configuration for obtaining track error signals according to yet another embodiment of the present invention;

FIG. 48 is a schematic drawing showing an overall configuration of an optical pickup apparatus according to yet another embodiment of the present invention;

FIGS. 51A and 51B are schematic drawings for describing an operation of reading out and recording information from and to an optical disk (dual layer information recording medium);

BEST MODE FOR-CARRYING OUT THE INVENTION

Figure 1:
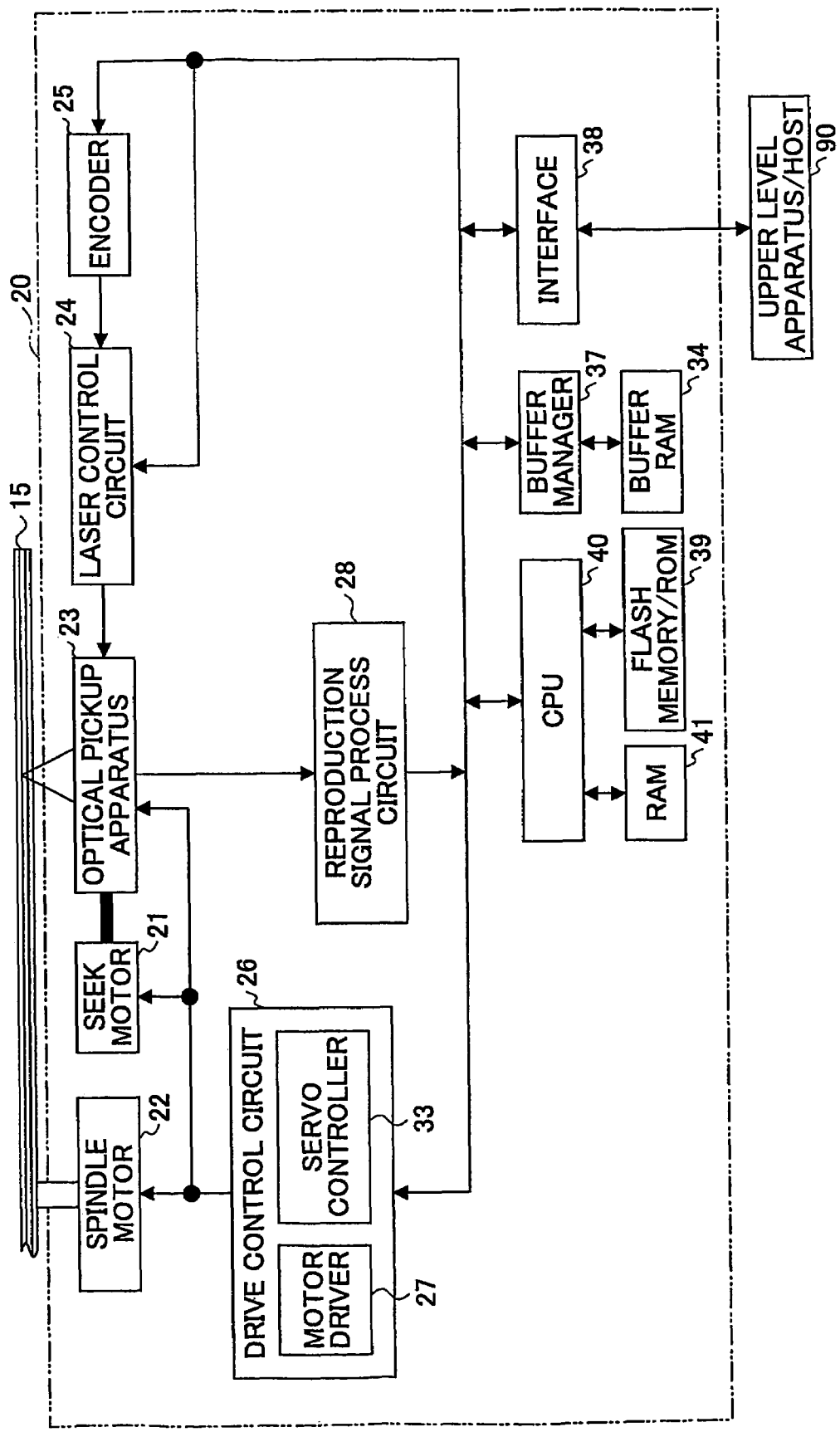
FIG. 1 is a schematic drawing showing an exemplary configuration of an optical disk apparatus according to an embodiment of the present invention.

The present invention is described in detail based on the embodiments illustrated in the drawings.

FIG. 1 is a schematic view showing an optical disk apparatus 20 according to an embodiment of the present invention.

The optical disk apparatus 20 includes, for example, a spindle motor 22 serving as a motor for driving the rotation of an optical disk 15, an optical pickup apparatus 23, a seek motor 21 for driving the optical pickup 23 in a sledge direction, a laser control circuit 24, an encoder 25, a drive control circuit 26 (including, for example, a motor driver 27 and a servo controller 33), a reproduction signal process circuit 28, a buffer RAM 34, a buffer manager 37, an interface 38, a flash memory (or ROM) 39 a CPU 40, and a RAM 41. The arrows illustrated in FIG. 1 indicate an exemplary flow of signals and information and do not indicate all connections among the illustrated components (blocks). Furthermore, the optical disk apparatus 20 according to an embodiment of the present invention is applicable to a multilayer disk. Furthermore, the optical disk apparatus 20 includes an apparatus dedicated for recording information in an optical disk (optical disk apparatus), an apparatus dedicated for reading out information from an optical disk (optical reproduction apparatus), and an apparatus dedicated to record/reproduce information from to/from an optical disk.

As shown in FIG. 2, the optical disk 15 includes, for example, a first substrate M0, a first recording layer L0, an intermediate recording layer ML, a second recording layer L1, and a second substrate M1 that are layered in this order from the light incident direction (arrow direction in FIG. 2) of the optical disk 15. Furthermore, a translucent film MB0 that is formed of, for example, a metal material (e.g. silver, aluminum) or a dielectric material (e.g. silicon) is provided between the first recording layer L0 and the intermediate layer ML. Furthermore, a reflection film MB1 formed of, for example, a metal material (e.g. silver, aluminum), is provided between the second recording layer L1 and the second substrate M1. The intermediate layer ML includes a UV curing resin material that has a refractive index that is similar to that of the substrates. That is, the optical disk 15 is a single sided dual layer disk. Each recording layer has one or more tracks formed with spiral or concentric guiding grooves. The optical disk 15 is set in a manner that the first recording layer L0 is situated closer to the optical disk apparatus 20 than the second recording layer L1. Accordingly, a portion of the band of rays incident on the optical disk 15 is reflected at the translucent film MB0, and the remaining portion of the band of rays are transmitted through the translucent film MB0. Then, the band of rays transmitted through the translucent film MB0 are reflected by the reflection film MB1. In this embodiment, the optical disk 15 is a DVD type information recording medium.

The optical pickup apparatus 23 is for irradiating a laser beam onto one of the two recording layers of the optical disk 15 to which access is sought (hereinafter referred to as "target recording layer") and for receiving the light reflected from the optical disk 15. As shown in FIG. 3A, the optical pickup apparatus 23 includes, for example, a light source unit 51, a coupling lens 52, a polarization beam splitter 54, a ¼ wave plate 55, an objective lens 60, an optical system 70 (also referred to as an optical polarization system), a condenser lens (detection lens) 58, an optical detecting unit serving PD (also referred to as a photo detector) and a drive system including a focusing actuator AC and a tracking actuator (not shown) for driving the objective lens 60.

The light source unit 51 includes, for example, a semiconductor laser LD serving as a light source for irradiating a laser beam having a wavelength complying with the optical disk 15 (in this example, approximately 660 nm). In this embodiment of the present invention, the direction of the laser beam of the maximum strength irradiated from the light source unit 51 is in the +X direction. Furthermore, the light source unit 51 irradiates, for example, a bundle of polarized rays that is parallel to the incident plane of the polarization beam splitter 54 (P polarized light).

The coupling lens 52, being positioned at the +X side of the light source unit 51, makes the beam irradiated from the light source unit 51 into substantially parallel rays.

The polarization beam splitter 54 is positioned at the +X side of the coupling lens 54. The reflectance of the polarization beam splitter 54 varies depending on the polarization state of the incident band of rays. In this example, the polarization beam splitter 54 is set to have decreasing reflectance with respect to the P polarized light and an increasing reflectance with respect to the S polarized light. That is, a large portion of the beam irradiated from the light source unit 51 can transmit through the polarization beam splitter 54. The ¼ wave plate is positioned at the +X side of the polarization beam splitter 54.

The ¼ wave plate 55 provides a phase difference of a ¼ wavelength with respect to the beam incident on the ¼ wave plate 55. The objective lens 60, being positioned at the +X side of the ¼ wave plate 55, condenses the beam transmitted through the ¼ wave plate onto the target recording layer.

The optical system 70, being positioned at the −Z side of the polarization beam splitter 54, selectively allows a portion of the reflected beam reflected from the target recording layer (via the polarization beam splitter 54) to transmit therethrough. The configuration of the optical system 70 is described in detail below.

The condenser lens 58, being positioned at the −Z side of the optical system 70, condenses the reflected beam transmitted through the optical system 70 onto the optical detecting surface of the optical detecting unit PD. The optical detecting unit PD has plural optical detectors (or an optical detecting area) for generating signals (photo-electric conversion signals) that are optimum for detecting, for example, RF signals, wobble signals, and servo signals in the reproduction signal process circuit 28.

The focusing actuator AC is for precisely driving (moving) the objective lens 60 in the focus direction, that is, the direction of the optical axis of the objective lens 60. For the sake of convenience, in a case where the target recording layer is the first recording layer L0, the optimum position of the objective lens 60 with respect to the focus direction is referred to as "first lens position", and in a case where the target recording layer is the second recording layer L1, the optimum position of the objective lens 60 with respect to the focus direction is referred togas "second lens position". The distance between the objective lens 60 and the optical disk 15 is shorter in a case where the objective lens 60 is in the second lens position when compared to a case where the objective lens 60 is in the first lens position (See FIGS. 4A and 4B).

The tracking actuator (not shown) is for precisely driving (moving) the objective lens 60 in the tracking direction.

Next, the beam reflected from the optical disk 15 is described with reference to FIGS. 4A and 4B.

Figure 4A:
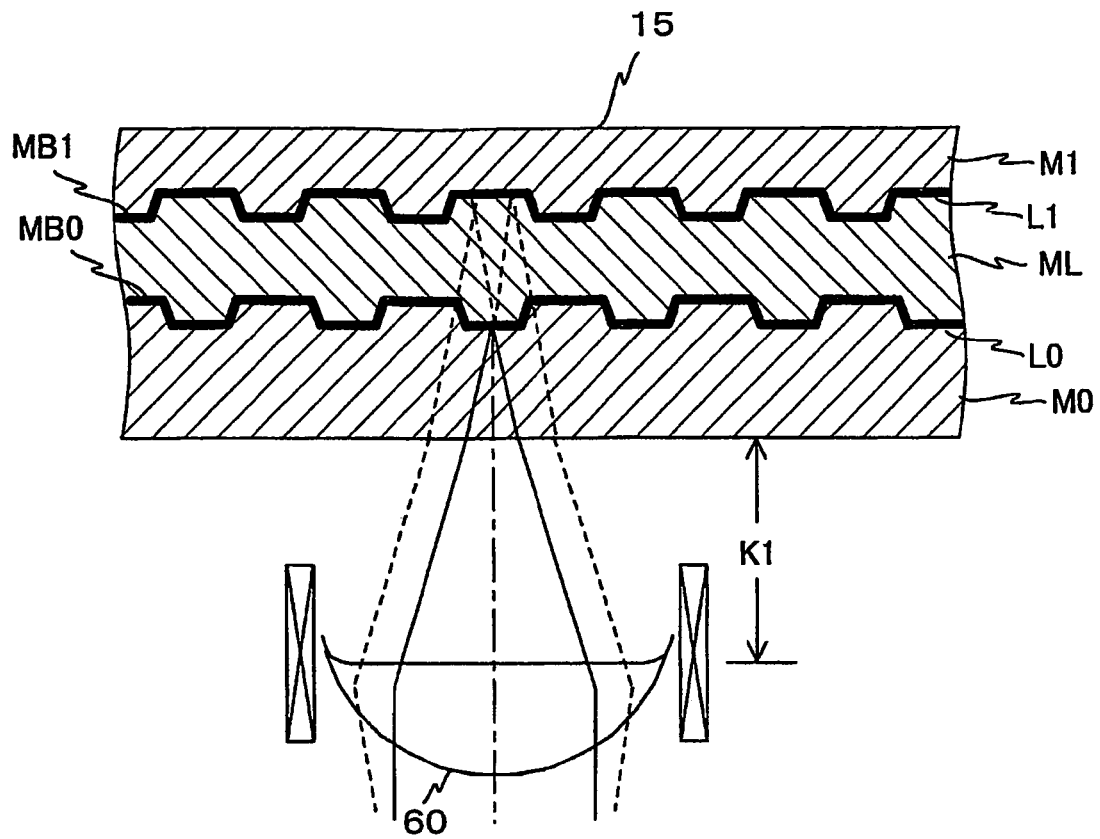
FIGS. 4A and 4B are schematic drawings for describing signal light (signal light components) and stray light (stray light components)
Figure 4B:
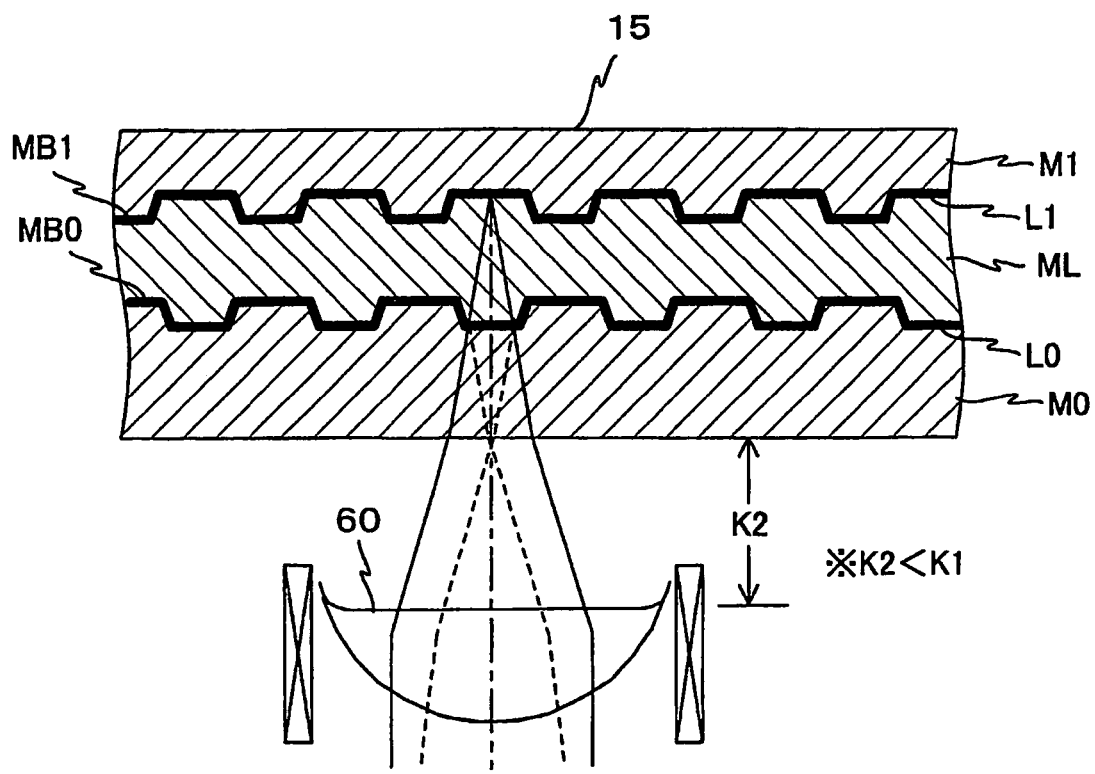

As shown in FIG. 4A, in a case where the target recording layer is the first recording layer L0, the position of the objective lens 60 is defined to the first lens position. Accordingly, the objective lens 60 condenses the beam irradiated from the light source unit 51 onto the first recording layer L0. Then, a portion of the beam is reflected from the translucent film MB0 and is incident on the objective lens 60. Such portion of the beam reflected from the translucent film MB0 includes signal light components (signal light). Meanwhile, the remaining portion of the beam is transmitted through the translucent film MB0, is reflected from the reflection film MB1, and is incident on the objective lens 60. The remaining portion of the beam reflected from the reflection film MB1 includes stray light components (stray light).

That is, regardless of whether the target recording layer is the first recording layer L0 or the second recording layer L1, the beam reflected from the optical disk 15 includes a beam reflected from the translucent film MB0 (hereinafter referred to as "first reflected light") and a bundle of rays reflected from the reflection film MB1 (hereinafter referred to as "second reflected light"). In this example, in a case where the target recording layer is the first recording layer L0, the first reflected light includes the signal light components (signal light) and the second reflected light includes the stray light components (stray light). Meanwhile, in a case where the target recording layer is the second recording layer L1, the second reflected light include the signal light components (signal light) and the first reflected light include the stray light components (stray light). Since the stray light components lead to deterioration of S/N ratio when detecting various signals in the reproduction signal process circuit 28, it is desired to extract the signal light components from the beam reflected from the optical disk 15.

Next, the optical system 70 according to another embodiment of the present invention is described. In this embodiment, the optical system 70 shown in FIG. 3B includes a lens (condensing optical element) 61, two ¼ wave plates (62, 63), and a polarizing optical element (extracting element) 64

The lens 61, being situated at the −Z side of the polarization beam splitter 54, condenses the returning beam reflected from the polarization beam splitter 54. Since the translucent film MB0 and the reflection film MB1 are separated from each other in the focus direction, the focus point of the first reflected light and the focus point of the second reflected light do not match, that is, the focus point of the first reflected light and the focus point of the second reflected light are separated from each other in the optical axis direction of the lens 61.

Figure 5B:
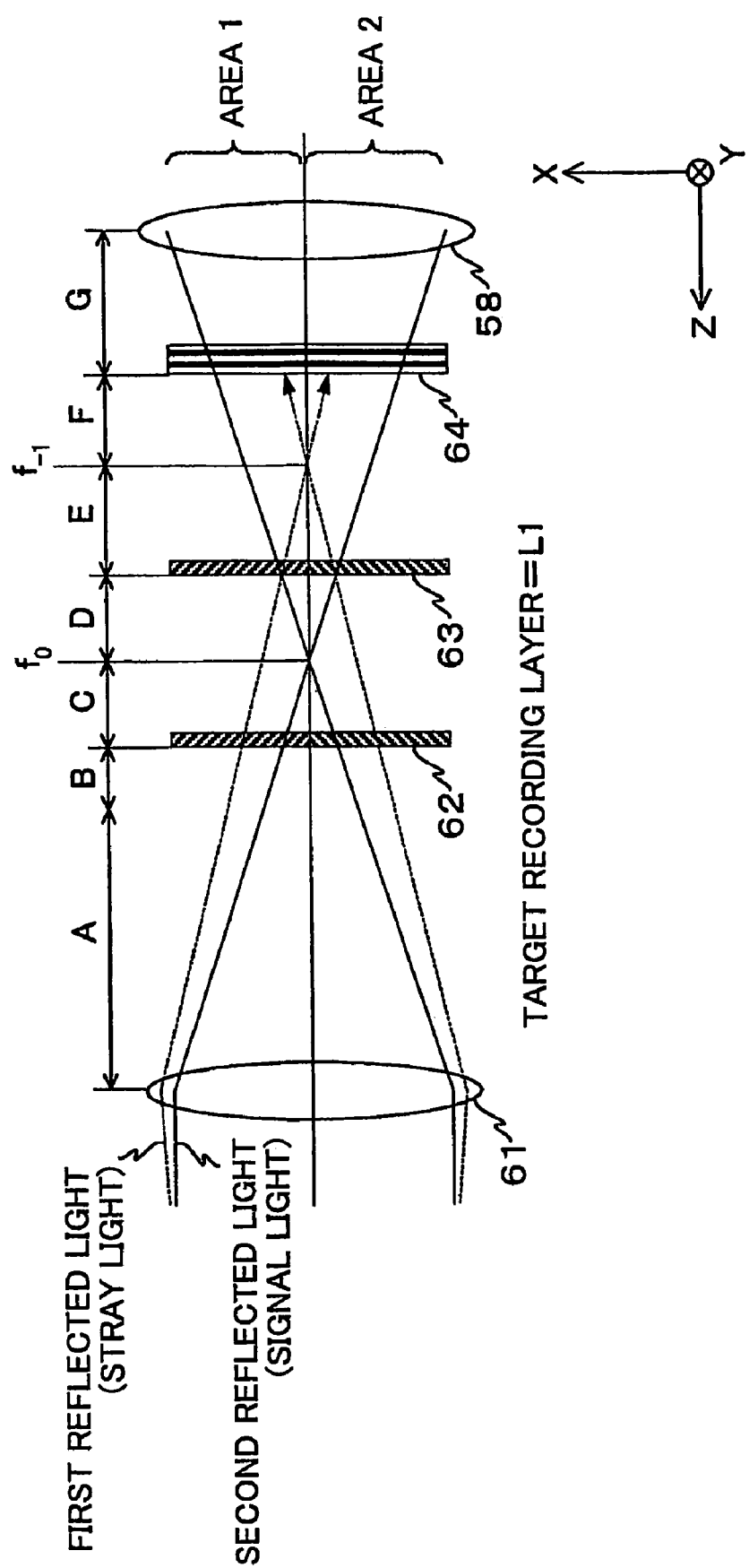

For example, as shown in FIG. 5A, in a case where the target recording layer is the first recording layer L0, the focus point of the second reflected light transmitted through the lens 61 is set as "$f_{+1}$" and the focus point of the first reflected light transmitted through the lens 61 is set as "$f_0$". Furthermore, as shown in FIG. 5B, in a case where the target recording layer is the second recording layer L1, the focus point of the second reflected light transmitted through the lens 61 is set as "$f_0$" and the focus point of the first reflected light transmitted through the lens 61 is set as "$f_{-1}$". That is, the focus point of the signal light (first focus point) is set as "$f_0$". Meanwhile, the focus point of the stray light reflected from a recording layer which is situated farther from the objective lens 60 compared to the target recording layer (second focus point) is set as "$f_{+1}$". The focus point of the stray light reflected from a recording layer which is situated closer to the objective lens 60 compared to the target recording layer (third focus point) is set as "$f_{-1}$". Furthermore, the +X side of the optical axis of the lens 61 is hereinafter also referred to "area 1", and the −X side of the optical axis of the lens 61 is hereinafter also referred to as "area 2" (See FIGS. 5A and 5B).

Figure 6A:
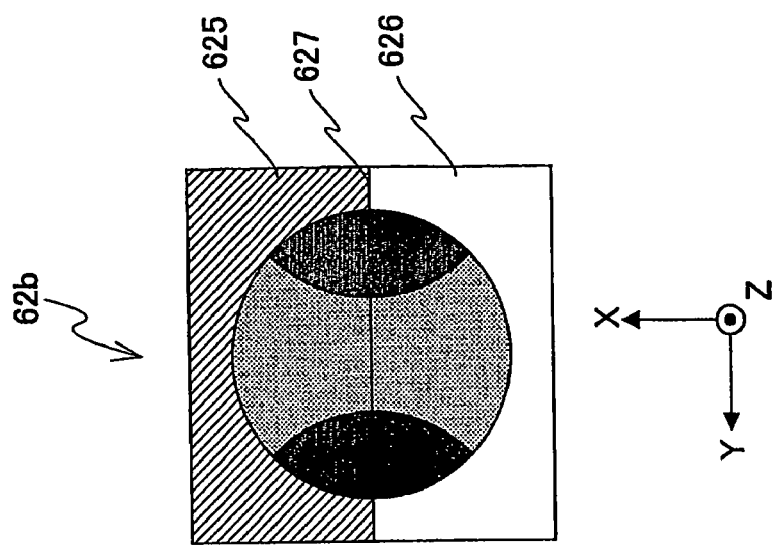
FIG. 6A is a schematic drawing for describing a ¼ wave plate according to an embodiment of the present invention.

The ¼ wave plate (first polarization changing element) 62 is positioned on the −Z side of the lens 61 and is situated between the second focus point $f_{+1}$ and the first focus point $f_0$ (See FIG. 5A). For example, as shown in FIG. 6A, the ¼ wave plate 62 is divided into two areas (62a, 62b) by a dividing line 62d extending in the Y direction. In this example, the area on the +X side with respect to the dividing line 62d is indicated as area 62a, and the area on the −X side with respect to the dividing line 62d is indicated as area 62b. The area 62a provides a phase difference of +¼ wavelength with respect to the beam incident on the ¼ wave plate. It is to be noted that "+¼ wavelength" according to an embodiment of the present invention includes "+¼×(2n+1) wavelength", wherein "nn" is a natural number. The area 62b provides a phase difference of −¼ wavelength with respect to the beam incident on the ¼ wave plate 62. It is to be noted that "−¼ wavelength" according to an embodiment of the present invention includes "−¼×(2n+1) wavelength", wherein "n" is a natural number. In a case where the objective lens 60 shifts in the tracking direction, the returning beam incident on the ¼ wave plate 62 shifts to a direction corresponding to the tracking direction (in this example, the Y direction).

Figure 7A:
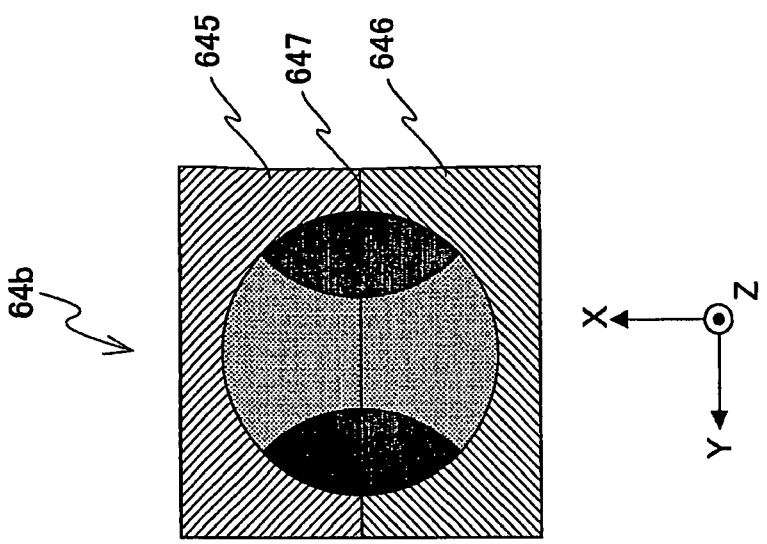
FIG. 7A is a schematic drawing for describing another ¼ wave plate according to an embodiment of the present invention.

The ¼ wave plate 63 (second polarization changing element) is positioned in the −Z direction of the ¼ wave plate 62 and is situated between the first focus point $f_0$ and the third focus point $f_{-1}$ (See FIG. 5B). For example, as shown in FIG. 7A, the ¼ wave plate 63 is divided into two areas (63a, 63b) by a dividing line 63d extending in the Y direction. In this example, the area on the +X side with respect to the dividing line 63d is indicated as area 63a, and the area on the −X side with respect to the dividing line 63d is indicated as area 63b. The area 63a provides a phase difference of +¼ wavelength with respect to the beam incident on the ¼ wave plate 63. The area 63b provides a phase difference of −¼ wavelength with respect to the beam incident on the ¼ wave plate 63. In other words, the ¼ wave plate 63 has the same optical characteristics as the ¼ wave plate 62. In this case also, the returning beam incident on the ¼ wave plate 63 shifts to a direction corresponding to the tracking direction (in this example, the Y direction) when the objective lens 60 shifts in the tracking direction.

For example, a twist nematic liquid crystal, a sub-wavelength wire-grid, or a photonic crystal may be used as the ¼ wave plate 62, 63.

The polarization optical element 64, being positioned at the −Z side of the ¼ wave plate 63, only allows S polarized components included in the beam from the ¼ wave plate 63 to transmit therethrough.

Next, the operation of the above-described optical pickup apparatus 23 is described with reference to FIGS. 5A, 5B, and FIG. 8A. In the table shown in FIG. 8A as well as the tables in the following drawings according to an embodiment of the present invention, the letter "S" indicates "S polarized light", the letter "P" indicates "P polarized light", the letter "R" indicates "right circularly polarized light", and the letter "L" indicates "left circularly polarized light". Furthermore, in the table shown in FIG. 6A as well as the tables in the following drawings according to an embodiment of the present invention, it is to be noted that, with respect to the optical axis direction of the lens 61, the optical path between the lens 61 and the second focus point $f_{+1}$ is referred to as "optical path A", the optical path between the second focus point $f_{+1}$ and the ¼ wave plate 62 is referred to as "optical path B", the optical path between the ¼ wave plate 62 and the first focus point $f_0$ is referred to as "optical path C", the optical path between the first focus point $f_0$ and the ¼ wave plate 63 is referred to as "optical path D", the optical path between the ¼ wave plate 63 and the third focus point $f_{-1}$ is referred to as "optical path E", the optical path between the third focus point $f_{-1}$ and the polarization optical element 64 is referred to as "optical path F", and the optical path between the polarization optical element 64 and the condenser lens 58 is referred to as "optical path G" (See FIGS. 5A and 5B).

The beam of the direct polarized light (in this example, P polarized light) irradiated from the light source unit 51 is made into a bundle of substantially parallel rays by the coupling lens 52. Then, the parallel rays become incident on the polarization beam splitter 54. A large portion of the beam is transmitted through the polarization beam splitter 54 maintaining its parallel state, is circularly polarized by the ¼ wave plate 55, and is condensed into a fine beam spot on the target recording layer of the optical disk 15 via the objective lens 60. The beam reflected from the optical disk 15 (including signal light components and stray light components) becomes circularly polarized in an opposite rotating direction (with respect to that of the circularly polarized rays irradiated to the optical disk 15) and is again made into substantially parallel rays by the objective lens 60. Then, the reflected bundle of parallel rays are made into linearly polarized light (in this example, S polarized light) that perpendicularly intersect with the direction of the irradiated rays at the ¼ wave plate 55. Then, the reflected beam becomes incident on the polarization beam splitter 54. The beam reflected in the –Z direction by the polarization beam splitter 54 is condensed at the lens 61.

Then, the reflected beam, which are transmitted through the lens 61, becomes incident on the ¼ wave plate 62. The signal light and the stray light included in the reflected beam are both S polarized light at the optical paths A, B between the lens 61 and the ¼ wave plate 62 (See FIGS. 5A and 5B). The ¼ wave plate 62 provides a phase difference of +¼ wave length with respect to the beam incident on the area 62a and provides a phase difference of –¼ wave length with respect to the beam incident on the area 62b (See FIG. 6A). Thereby, the signal light and the stray light are both circularly polarized light in the clockwise direction (right circularly polarized light) in the area 1 at the optical path C and are both circularly polarized light in the clockwise direction (right circularly polarized light) in the area 2 at the optical path C. Furthermore, in the area 1 at the optical path D, although the stray light remains as a circularly polarized light in the clockwise direction (right circularly polarized light), the signal light becomes a circularly polarized light in the counter-clockwise direction (left circularly polarized light). Furthermore, in the area 2 at the optical path D, although the stray light remains as a circularly polarized light in the counter-clockwise direction (left circularly polarized light), the signal light becomes a circularly polarized light in the clockwise direction (right circularly polarized light).

Then, the reflected beam, which are transmitted through the ¼ wave plate 62, becomes incident on the ¼ wave plate 63. The ¼ wave plate 63 provides a phase difference of +¼ wavelength with respect to the beam incident on the area 63a and provides a phase difference of –¼ wavelength with respect to the beam incident on the area 63b (See FIG. 7A). In the optical paths between the ¼ wave plate 63 and the polarization optical element 64 (optical paths E and F), the signal light is an S polarized light and the stray light is a P polarized light.

Then, the reflected beam, which are transmitted through the ¼ wave plate 63, becomes incident on the polarization optical element 64. The polarization optical element 64 only allows the S polarized components included in the beam from the ¼ wave plate 63 to transmit therethrough. Accordingly, the beam at the optical path G only includes signal light components. In other words, the signal light components included in the reflected beam are extracted.

Then, the reflected beam, which are transmitted through the polarization optical element 64, is received by the optical detecting unit PD via the condenser lens 58. A photo-electric conversion process is performed on the reflected beam at each optical detector (or optical detecting area) in the optical detecting unit PD. Then, the optical detecting unit PD outputs photo-electric converted signal to the reproduction signal process circuit 28. Since only signal light components (signal light) included in the reflected beam are received at the optical detecting unit PD, the optical detecting unit PD can output the photo-electric converted signals having high S/N ratio.

Next, the optical system 70 according to a modified embodiment of the present invention is described. In this modified embodiment of the present invention, the optical system 70 shown in FIG. 3B includes a lens (condensing optical element) 61, two ½ wave plates (62a, 62b), and two polarizing optical element (64a, 64b).

The lens 61, being situated at the –Z side of the polarization beam splitter 54, condenses the returning beam reflected from the polarization beam splitter 54. Since the translucent film MB0 and the reflection film MB1 are separated from each other in the focus direction, the focus point of the first reflected light and the focus point of the second reflected light do not match, that is, the focus point of the first reflected light and the focus point of the second reflected light are separated from each other in the optical axis direction of the lens 61.

Figure 5D:
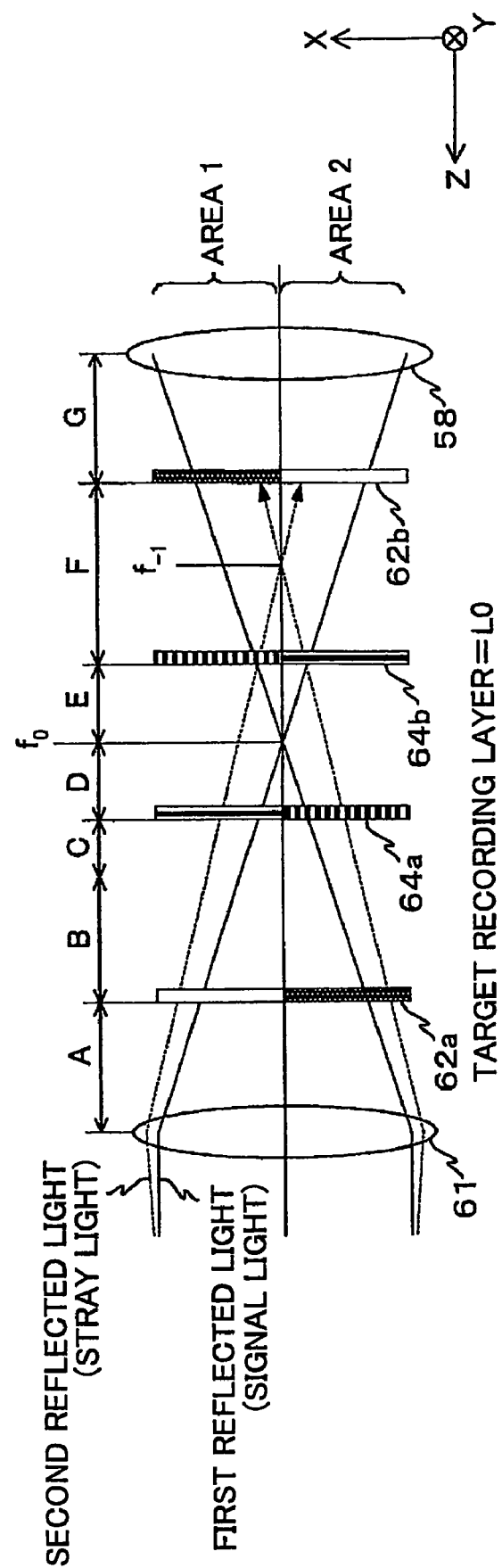

For example, as shown in FIG. 5C, in a case where the target recording layer is the second recording layer L1, the focus point of the first reflected light transmitted through the lens 61 is set as "$f_{+1}$" and the focus point of the second reflected light transmitted through the lens 61 is set as "$f_0$". Furthermore, as shown in FIG. 5D, in a case where the target recording layer is the first recording layer L0, the focus point of the first reflected light transmitted through the lens 61 is set as "$f_0$" and the focus point of the second reflected light transmitted through the lens 61 is set as "$f_{-1}$". That is, the focus point of the signal light is set as "$f_0$". Meanwhile, the focus point of the stray light reflected from a recording layer which is situated closer to the objective lens 60 compared to the target recording layer is set as "$f_{+1}$". The focus point of the stray light reflected from a recording layer which is situated farther from the objective lens 60 compared to the target recording layer is set as "$f_{-1}$". Furthermore, the +X side of the optical axis of the lens 61 is hereinafter also referred to "area 1", and the –X side of the optical axis of the lens 61 is hereinafter also referred to as "area 2" (See FIGS. 5C and 5D).

Figure 6B:
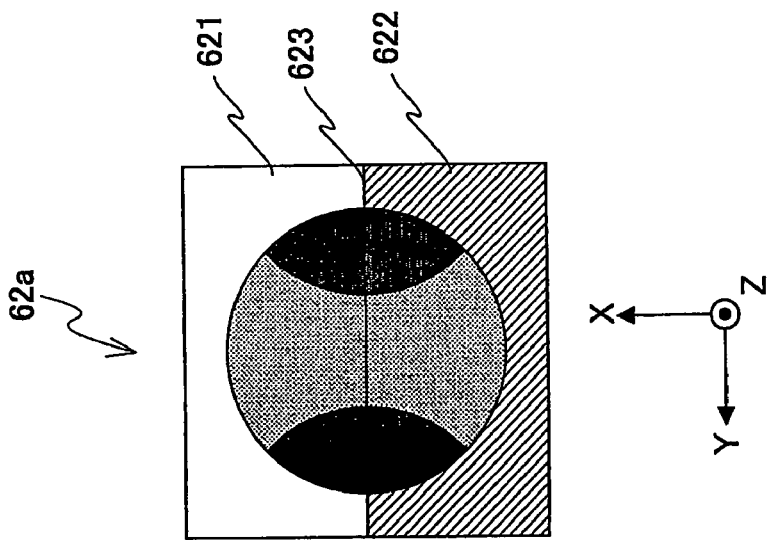
FIGS. 6B and 6C are schematic drawings for describing ½ wave plates according to another embodiment of the present invention.

The ½ wave plate (first polarization changing element) 62a is positioned on the –Z side of the lens 61 and is situated between the lens 61 and the focus point $f_{+1}$ (See FIG. 5C). For example, as shown in FIG. 6B, the ½ wave plate 62a is divided into two areas (621, 622) by a dividing line 623 extending in the Y direction. In this example, the area on the +X side with respect to the dividing line 623 is indicated as area 621, and the area on the –X side with respect to the dividing line 623 is indicated as area 622. The area 621 allows the incident light to transmit therethrough as is. The area 622 provides a phase difference of ½ wavelength (+½ wavelength) with respect to the beam incident on the ½ wave plate 62a. It is to be noted that "+½ wavelength" includes "+½× (2n+1) wavelength", wherein "n" is a natural number. In a case where the objective lens 60 shifts in the tracking direction, the returning beam incident on the ½ wave plate 62a shifts to a direction corresponding to the tracking direction (in this example, the Y direction).

Figure 7B:
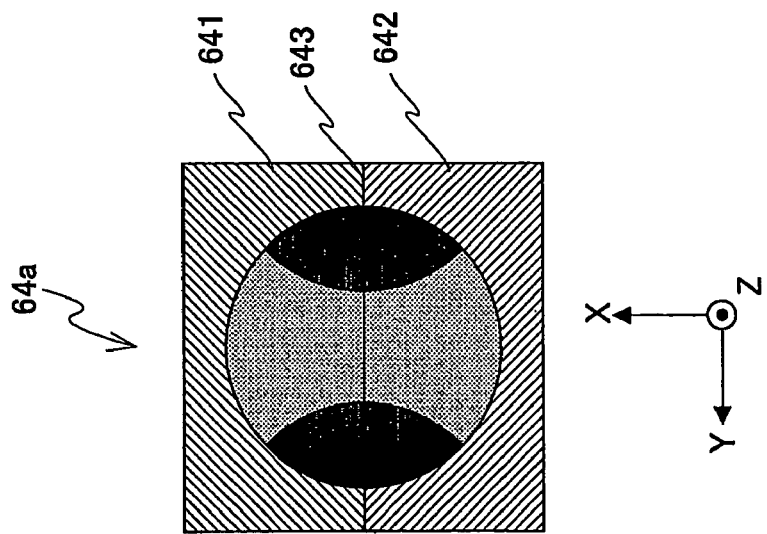
FIGS. 7B and 7C are schematic drawings for describing optical polarizing elements according to another embodiment of the present invention.

The polarizing optical element 64a (first separating element) is positioned between the focus point $f_{+1}$ and the focus point $f_0$ (See FIG. 5B). For example, as shown in FIG. 7B, the polarizing optical element 64a is divided into two areas (641, 642) by a dividing line 643 extending in the Y direction. In this example, the area on the +X side with respect to the dividing line 643 is indicated as area 641, and the area on the −X side with respect to the dividing line 643 is indicated as area 642. The area 641 allows S polarized light to transmit therethrough and either reflects or absorbs P polarized light. The area 642 allows P polarized light to transmit therethrough and either reflects or absorbs S polarized light. In a case where the objective lens 60 shifts in the tracking direction, the returning beam incident on the polarizing optical element 64a shifts to a direction corresponding to the tracking direction.

Figure 7C:
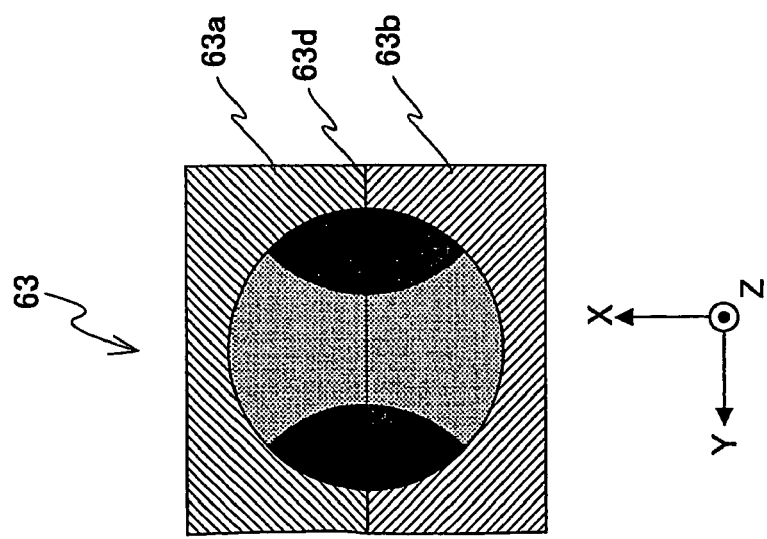

The polarizing optical element 64b (second separating element) is positioned between the focus point $f_0$ and the focus point $f_{-1}$ (See FIG. 5C). For example, as shown in FIG. 7C, the polarizing optical element 64b is divided into two areas (645, 646) by a dividing line 647 extending in the Y direction. In this example, the area on the +X side with respect to the dividing line 647 is indicated as area 645, and the area on the −X side with respect to the dividing line 647 is indicated as area 646. The area 645 allows P polarized light to transmit therethrough and either reflects or absorbs S polarized light. The area 646 allows S polarized light to transmit therethrough and either reflects or absorbs P polarized light. In a case where the objective lens 60 shifts in the tracking direction, the returning beam incident on the polarizing optical element 64b shifts to a direction corresponding to the tracking direction.

Figure 6C:
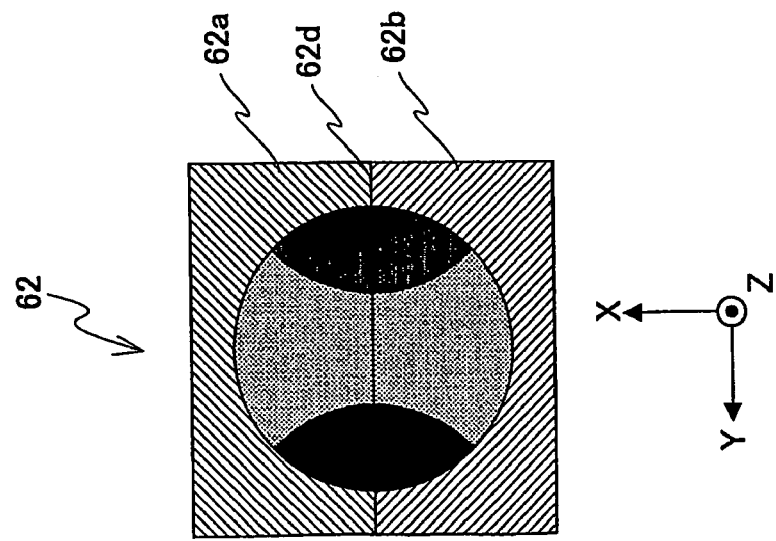

The ½ wave plate (second polarization changing element) 62b is situated between the polarizing optical element 64b and the condensing lens 58 (See FIG. 5D). For example, as shown in FIG. 6C, the ½ wave plate 62b is divided into two areas (625, 626) by a dividing line 627 extending in the Y direction. In this example, the area on the +X side with respect to the dividing line 627 is indicated as area 625, and the area on the −X side with respect to the dividing line 627 is indicated as area 626. The area 625 provides a phase difference of ½ wavelength with respect to the beam incident on the ½ wave plate 62b. The area 626 allows the incident light to transmit therethrough. In a case where the objective lens 60 shifts in the tracking direction, the returning beam incident on the ½ wave plate 62b shifts to a direction corresponding to the tracking direction.

For example, a twist nematic liquid crystal, a sub-wavelength wire-grid, or a photonic crystal may be used as the ½ wave plate 62a, 62b.

Next, the operation of the above-described optical pickup apparatus 23 according to the modified embodiment of the present invention is described with reference to FIGS. 5C, 5D, and FIG. 8B. Here, with respect to the optical axis direction of the lens 61, the optical path between the lens 61 and the ½ wave plate 62a is referred to as "optical path A", the optical path between the ½ wave plate 62a and the focus point $f_{+1}$ is referred to as "optical path B", the optical path between the focus point $f_{+1}$ and the polarizing optical element 64a is referred to as "optical path C", the optical path between the polarizing optical element 64a and the focus point $f_0$ is referred to as "optical path D", the optical path between the focus point $f_0$ and the polarizing optical element 64b is referred to as "optical path E", the optical path between the polarizing optical element 64b and the ½ wave plate 62b is referred to as "optical path F", and the optical path between the ½ wave plate 62b and the condenser lens 58 is referred to as "optical path G" (See FIGS. 5C and 5D).

The beam of the direct polarized light (in this example, P polarized light) irradiated from the light source unit 51 is made into a bundle of substantially parallel rays by the coupling lens 52. Then, the parallel rays become incident on the polarization beam splitter 54. A large portion of the beam is transmitted through the polarization beam splitter 54 maintaining its parallel state, is circularly polarized by the ¼ wave plate 55, and is condensed into a fine beam spot on the target recording layer of the optical disk 15 via the objective lens 60. The beam reflected from the optical disk 15 (including signal light components and stray light components) becomes circularly polarized in an opposite rotating direction (with respect to that of the circularly polarized rays irradiated to the optical disk 15) and is again made into substantially parallel rays by the objective lens 60. Then, the reflected bundle of parallel rays are made into linearly polarized light (in this example, S polarized light) that perpendicularly intersect with the direction of the irradiated rays at the ¼ wave plate 55. Then, the reflected beam becomes incident on the polarization beam splitter 54. The beam reflected in the −Z direction by the polarization beam splitter 54 is condensed at the lens 61.

[In a Case where the Target Recording Layer is L0]

Then, the reflected beam, which are transmitted through the lens 61, becomes incident on the ½ wave plate 62a. The signal light and the stray light included in the reflected beam are both S polarized light at the optical path A between the lens 61 and the ½ wave plate 62a (See FIG. 5D). The ½ wave plate 62 allows the beam incident on the area 621 to transmit therethrough and provides a phase difference of ½ wave length with respect to the beam incident on the area 622. Thereby, the signal light and the stray light are both S polarized light in the area 1 at the optical path B and are both P polarized light in the area 2 at the optical path B. Furthermore, both the signal light and the stray light remain as S polarized light in the area 1 at the optical path C, and both the signal light and the stray light remain as P polarized light in the area 1 at the optical path C.

Then, the reflected beam, which are transmitted through the ½ wave plate 62a, becomes incident on the polarizing optical element 64a. Since both the signal light and the stray light incident on the area 641 are S polarized light, each of the lights is transmitted through the area 641. Since both the signal light and the stray light incident on the area 642 are P polarized light, each of the lights is transmitted through the area 642. Accordingly, both the signal light and the stray light remain as S polarized light in the area 1 at the optical path D, and both the signal light and the stray light remain as P polarized light in the area 2 at the optical path D. Furthermore, although the stray light remain as S polarized light in the area 1 at the optical path E, the signal light becomes P polarized-light in the area 1 at the optical path E. Furthermore, although the stray light remain as P polarized light in the area 2 at the optical path E, the signal light becomes S polarized light in the area 2 at the optical path E.

Then, the reflected beam, which are transmitted through the polarizing optical element 64a, becomes incident on the polarizing optical element 64b. Since the stray light incident on the area 645 is S polarized light, the incident stray light is reflected or absorbed at the area 645. Since the signal light incident on the area 645 is P polarized light, the incident signal light is transmitted through the area 645. Since the signal light incident on the area 646 is S polarized light, the incident signal light is transmitted through the area 646.

Accordingly, the reflected beam incident on the area 1 at the optical path F only includes P polarized signal light, and the reflected beam incident on the area 2 at the optical path F only includes S polarized signal light. In other words, the signal light (signal light components) and the stray light (stray light components) included the reflected beam are extracted.

Then, the reflected beam, which are transmitted through the polarizing optical element 64b, is incident on the ½ wave plate 62b. The ½ wave plate 62b provides a phase difference of ½ wave length with respect to the beam incident on the area 625 and allows the beam incident on the area 626 to transmit therethrough. Thereby, the signal light becomes S polarized light in the area 1 at the optical path G, and the signal light remains as S polarized light in the area 2 at the optical path G.

[In a Case where the Target Recording Layer is L1]

Then, the reflected beam, which are transmitted through the lens 61, becomes incident on the ½ wave plate 62a. The signal light and the stray light included in the reflected beam are both S polarized light at the optical path A between the lens 61 and the ½ wave plate 62a (See FIG. 5C). The ½ wave plate 62a allows the beam incident on the area 621 to transmit therethrough and provides a phase difference of ½ wave length with respect to the beam incident on the area 622. Thereby, the signal light and the stray light are both S polarized light in the area 1 at the optical path B and are both P polarized light in the area 2 at the optical path B. Furthermore, both the signal light and the stray light remain as S polarized light in the area 1 at the optical path C, and both the signal light and the stray light remain as P polarized light in the area 1 at the optical path C.

Then, the reflected beam, which are transmitted through the ½ wave plate 62a, becomes incident on the polarizing optical element 64a. Since the signal light incident on the area 641 is S polarized light, the signal light transmits through the area 642. On the other hand, since the stray light incident on the area 641 is P polarized light, the stray light is reflected or absorbed at the area 641. Since the signal light incident on the area 642 is P polarized light, the signal light is transmitted through the area 642. On the other hand, since the stray light incident on the area 642 is S polarized light, the stray light is reflected or absorbed at the area 642. Accordingly, the reflected beam includes only S polarized signal light in the area 1 at the optical path D, and the reflected beam includes only P polarized signal light in the area 2 at the optical path D. Accordingly, the beam at the optical path D include only signal light (signal light components). That is, the signal light and the stray light included in the reflected beam can be extracted.

The signal light becomes P polarized light in the area 1 at the optical path E. Furthermore, the signal light in the area 2 at the optical path E becomes S polarized light.

Then, the reflected beam, which are transmitted through the polarizing optical element 64a, becomes incident on the polarizing optical element 64b. Since the signal light incident on the area 645 is P polarized light, the incident signal light transmits through the area 645. Since the signal light incident on the area 646 is S polarized light, the incident signal light transmits through the area 646.

Then, the reflected beam, which are transmitted through the polarizing optical element 64b, is incident on the ½ wave plate 62b. The ½ wave plate 62b provides a phase difference of ½ wave length with respect to the beam incident on the area 625 and allows the beam incident on the area 626 to transmit therethrough. Thereby, the signal light becomes S polarized light in the area 1 at the optical path G, and the signal light remains as S polarized light in the area 2 at the optical path G.

Then, the reflected beam, which are transmitted through the ½ wave plate 62b, is received by the optical detecting unit PD via the condenser lens 58. A photo-electric conversion process is performed on the reflected beam at each optical detector (or optical detecting area) in the optical detecting unit PD. Then, the optical detecting unit PD outputs photo-electric converted signal to the reproduction signal process circuit 28. Since only signal light components (signal light) included in the reflected beam are received at the optical detecting unit PD, the optical detecting unit PD can output the photo-electric converted signals having high S/N ratio.

Figure 9A:
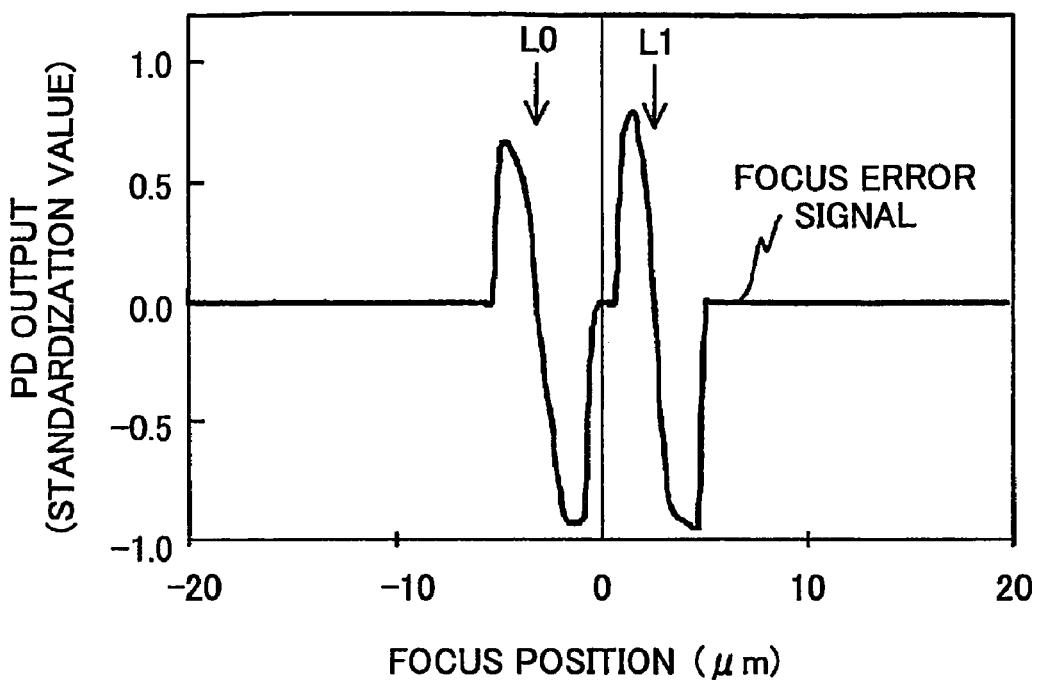
FIGS. 9A and 9B are graphs for describing focus error signals and total signals obtained by the reproduction signal process circuit shown in FIG. 1 according to an embodiment of the present invention.
Figure 9B:
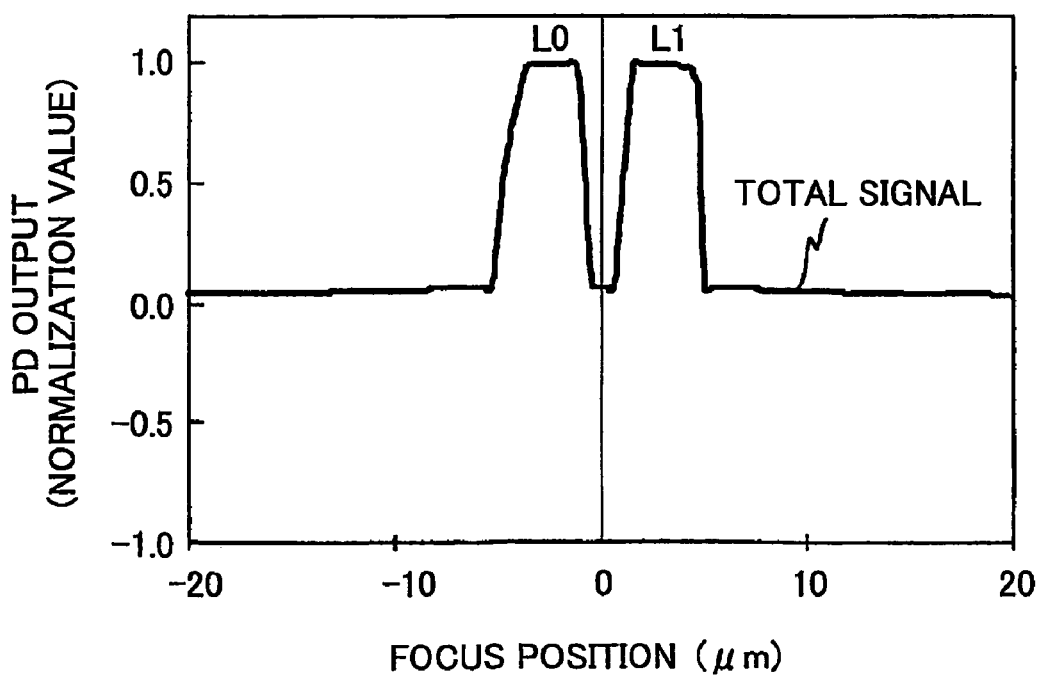
Figure 10A:
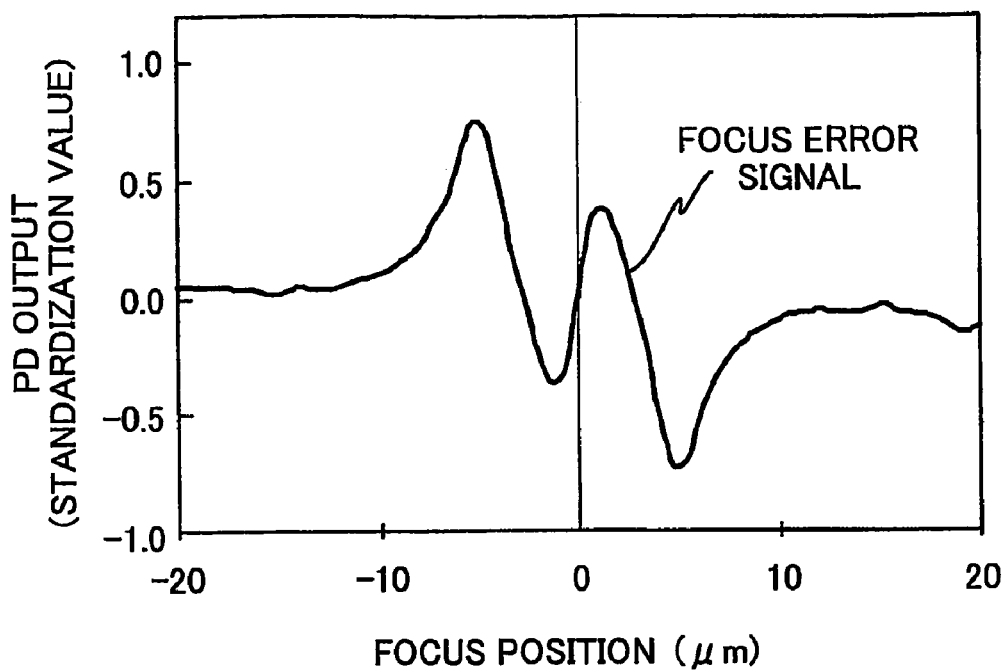
FIGS. 10A and 10B are graphs for describing focus error signals and total signals obtained according to a conventional example.
Figure 10B:
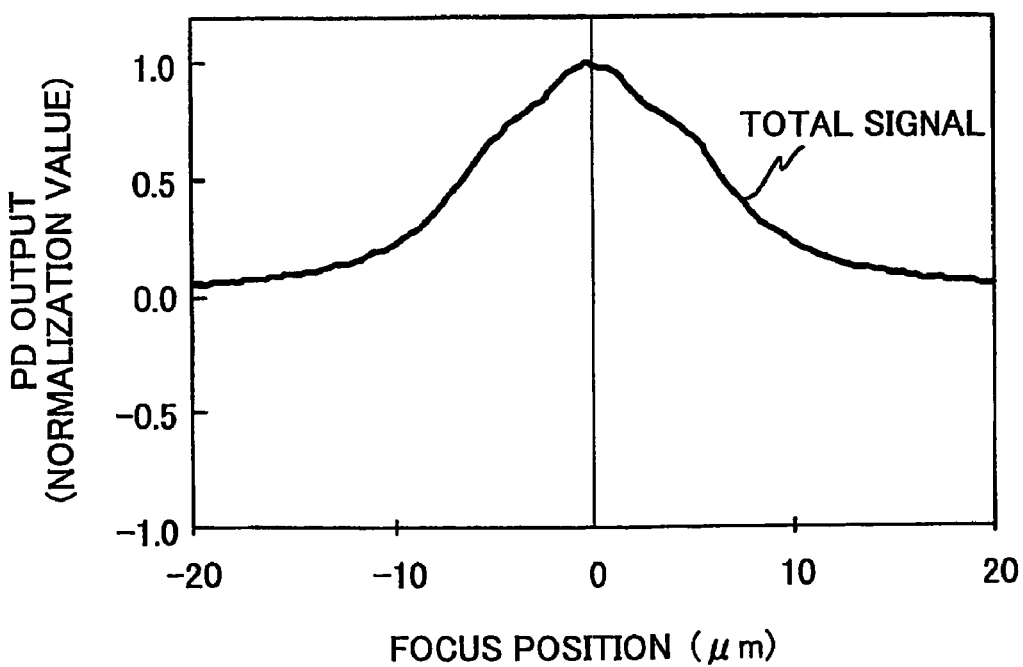

Next, returning to FIG. 1, the reproduction signal process circuit 28 according to an embodiment of the present invention obtains, for example, servo signals (including, for example, focus error signals and track error signals), address information, synchronization signals, and RF signals based on signals (photo-electric converted signals) output from the optical detecting unit PD. Since the photo-electric converted signals output from the optical detecting unit PD have high S/N ratio, the reproduction signal process circuit 28 can accurately obtain servo signals, address information, synchronization information (synchronization signals), and RF signals. For example, as shown in FIG. 9A, the linear portion of the focus error signal is longer compared to that of a conventional example (shown in FIG. 10A). This allows the amount of deviation (positional deviation) of focus to be accurately detected. The vertical axis in FIG. 9A is standardized. For example, in a case where the optical detecting unit PD is divided into two optical detecting areas by a dividing line extending in a direction corresponding to the tracking direction, the vertical axis of FIG. 9A is expressed as (Sa−Sb)/(Sa+Sb) wherein the signals output from the respective divided areas are Sa, Sb. Furthermore, as shown in FIG. 9B, the total signal (total of adding the photo-electric converted. signals) including the RF signals is also stable compared to that of the conventional example (shown in FIG. 10B), the RF signals can be accurately obtained. The vertical axis in FIG. 9B is normalized, in which the maximum value of the total signal is set as 1. FIGS. 9A and 9B is based on data in a case where the thickness of the intermediate layer ML is approximately 9 μm, the NA (numerical aperture) of the objective lens is approximately 0.65, and the wavelength of the laser beam is approximately 660 nm.

The obtained servo signals are output to the drive control circuit 26, the obtained address information is output to the CPU 40, and the synchronization signals are output to the encoder 25 or the drive control circuit 26, for example. Furthermore, the reproduction signal process circuit 28 performs a decoding process and an error detection process on the RF signals. In a case where an error is detected, an error correction process is performed on the RF signals. Then, the corrected signals are stored as reproduction data in the buffer RAM 34 via the buffer manager 37. The address signals included in the reproduction data is output to the CPU 40.

The drive control circuit 26 generated drive signals of the tracking actuator for correcting the positional deviation of the objective lens 60 with respect to the tracking direction based on the track error signals from the reproduction signal process circuit 28. Furthermore, the drive control circuit 26 generates drive signals of the focusing actuator AC for correcting focus deviation of the objective lens 60 based on the focus error signals from the reproduction signal process circuit 28. The drive signals of each of the actuators are output to the optical pickup apparatus 23. Thereby, tracking control and focus control is performed. Furthermore, the drive control circuit 26 generates drive signals for driving the seek motor 21 and drive signals for driving the spindle motor 22 based on the instructions from the CPU 40. The drive signals of each of the motors are output to the seek motor 21 and the spindle motor 22, respectively.

The buffer RAM 34 temporarily stores data to be recorded in the optical disk 15 (recording data) and data to be reproduced from the optical disk 15 (reproduction data). The buffer manager 37 manages the input/output of data to the buffer RAM 34.

The encoder 25 extracts recording data stored in the buffer RAM 34 via the buffer manager 37 based on the instructions from the CPU 40. The encoder 25 performs data modulation and addition of error correction codes on the extracted recording data, to thereby generate signals (write signals) for writing the data onto the optical disk 15. The generated write signals are output to the laser control circuit 24.

The laser control circuit 24 controls the irradiation power of the semiconductor laser LD. For example, in recording data in the optical disk 15, the laser control circuit 24 generates drive signals for driving semiconductor laser LD based on write signals, recording conditions, and the irradiation characteristics of the semiconductor laser LD.

The interface 38 serves as an interface for performing bi-directional communication with an upper level apparatus (or a host) 90 such as a personal computer. The interface 38 complies with interface standards such as ATAPI (AT Attachment Packet Interface), SCSI (Small Computer System Interface), and USB (Universal Serial Bus).

The flash memory (ROM) 39 stores, for example, various programs written in a code readable for the CPU 40, recording conditions (e.g. recording power, recording strategy information) and irradiation characteristics of the semiconductor laser LD.

The CPU 40 controls various parts in accordance with the various programs stored in the flash memory 39, and stores data used for the control in the RAM 41 and the buffer RAM 34.

Figure 11:
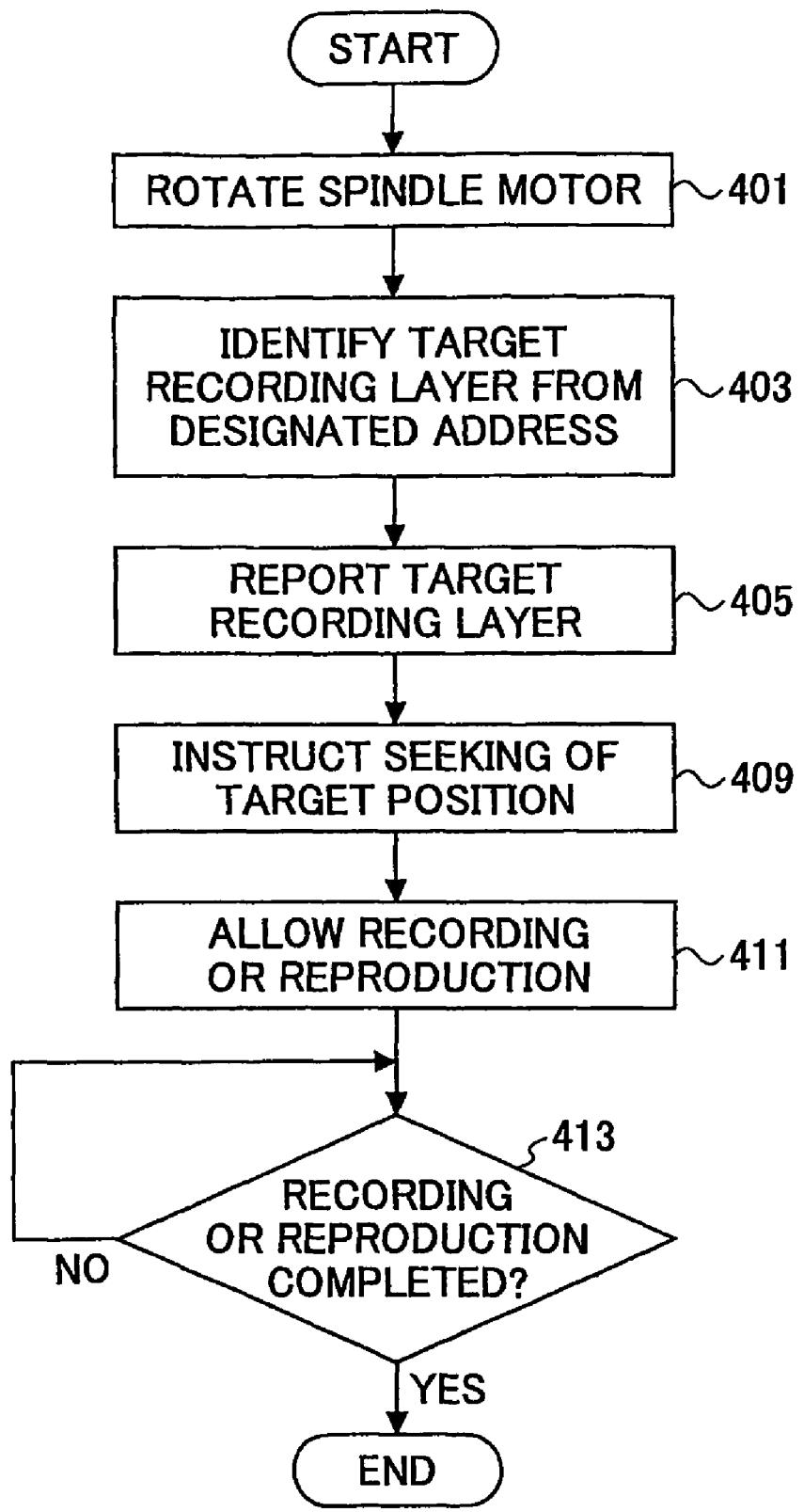
FIG. 11 is a flowchart for describing the processes (operation) of an optical disk apparatus according to an embodiment of the present invention in a case of receiving an access request from an upper level apparatus.

Next, with reference to FIG. 11, an operation of the optical disk apparatus 20 according to an embodiment of the present invention is described in a case where the optical disk apparatus 20 receives an access request from the upper apparatus 90.

The flowchart of FIG. 11 shows an algorithm including a series of steps executed by the CPU 40.

Upon receiving a recording command or a reproduction command from the upper apparatus 90 (hereinafter referred to as "request command"), the operation of the CPU 40 is started by setting a header address of the program corresponding to the flowchart shown in FIG. 11 to a program counter of the CPU 40.

In Step S401, the CPU 40 instructs the drive control circuit 26 to rotate the optical disk 15 at a predetermined linear (or angular speed). The CPU 40 also reports the reception of the request command from the upper apparatus 90 to the reproduction signal process circuit 28.

Then, in Step S403, the CPU 40 extracts a designated address from the request command, and identifies the target recording layer (whether it is the first recording layer L0 or the second recording layer L1) based on the designated address.

Then, in Step S405, the CPU 40 reports information regarding the identified target recording layer to, for example, the drive control circuit 26.

Then, in Step S409, the CPU 40 instructs the drive control circuit 26 to form a beam spot in the vicinity of a target position corresponding to the designated address. Thereby, the seek operation is executed. If it is unnecessary to execute the seek operation, the processes in Step S409 may be skipped.

Then, in Step S411, the CPU 40 allows recording of data or reproduction of data in accordance with the request command.

Then, in Step S413, the CPU 40 determines whether the recording process or the reproduction process is completed. If the recording process or the reproduction process is not completed, the CPU 40 determines that the completion of the recording process or the reproduction process as negative and reattempts the determination after a predetermined time elapses. If the recording process or the reproduction process is completed, the CPU 40 determines that the completion of the recording process or the reproduction process as affirmative, to thereby end the operation.

In the optical disk apparatus 20 according to an embodiment of the present invention, the reproduction signal process circuit 28, the CPU 40, and the program executed by the CPU 40 are included in a process apparatus according to an embodiment of the present invention. Moreover, the processes (steps) executed by the CPU 40 may also be partly or entirely executed using other additional hardware.

With the above-described optical pickup apparatus 23 according to an embodiment of the present invention, the bundle of linearly polarized rays (in this example, P polarized light) irradiated from the light source unit 51 is condensed to form a fine beam spot on the target recording layer of the optical disk 15 via the coupling lens 52, the polarization beam splitter 54, the ¼ wave plate 55, and the objective lens 60. The reflected beam (including signal light and stray light) reflected from the optical disk 15 is made into linearly polarized light (in this example, S polarized light) that perpendicularly intersects with the direction of the rays irradiated from the light source unit 51 and is incident on the polarization beam splitter 54. The beam reflected in the −Z direction in the polarization beam splitter 54 becomes converged light at the lens 61 (condensing optical element) and is incident on the ¼ wave plate 62 (first polarization changing element). The ¼ wave plate 62 provides a phase difference of +¼ wavelength with respect to the beam incident on the area 62a and provides a phase difference of −¼ wavelength with respect to the beam incident on the area 62b. The reflected beam, which is transmitted through the ¼ wave plate 62, is incident on the ¼ wave plate 63 (second polarization changing element). The ¼ wave plate 63 provides a phase difference of +¼ wavelength with respect to the beam incident on the area 63a and provides a phase difference of −¼ wavelength with respect to the beam incident on the area 63b. Accordingly, the signal light transmitted through the ¼ wave plate 63 becomes S polarized light and the stray light transmitted through the ¼ wave plate 63 becomes P polarized light. The reflected beam, which is transmitted through the ¼ wave plate 63, is incident on the polarizing optical element 64 (extracting element). The polarizing optical element 64 allows only the signal light in the reflected beam to transmit therethrough. In other words, The polarizing optical element 64 extracts the signal light from the reflected beam. The reflected beam, which is transmitted through the polarizing optical element 64, is received by the optical detecting unit PD via the condenser lens 58. Since the reflected beam received by the optical detecting unit PD only includes signal light (signal light components), photo-electric converted signals having high S/N ratio can be output. Therefore, predetermined signals from the optical disk 15 having plural recording layers can be accurately obtained.

Furthermore, since the dividing lines of the ¼ wave plate 62 and the ¼ wave plate 63 match the direction corresponding to the tracking direction, the signal light and the stray light can be precisely separated even in case where the objective lens 60 shifts to the tracking direction.

Furthermore, since the photo-electric converted signals having high S/N ratio are output from the optical pickup apparatus 23, access to an optical disk having plural recording layers can be precisely and stably executed. Therefore, information can be precisely reproduced from the optical disk having plural recording layers.

Figure 12A:
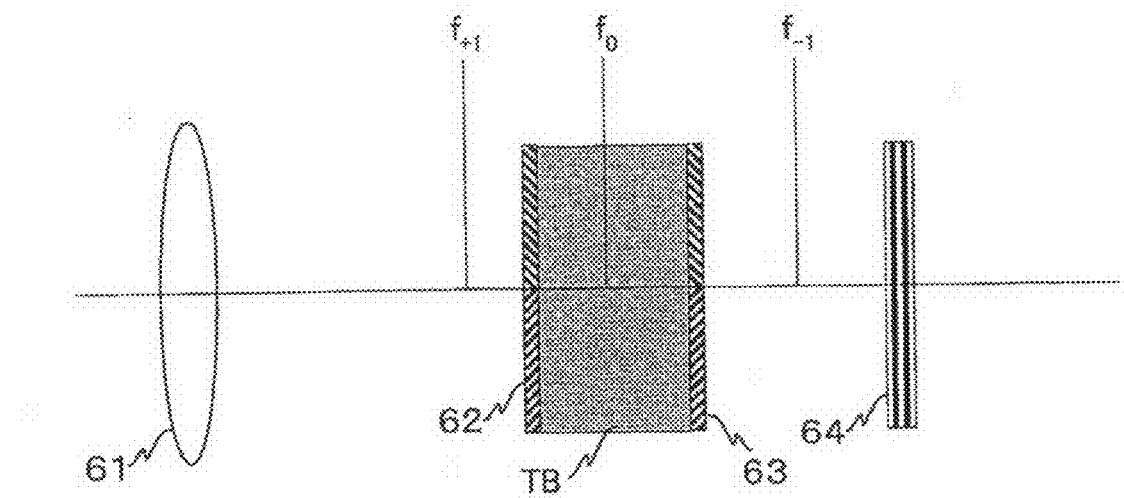
FIG. 12A is a schematic drawing for describing a first modified example of the optical system shown in FIG. 3A according to an embodiment of the present invention.

In one example, as shown in FIG. 12, the ¼ wave plate 62 and the ¼ wave plate 63 may also be formed as a united body via a transparent member TB having a refractive index greater than 1. This allows the dividing line 62d and the dividing line 63d to be easily positioned to face each other during a manufacturing process. Thus, the positions of each polarizing optical member can easily be defined. In other words, the assembly process and the positional adjustment process can be simplified. In this case, since the polarizing optical members are to be mounted onto the transparent member TB, it is preferable to use a sub-wavelength wire-grid or a photonic crystal since the sub-wavelength wire-grid and the photonic crystal can be formed relatively easily.

Figure 13A:
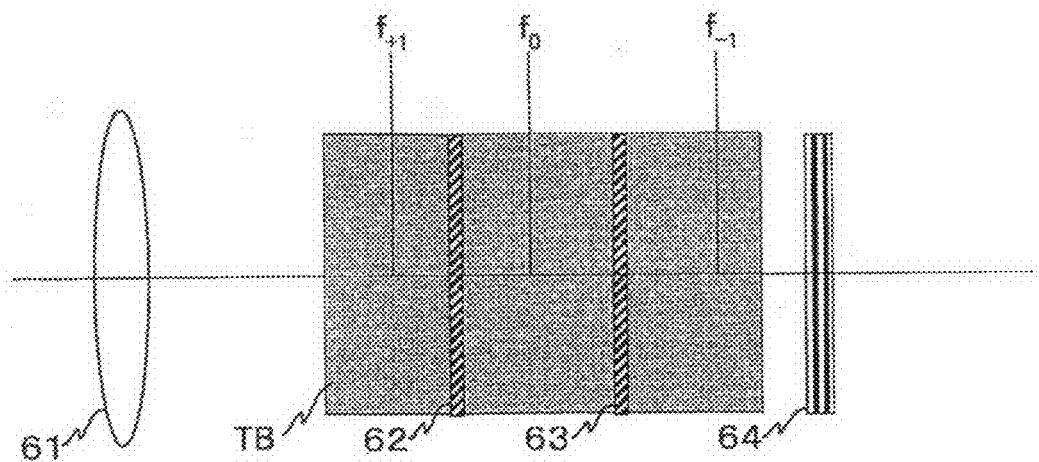
FIG. 13A is a schematic drawing for describing a second modified example of the optical system shown in FIG. 3A according to an embodiment of the present invention.
Figure 13B:
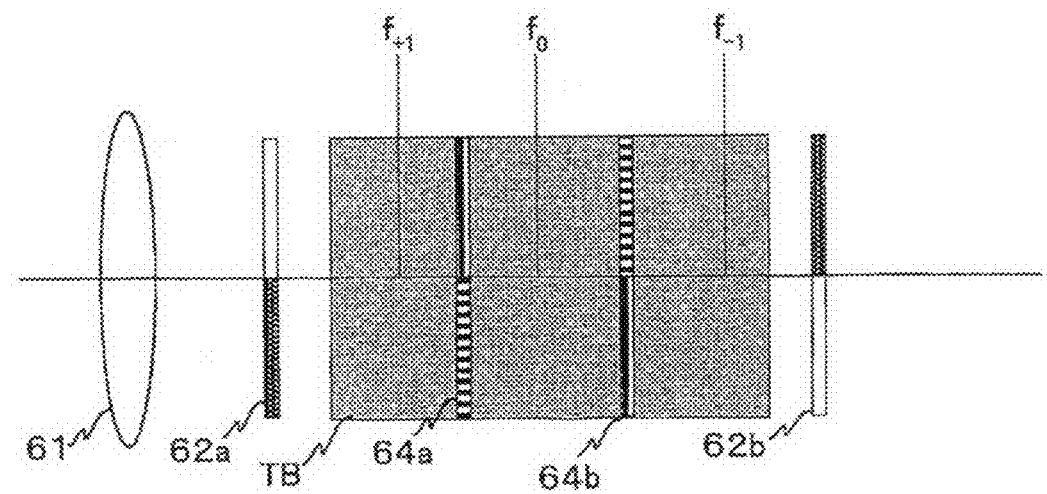
FIG. 13B is a schematic drawing for describing a second modified example of the optical system shown in FIG. 3B according to another embodiment of the present invention.

In another example according to the modified embodiment of the present invention, as shown in FIG. 13B, in addition to forming the polarizing optical elements as a united body via the transparent member TB having a refractive index greater than 1, the transparent member TB may also be provided between the focus point $f_{+1}$ and the polarizing optical element 64a and between the polarizing optical element 64b and the focus point $f_{-1}$, respectively. This enlarges the beam diameter of the reflected beam incident on each of the polarizing optical elements owing that the distance between the focus point $f_{+1}$ and the focus point $f_0$ and the distance between the focus point $f_0$ and the focus point $f_{-1}$ each becomes greater compared to the above-described embodiment of the present invention. Therefore, even in a case where the intermediate layer ML of the optical disk 15 is thin, the permissible error in matching the dividing lines of the ¼ wave plate 62, 63 can be increased. In other words, the assembly process and the positional adjustment process can be simplified. The relationship between the beam diameter and the thickness of the intermediate layer ML is shown in FIG. 14 in an exemplary case where the transparent member TB has a refractive index of 1.46.

Figure 15A:
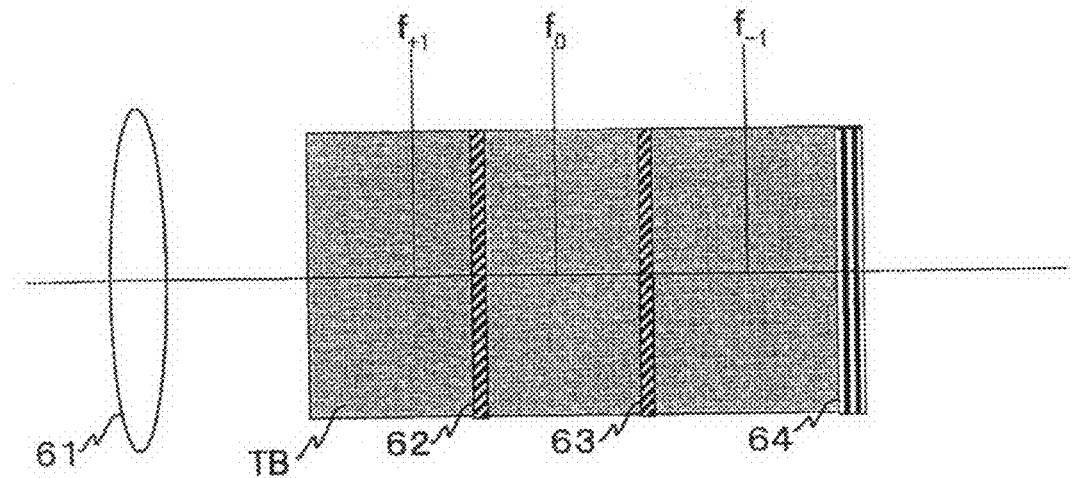
FIG. 15A is a schematic drawing for describing a third modified example of the optical system shown in FIG. 3A according to an embodiment of the present invention.

In another example, as shown in FIG. 15A, the ¼ wave plate 62, the ¼ wave plate 63, and the polarizing optical element 64 may be formed as a united body. In this case, the ¼ wave plate 62, the ¼ wave plate 63, and the polarizing optical element 64 are formed as a united body by providing a transparent, member TB having a refractive index greater than 1, for example, between the ¼ wave plate 62 and the ¼ wave plate 63 and the polarizing optical element 64 and also between the focus point $f_{+1}$ and the ¼ wave plate 62. Thereby, the assembly process and the positional adjustment process can be simplified.

Figure 16A:
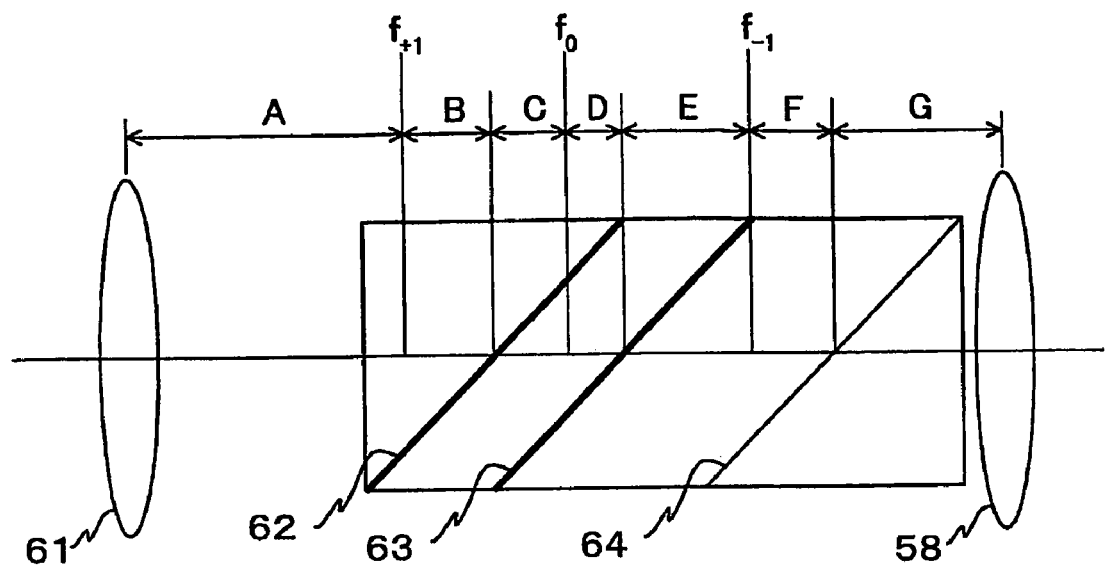
FIG. 16A is a schematic drawing for describing a fourth modified example of the optical system shown in FIG. 3A according to an embodiment of the present invention.

In another example, the ¼ wave plates 62, 63, and the polarizing optical element 64 each may be formed as a prism. As shown in FIG. 16A, the prisms may be formed as a united body. In this case, the ¼ wave plates 62, 63, and the polarizing optical element 64 may be formed as a prism by using, for example, a multilayer dielectric film.

Figure 17A:
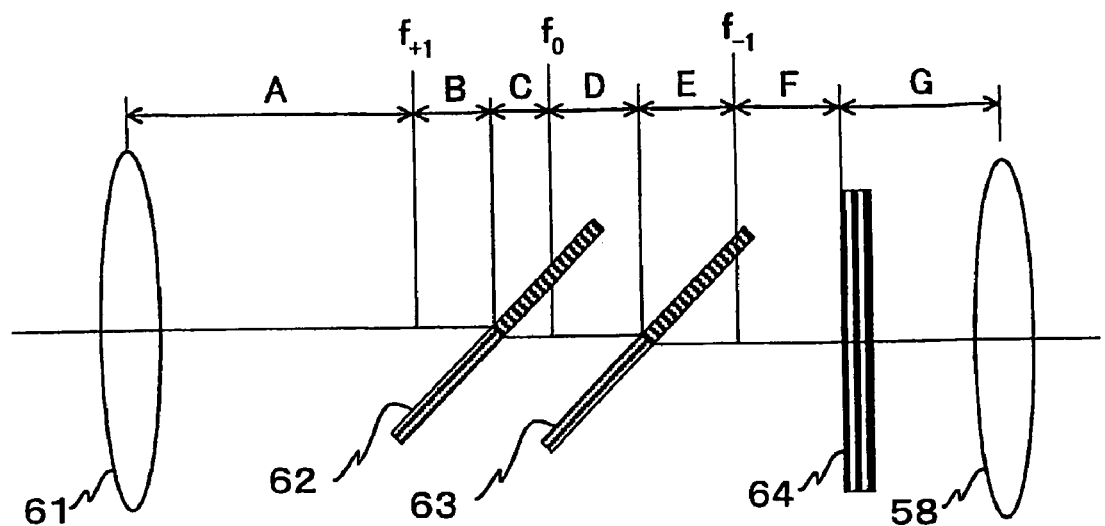
FIG. 17A is a schematic drawing for describing a fifth modified example of the optical system shown in FIG. 3A according to an embodiment of the present invention.

In another example, as shown in FIG. 17A, the ¼ wave plates 62, 63 may be inclined. This provides astigmatism to the reflected beam transmitted through the ¼ wave plates 62, 63. Accordingly, in a case where an astigmatism method is employed for performing focus error detection, a lens (e.g. cylindrical lens) for providing astigmatism shall not be required. That is, the number of components can be reduced.

Figure 18A:
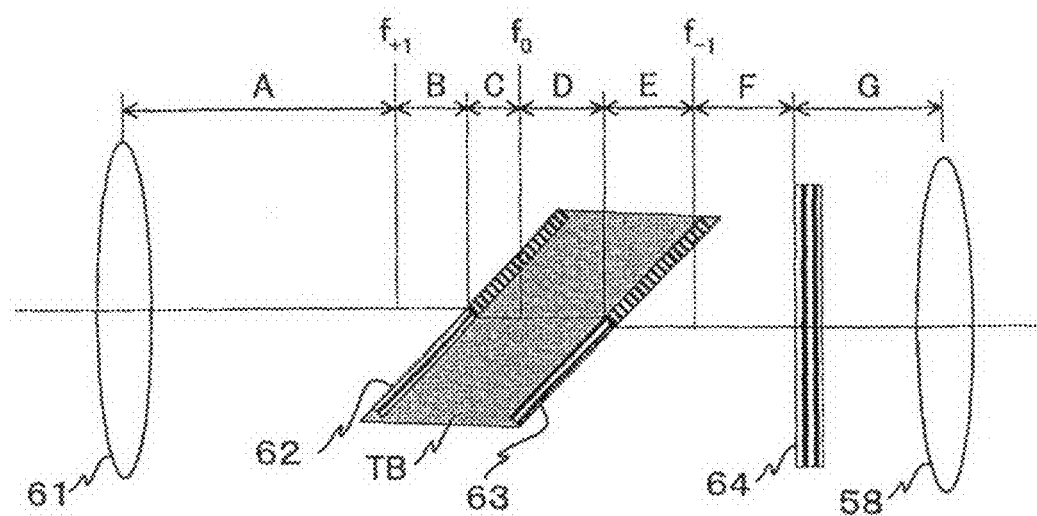
FIG. 18A is a schematic drawing for describing a sixth modified example of the optical system shown in FIG. 3A according to an embodiment of the present invention.

In another example, as shown in FIG. 18A, in addition to having the ¼ wave plates 62, 63 inclined, the ¼ wave plates may also be formed as a united body via a transparent member TB.

Figure 19:
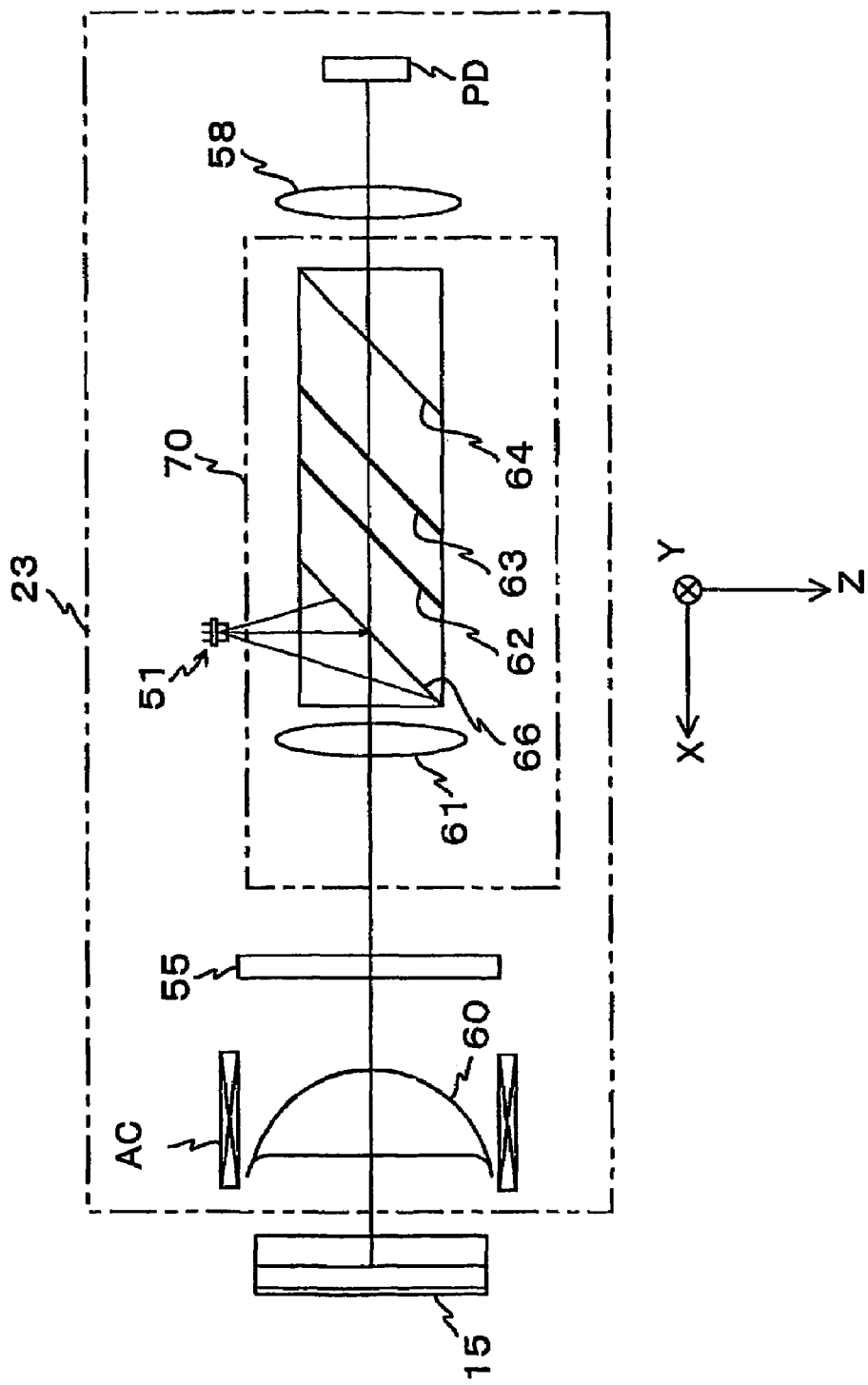
FIG. 19 is a schematic drawing for describing a first modified example of the optical pickup apparatus shown in FIG. 1 according to an embodiment of the present invention.

As shown in FIG. 19, a polarization separating optical element 66 (separating optical element) may be disposed between the lens 61 and the ¼ wave plate 62, so that a beam irradiated from the light source unit 51 is reflected by the polarization separating optical element 66, is made into substantially parallel rays by the lens 61, and is incident on the ¼ wave plate 55. Thereby, the coupling lens 52 and the polarization beam splitter 54 shall not be required. Accordingly, size reduction and cost reduction of the optical pickup apparatus can be achieved.

With the above-described optical pickup apparatus 23 according to the modified embodiment of the present invention, the bundle of linearly polarized rays (in this example, P polarized light) irradiated from the light source unit 51 is condensed to form a fine beam spot on the target recording layer of the optical disk 15 via the coupling lens 52, the polarization beam splitter 54, the ¼ wave plate 55, and the objective lens 60. The reflected beam (including signal light and stray light) reflected from the optical disk 15 is made into linearly polarized light (in this example, S polarized light) that perpendicularly intersects with the direction of the rays irradiated from the light source unit 51 and is incident on the polarization beam splitter 54. The beam reflected in the −Z direction in the polarization beam splitter 54 becomes converged light at the lens 61 (condensing optical element) and is incident on the ½ wave plate 62a (first polarization changing element). The ½ wave plate 62a allows the beam incident on the area 621 to transmit therethrough and provides a phase difference of ½ wavelength with respect to the beam incident on the area 622. The reflected beam, which is transmitted through the ½ wave plate 62a, is incident on the polarizing optical element 64a (first separating optical element). The polarizing optical element 64a allows the S polarized light to transmit through the area 641 and the P polarized light to transmit through the area 642. The reflected beam, which is transmitted through the polarizing optical element 64a, is incident on the polarizing optical element 64b (second separating optical element). The polarizing optical element 64b allows P polarized light to transmit through the area 645 and S polarized light to transmit through the area 646. The beam, which is transmitted through the polarizing optical element 64b, is incident on the ½ wave plate 62b (second polarization changing element). The ½ wave plate 62b provides a phase difference of ½ wavelength with respect to the beam incident on the area 625 and allows the beam incident on the area 626 to transmit therethrough. Thereby, the reflected beam, which is transmitted through the ½ wave plate 62b, only includes signal light. In other words, the signal light and the stray light included in the reflected beam can be extracted. The reflected beam, which is transmitted through the ½ wave plate 62b, is received by the optical detecting unit PD via the condenser lens 58. Since the reflected beam received by the optical detecting unit PD only includes signal light (signal light components), photo-electric converted signals having high S/N ratio can be output. Therefore, predetermined signals from the optical disk 15 having plural recording layers can be accurately obtained.

Furthermore, since the dividing lines of each ½ wave plate and each polarizing optical element match the direction corresponding to the tracking direction, the signal light and the stray light can be precisely separated even in case where the objective lens 60 shifts to the tracking direction.

Furthermore, since the photo-electric converted signals and RF signals having high S/N ratio are output from the optical pickup apparatus 23, access to an optical disk having plural recording layers can be precisely and stably executed.

According to the above-described modified embodiment of the present invention, the polarizing optical element 64b is described as allowing P polarized light to transmit through the area 645 and the S polarized light to be reflected or absorbed at the area 645 while allowing S polarized light to transmit through the area 646 and P polarized light to be reflected or absorbed at the area 646, the polarizing optical element 64b may also allow S polarized light to transmit through the area 645 and the P polarized light to be reflected or absorbed at the area 645 while allowing P polarized light to transmit through the area 646 and S polarized light to be reflected or absorbed at the area 646. In this case, the beam received by the optical detecting unit PD is P polarized light.

In another example according to the modified embodiment of the present invention, the characteristics of each ½ wave plate and each polarizing optical element at the areas 1 and 2 may be opposite with respect to the above-described modified embodiment of the present invention. That is, the signal light and the stray light are extracted by changing at least one of the polarization states of the signal light and the stray light so that the polarization state of the signal light and the polarization state of the stray light are different from each other.

Figure 12B:
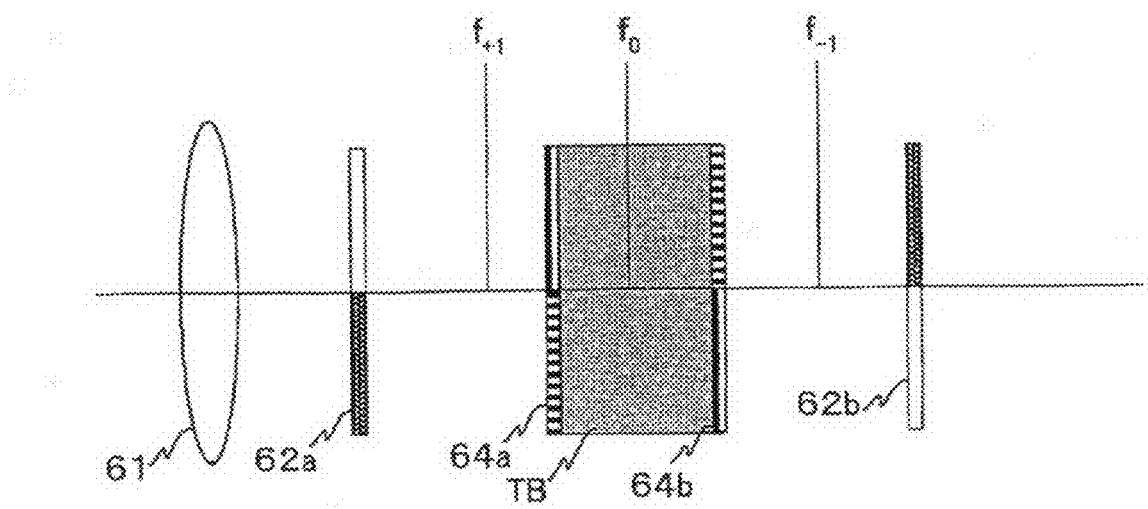
FIG. 12B is a schematic drawing for describing a first modified example of the optical system shown in FIG. 3B according to another embodiment of the present invention.

In another example according to the modified embodiment of the present invention, as shown in FIG. 12B, the polarizing optical element 64a and the polarizing optical element 64b may also be formed as a united body via a transparent member TB having a refractive index greater than 1. This allows the dividing line 643 and the dividing line 647 to be easily positioned to face each other during a manufacturing process. Thus, the positions of the ¼ wave plate 62 and the ¼ wave plate 63 can easily be defined. In other words, the assembly process and the positional adjustment process can be simplified. In this case, since the ¼ wave plate 62 and the ¼ wave plate 63 are to be mounted onto the transparent member TB, it is preferable to use a sub-wavelength wire-grid or a photonic crystal since the sub-wavelength wire-grid and the photonic crystal can be formed relatively easily.

In another example, as shown in FIG. 13A, in addition to forming the ¼ wave plate 62 and the ¼ wave plate 63 as a united body via the transparent member TB having a refractive index greater than 1, the transparent member TB may also be provided between the focus point $f_{+1}$ and the ¼ wave plate 62 and between the ¼ wave plate 63 and the focus point $f_{-1}$, respectively. This enlarges the beam diameter of the reflected beam incident on the ¼ wave plates 62, 63 owing that the distance between the focus point $f_{+1}$ and the focus point $f_0$ and the distance between the focus point $f_0$ and the focus point $f_{-1}$ each becomes greater compared to the above-described modified embodiment of the present invention.

Therefore, even in a case where the intermediate layer ML of the optical disk 15 is thin, the permissible error in matching the dividing lines of each polarizing optical element can be increased. In other words, the assembly process and the positional adjustment process can be simplified. The relationship between the beam diameter and the thickness of the intermediate layer ML is shown in FIG. 14 in an exemplary case where the transparent member TB has a refractive index of 1.46.

Figure 15B:
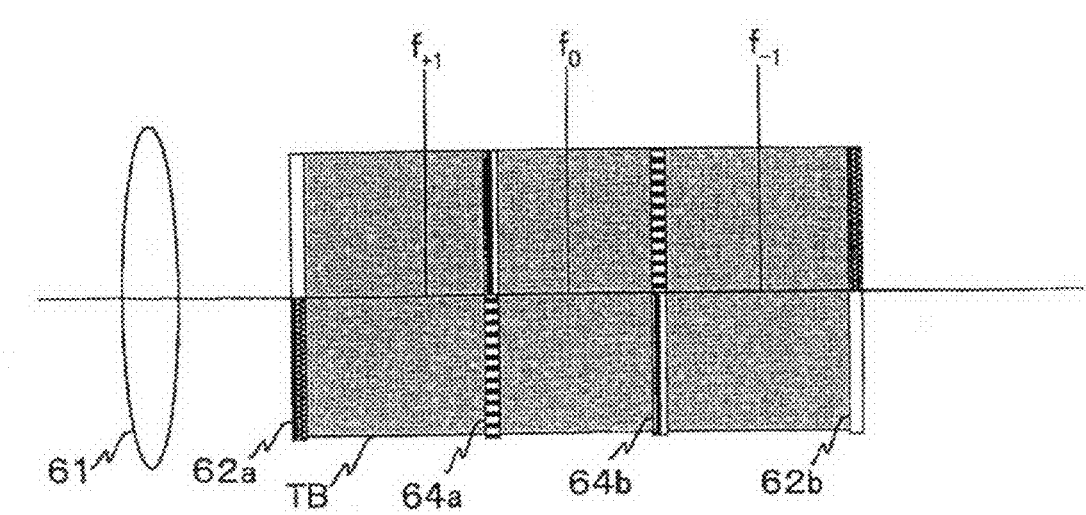
FIG. 15B is a schematic drawing for describing a third modified example of the optical system shown in FIG. 3B according to another embodiment of the present invention.

In another example according to the modified embodiment of the present invention, as shown in FIG. 15B, the respective ½ wave plates and the respective polarizing optical elements may be formed as a united body. Thereby, the assembly process and the positional adjustment process can be simplified.

Figure 16B:
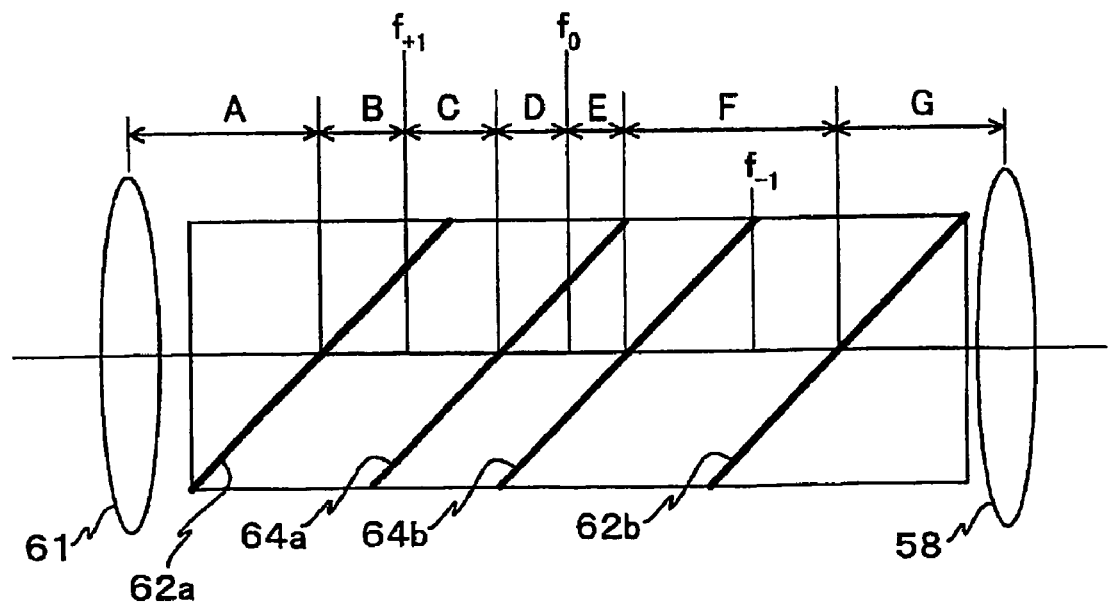
FIG. 16B is a schematic drawing for describing a fourth modified example of the optical system shown in FIG. 3B according to another embodiment of the present invention.

In another example according to the modified embodiment of the present invention, the respective ½ wave plates and the respective polarizing optical elements may be formed as a prism. As shown in FIG. 16B, the prisms may be formed as a united body. Thereby, the assembly process and the positional adjustment process can be simplified. In this case, the respective ½ wave plates and the respective polarizing optical elements may be formed as a prism by using, for example, a multilayer dielectric film.

Figure 17B:
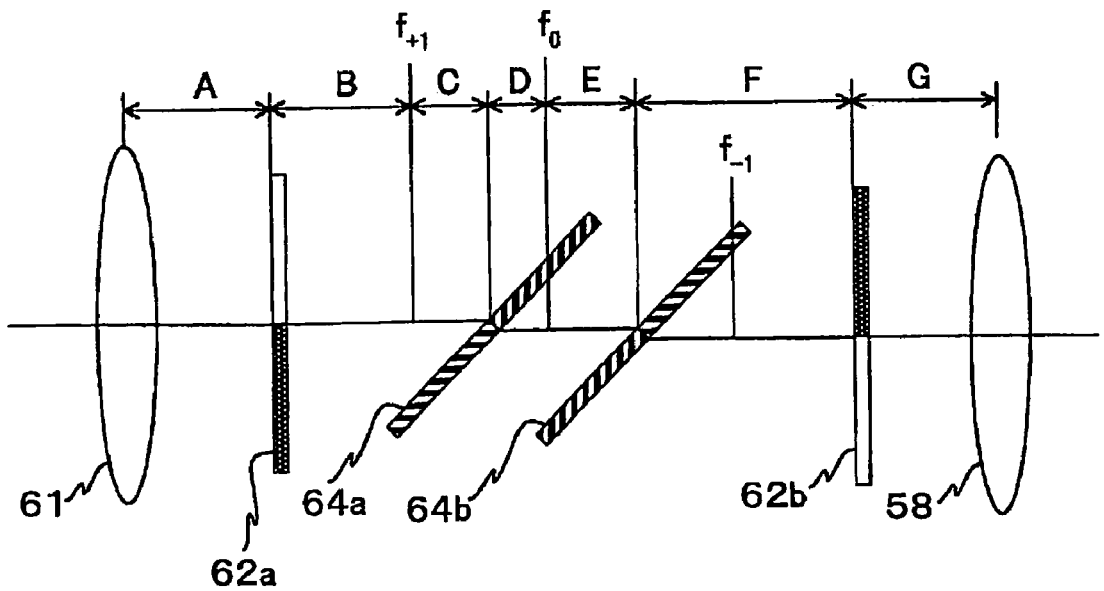
FIG. 17B is a schematic drawing for describing a fifth modified example of the optical system shown in FIG. 3B according to another embodiment of the present invention.

In another example according to the modified embodiment of the present invention, as shown in FIG. 17B, the polarizing optical elements may be inclined. This provides astigmatism to the reflected beam transmitted through the polarizing optical elements. Accordingly, in a case where an astigmatism method is employed for performing focus error detection, a lens (e.g. cylindrical lens) for providing astigmatism shall not be required. That is, the number of components can be reduced.

Figure 18B:
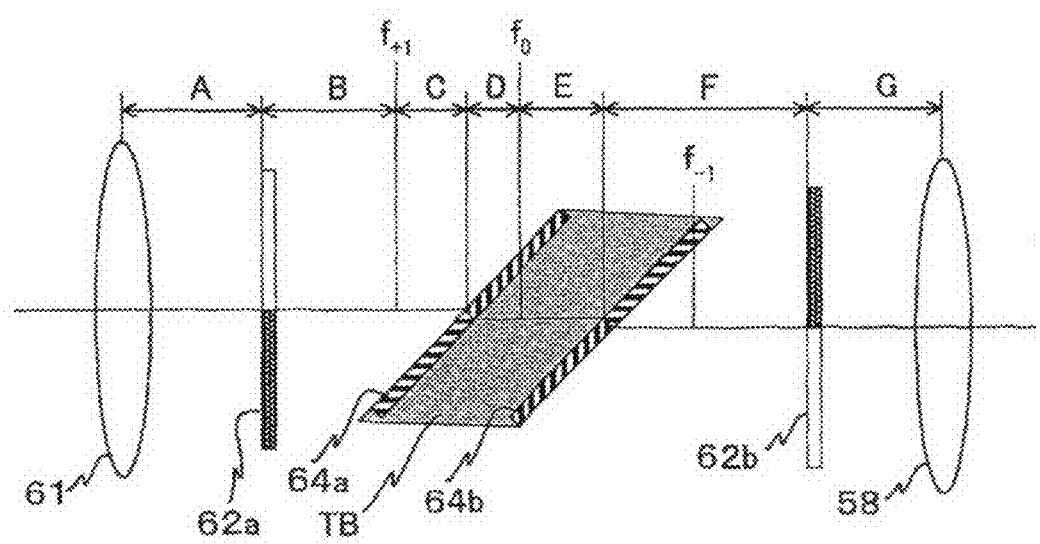
FIG. 18B is a schematic drawing for describing a sixth modified example of the optical system shown in FIG. 3B according to another embodiment of the present invention.

In another example according to the modified embodiment of the present invention, as shown in FIG. 18B, the polarizing optical elements may also be formed as a united body via a transparent member TB. Thereby, the assembly process and the positional adjustment process can be simplified.

[Inverted ¼ Wave Plate]

In another example according to an embodiment of the present invention, the ¼ wave plate 63 of the optical system 70 may be positioned so that the optical axis is rotated 180 degrees. That is, the area 63a may be the area in the −X side with respect to the dividing line 63d and the area 63b may be the area in the +X side with respect to the dividing line 63d. In this case, the signal light transmitted through the ¼ wave plate 63 becomes P polarized light and the stray light transmitted through the ¼ wave plate 63 becomes S polarized light. Therefore, it becomes necessary to change the transmittance axis 90 degrees so that the P polarized light components transmit through the polarizing optical element 64.

Next, the operation of the optical system 70 is described with reference to FIG. 20.

The beam reflected in the −Z direction by the polarization beam splitter 54 is condensed at the lens 61.

Then, the reflected beam, which are transmitted through the lens 61, becomes incident on the ¼ wave plate 62. The signal light and the stray light included in the reflected beam are both S polarized light at the optical paths A, B between the lens 61 and the ¼ wave plate 62 (See FIGS. 5A and 5B). The ¼ wave plate 62 provides a phase difference of +¼ wave length with respect to the beam incident on the area 62a and provides a phase difference of −¼ wave length with respect to the beam incident on the area 62b (See FIG. 6A). Thereby, the signal light and the stray light are both circularly polarized light in the clockwise direction in the area 1 at the optical path C and are both circularly polarized light in the clockwise direction in the area 2 at the optical path C. Furthermore, in the area 1 at the optical path D, although the stray light remains as a circularly polarized light in the clockwise direction, the signal light becomes a circularly polarized light in the counter-clockwise direction. Furthermore, in the area 2 at the optical path D, although the stray light remains as a circularly polarized light in the counter-clockwise direction, the signal light becomes a circularly polarized light in the clockwise direction.

Then, the reflected beam, which are transmitted through the ¼ wave plate 62, becomes incident on the ¼ wave plate

63. The ¼ wave plate 63 provides a phase difference of +¼ wavelength with respect to the beam incident on the area 63a and provides a phase difference of −¼ wavelength with respect to the beam incident on the area 63b (See FIG. 7A). In the optical paths between the ¼ wave plate 63 and the polarization optical element 64 (optical paths E and F), the signal light is an S polarized light and the stray light is a P polarized light.

Then, the reflected beam, which are transmitted through the ¼ wave plate 63, becomes incident on the polarization optical element 64. The polarization optical element 64 only allows the S polarized components included in the beam from the ¼ wave plate 63 to transmit therethrough. Accordingly, the beam at the optical path G only includes signal light components. In other words, the signal light components included in the reflected beam are extracted. Accordingly, the effects of the above-described embodiment of the present invention can be attained.

[¼ Wave Plate→½ Wave Plate]

Alternatively, the ¼ wave plate 62 of the optical system 70 may be replaced by a ½ wave plate (hereinafter referred to as "½ wave plate 172"), and the ¼ wave plate 63 may be replaced by another ½ wave plate (hereinafter referred to as "½ wave plate 173").

Figure 21:
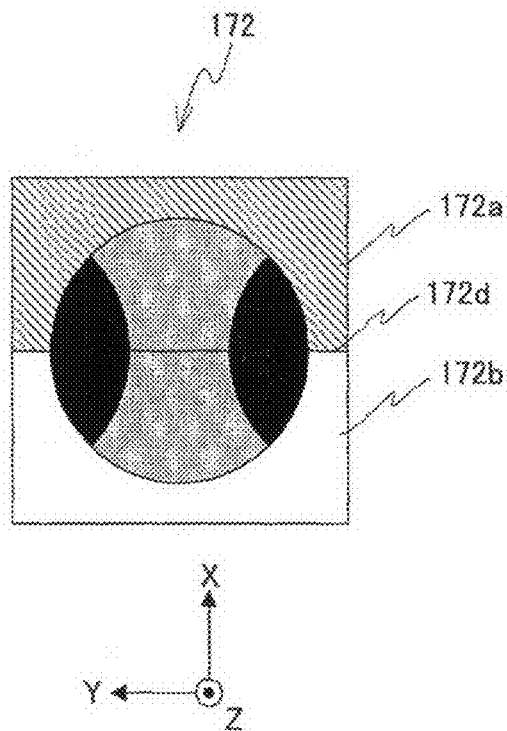
FIG. 21 is a schematic drawing for describing a case where the ¼ wave plate shown in FIG. 3A is replaced by a ½ wave plate according to an embodiment of the present invention.

For example, as shown in FIG. 21, the ½ wave plate 172 is divided into two areas (172a, 172b) by a dividing line 172d extending in the Y direction. In this example, the area on the +X side with respect to the dividing line 172d is indicated as area 172a, and the area on the −X side with respect to the dividing line 172d is indicated as area 172b. The area 172a provides a phase difference of ½ wavelength with respect to the beam incident on the ½ wave plate 172. The area 172b allows the beam incident on the ½ wave plate 172 to transmit therethrough. In a case where the objective lens 60 shifts in the tracking direction, the returning beam incident on the ½ wave plate 172 shifts to a direction corresponding to the tracking direction (in this example, the Y direction).

Figure 22:
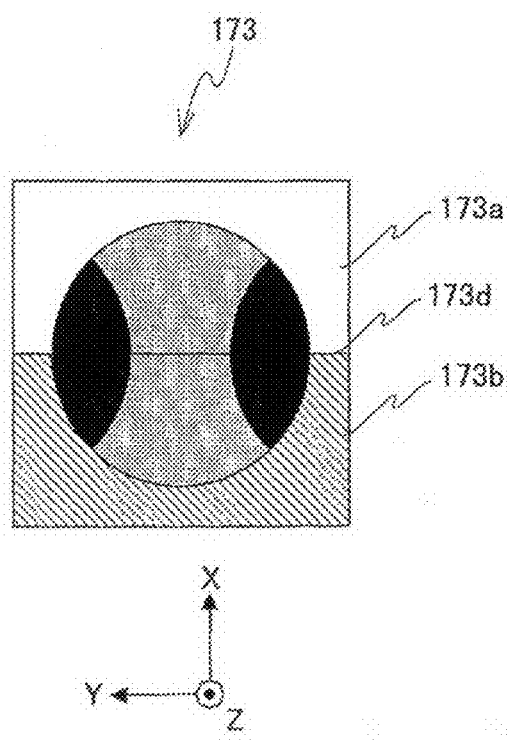
FIG. 22 is a schematic drawing for describing a case where the other ¼ wave plate shown in FIG. 3A is replaced by another ½ wave plate according to an embodiment of the present invention.

For example, as shown in FIG. 22, the ½ wave plate 173 is divided into two areas (173a, 173b) by a dividing line 173d extending in the Y direction. In this example, the area on the +X side with respect to the dividing line 173d is indicated as area 173a, and the area on the −X side with respect to the dividing line 173d is indicated as area 173b. The area 173a allows the beam incident on the ½ wave plate 173 to transmit therethrough. The area 173b provides a phase difference of ½ wavelength with respect to the beam incident on the ½ wave plate 173. That is, the area 173a of the ½ wave plate 173 has the same optical characteristics as the area 172b of the ½ wave plate 172, and the area 173b of the ½ wave plate 173 has the same optical characteristics as the area 172a of the ½ wave plate 172. In a case where the objective lens 60 shifts in the tracking direction, the returning beam incident on the ½ wave plate 173 shifts to a direction corresponding to the tracking direction (in this example, the Y direction).

The results of the optical system 70 in this example are shown in FIG. 23.

The beam reflected in the −Z direction by the polarization beam splitter 54 is condensed at the lens 61.

Then, the reflected beam, which are transmitted through the lens 61, becomes incident on the ½ wave plate 172. As shown in FIG. 23, the signal light and the stray light included in the reflected beam are both S polarized light at the optical paths A, B between the lens 61 and the ½ wave plate 172. The ½ wave plate 172 provides a phase difference of ½ wavelength with respect to only the beam incident on the area 172a. Thereby, the signal light and the stray light are both P polarized light in the area 1 at the optical path C and are both S polarized light in the area 2 at the optical path C. Furthermore, in the area 1 at the optical path D, although the stray light remains as P polarized light, the signal light becomes S polarized light. Furthermore, in the area 2 at the optical path D, although the stray light remains as S polarized light, the signal light becomes P polarized light.

Then, the reflected beam, which are transmitted through the ½ wave plate 172, becomes incident on the ½ wave plate 173. The ½ wave plate 173 provides a phase difference of ½ wavelength with respect to only the beam incident on the area 173b. Thereby, in the optical paths between the ½ wave plate 173 and the polarization optical element 64 (optical paths E and F), the signal light becomes S polarized light and the stray light becomes P polarized light.

Then, the reflected beam, which are transmitted through the ½ wave plate 173, becomes incident on the polarization optical element 64. The polarization optical element 64 only allows the S polarized components included in the beam from the ½ wave plate 173 to transmit therethrough. Accordingly, the beam at the optical path G only includes signal light components. In other words, the signal light components included in the reflected beam are extracted. Accordingly, the effects of the above-described embodiment of the present invention can be attained.

[Inverted ½ Wave Plate]

In another example according to an embodiment of the present invention, the ½ wave plate 173 may be positioned so that the optical axis is rotated 180 degrees. That is, the area 173a may be the area in the −X side with respect to the dividing line 173d and the area 173b may be the area in the +X side with respect to the dividing line 173d. In this case, the signal light transmitted through the ½ wave plate 173 becomes P polarized light and the stray light transmitted through the ½ wave plate 173 becomes S polarized light. Therefore, it becomes necessary to change the transmittance axis 90 degrees so that the P polarized light components transmit through the polarizing optical element 64.

The results of the optical system 70 in this example are shown in FIG. 24.

The beam reflected in the −Z direction by the polarization beam splitter 54 is condensed at the lens 61.

Then, the reflected beam, which are transmitted through the lens 61, becomes incident on the ½ wave plate 172. As shown in FIG. 24, the signal light and the stray light included in the reflected beam are both S polarized light at the optical paths A, B between the lens 61 and the ½ wave plate 172. The ½ wave plate 172 provides a phase difference of +½ wavelength with respect to only the beam incident on the area 172a. Thereby, the signal light and the stray light are both P polarized light in the area 1 at the optical path C and are both S polarized light in the area 2 at the optical path C. Furthermore, in the area 1 at the optical path D, although the stray light remains as P polarized light, the signal light becomes S polarized light. Furthermore, in the area 2 at the optical path D, although the stray light remains as S polarized light, the signal light becomes P polarized light.

Then, the reflected beam, which are transmitted through the ½ wave plate 172, becomes incident on the ½ wave plate 173. The ½ wave plate 173 provides a phase difference of ½ wavelength with respect to only the beam incident on the area 173a. Thereby, in the optical paths between the ½ wave plate 173 and the polarization optical element 64 (optical paths E and F), the signal light becomes P polarized light and the stray light becomes S polarized light.

In a case where a sub-wavelength wire-grid or a photonic crystal is used as the ½ wave plate, the ½ wave plate can be fabricated easier the more the effective area becomes narrower. Therefore, the ½ wave plates 172, 173 may, for example, be provided with an effective area having a diameter that is substantially equal to the effective beam diameter of the signal light and have a transparent member formed as the outer area surrounding the effective area. In this case, although the stray light deviating from the effective area may transmit through the ½ wave plates 172, 173 as is, the stray light is S polarized light in the optical paths between the ½ wave plate 173 and the polarization optical element 64 (optical paths E and F) (i.e. same as the stray light of S polarized light transmitted through the effective area).

Then, the reflected beam, which are transmitted through the ½ wave plate 173, becomes incident on the polarization optical element 64. The polarization optical element 64 only allows the P polarized components included in the beam from the ½ wave plate 173 to transmit therethrough. Accordingly, the beam at the optical path G only includes signal light components. In other words, the signal light components included in the reflected beam are extracted. Accordingly, the effects of the above-described embodiment of the present invention can be attained.

[¼ Wave Plate→Rotator]

Alternatively, the ¼ wave plate 62 of the optical system 70 may be replaced by a rotator (hereinafter referred to as "rotator 182"), and the ¼ wave plate 63 may be replaced by another rotator (hereinafter referred to as "rotator 183").

Figure 25:
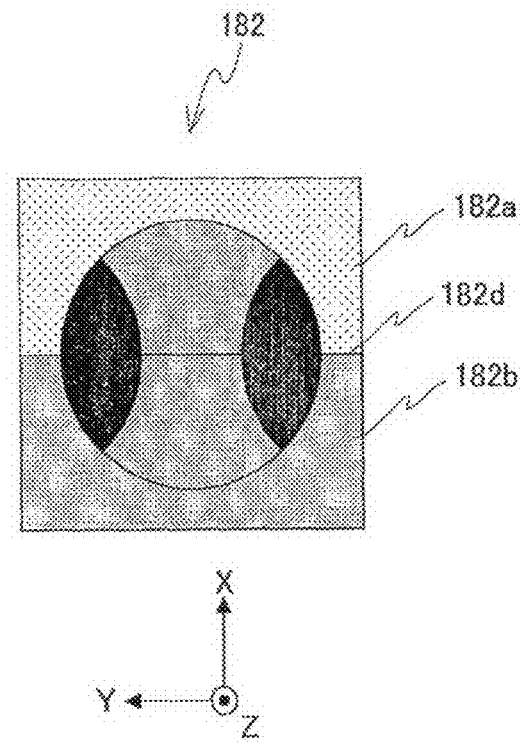
FIG. 25 is a schematic drawing for describing a case where the ¼ wave plate shown in FIG. 3A is replaced by a rotator according to an embodiment of the present invention.

For example, as shown in FIG. 25, the rotator 182 is divided into two areas (182a, 182b) by a dividing line 182d extending in the Y direction. In this example, the area on the +X side with respect to the dividing line 182d is indicated as area 182a, and the area on the −X side with respect to the dividing line 182d is indicated as area 182b. The area 182a rotates the polarization direction of the incident beam to an angle of +45 degrees, and the area 182b rotates the polarization direction of the incident beam to an angle of −45 degrees. In a case where the objective lens 60 shifts in the tracking direction, the returning beam incident on the rotator 182 shifts to a direction corresponding to the tracking direction (in this example, the Y direction).

Figure 26:
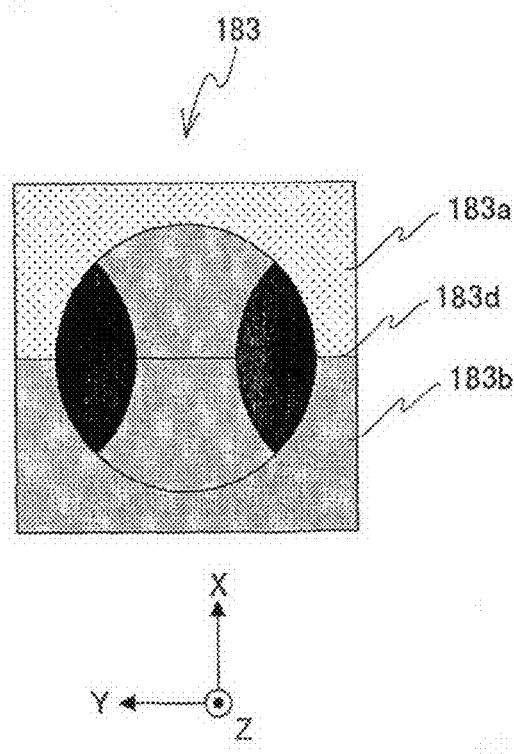
FIG. 26 is a schematic drawing for describing a case where the other ¼ wave plate shown in FIG. 3A is replaced by another rotator according to an embodiment of the present invention.

For example, as shown in FIG. 26, the rotator 183 is divided into two areas (183a, 183b) by a dividing line 183d extending in the Y direction. In this example, the area on the +X side with respect to the dividing line 183d is indicated as area 183a, and the area on the −X side with respect to the dividing line 183d is indicated as area 183b. The area 183a rotates the polarization direction of the incident beam to an angle of +45 degrees, and the area 183b rotates the polarization direction of the incident beam to an angle of −45 degrees. That is, the rotator 183 has the same optical characteristics as the rotator 182. In a case where the objective lens 61 shifts in the tracking direction, the returning beam incident on the rotator 183 shifts to a direction corresponding to the tracking direction (in this example, the Y direction).

The results of the optical system 70 in this example are shown in FIG. 27. Here, for the sake of convenience, the angle of the polarization direction is described based on the polarization direction of S polarized light. Therefore, in a case where a linear polarized light has a polarization direction of +90 degrees or −90 degrees, the linear polarized light is P polarized light.

The beam reflected in the −Z direction by the polarization beam splitter 54 is condensed at the lens 61.

Then, the reflected beam, which are transmitted through the lens 61, becomes incident on the rotator 182. As shown in FIG. 27, the signal light and the stray light included in the reflected beam are both S polarized light at the optical paths A, B between the lens 61 and the rotator 182. The rotator 182 rotates the polarization direction to an angle of +45 degrees with respect to the beam incident on the area 182a, and rotates the polarization direction to an angle of −45 degrees with respect to the beam incident on the area 182b. Thereby, the signal light and the stray light are both linear polarized light having a polarization angle of +45 degrees in the area 1 at the optical path C and are both linear polarized light having a polarization angle of −45 degrees in the area 2 at the optical path C. Furthermore, in the area 1 at the optical path D, although the stray light remains as a linear polarized light having a polarization angle of +45 degrees, the signal light becomes a linear polarized light having a polarization angle of −45 degrees. Furthermore, in the area 2 at the optical path D, although the stray light remains as a linear polarized light having a polarization angle of −45 degrees, the signal light becomes a linear polarized light having a polarization angle of +45 degrees.

Then, the reflected beam, which are transmitted through the rotator 182, becomes incident on the rotator 183. The rotator 183 rotates the polarization direction to an angle of +45 degrees with respect to the beam incident on the area 183a, and rotates the polarization direction to an angle of −45 degrees with respect to the beam incident on the area 183b. Thereby, in the optical paths between the rotator 183 and the polarization optical element 64 (optical paths E and F), the signal light becomes a linear polarized light having a polarization angle of 0 degrees (i.e. S polarized light) and the stray light becomes a linear polarized light having a polarization angle of +90 degrees or −90 degrees (i.e. P polarized light).

Then, the reflected beam, which are transmitted through the rotator 183, becomes incident on the polarization optical element 64. The polarization optical element 64 only allows the S polarized components included in the beam from the rotator 183 to transmit therethrough. Accordingly, the beam at the optical path G only includes signal light components. In other words, the signal light components included in the reflected beam are extracted. Accordingly, the effects of the above-described embodiment of the present invention can be attained.

[Inverted Rotator]

In another example according to an embodiment of the present invention, the rotator 183 may be positioned so that the optical axis is rotated 180 degrees. That is, the area 183a may be the area in the −X side with respect to the dividing line 183d and the area 183b may be the area in the +X side with respect to the dividing line 183d. In this case, the signal light transmitted through the rotator 183 becomes P polarized light and the stray light transmitted through the rotator 183 becomes S polarized light. Therefore, it becomes necessary to change the transmittance axis 90 degrees so that the P polarized light components transmit through the polarizing optical element 64.

The results of the optical system 70 in this example are shown in FIG. 28.

The beam reflected in the −Z direction by the polarization beam splitter 54 is condensed at the lens 61.

Then, the reflected beam, which are transmitted through the lens 61, becomes incident on the rotator 182. As shown in FIG. 28, the signal light and the stray light included in the reflected beam are both S polarized light (i.e. linear polarized light having a polarization angle of 90 degrees) at the optical paths A, B between the lens 61 and the rotator 182. The rotator 182 rotates the polarization direction to an angle of +45 degrees with respect to the beam incident on the area 182a, and rotates the polarization direction to an angle of −45 degrees with respect to the beam incident on the area 182b. Thereby, the signal light and the stray light are both linear polarized light having a polarization angle of +45 degrees in the area 1 at the optical path C and are both linear polarized light having a polarization angle of −45 degrees in the area 2 at the optical path C. Furthermore, in the area 1 at the optical path D, although the stray light remains as a linear polarized light having a polarization angle of +45 degrees, the signal light becomes a linear polarized light having a polarization angle of −45 degrees. Furthermore, in the area 2 at the optical path D, although the stray light remains as a linear polarized light having a polarization angle of −45 degrees, the signal light becomes a linear polarized light having a polarization angle of +45 degrees.

Then, the reflected beam, which are transmitted through the rotator 182, becomes incident on the rotator 183. The rotator 183 rotates the polarization direction to an angle of −45 degrees with respect to the beam incident on the area 183a, and rotates the polarization direction to an angle of +45 degrees with respect to the beam incident on the area 183b. Thereby, in the optical paths between the rotator 183 and the polarization optical element 64 (optical paths E and F), the signal light becomes a linear polarized light having a polarization angle of +90 degrees or −90 degrees (i.e. P polarized light) and the stray light becomes a linear polarized light having a polarization angle of 0 degrees (i.e. S polarized light).

In a case where a sub-wavelength wire-grid or a photonic crystal is used as the rotator, the rotator can be fabricated easier the more the effective area becomes narrower. Therefore, the rotators 182, 183 may, for example, be provided with an effective area having a diameter that is substantially equal to the effective beam diameter of the signal light and have a transparent member formed as the outer area surrounding the effective area. In this case, although the stray light deviating from the effective area may transmit through the rotators 182, 183 as is, the stray light is S polarized light in the optical paths between the rotator 183 and the polarization optical element 64 (optical paths E and F) (i.e. same as the stray light of S polarized light transmitted through the effective area).

Then, the reflected beam, which are transmitted through the rotator 183, becomes incident on the polarization optical element 64. The polarization optical element 64 only allows the P polarized components included in the beam from the rotator 183 to transmit therethrough. Accordingly, the beam at the optical path G only includes signal light components. In other words, the signal light components included in the reflected beam are extracted. Accordingly, the effects of the above-described embodiment of the present invention can be attained.

Figure 29:
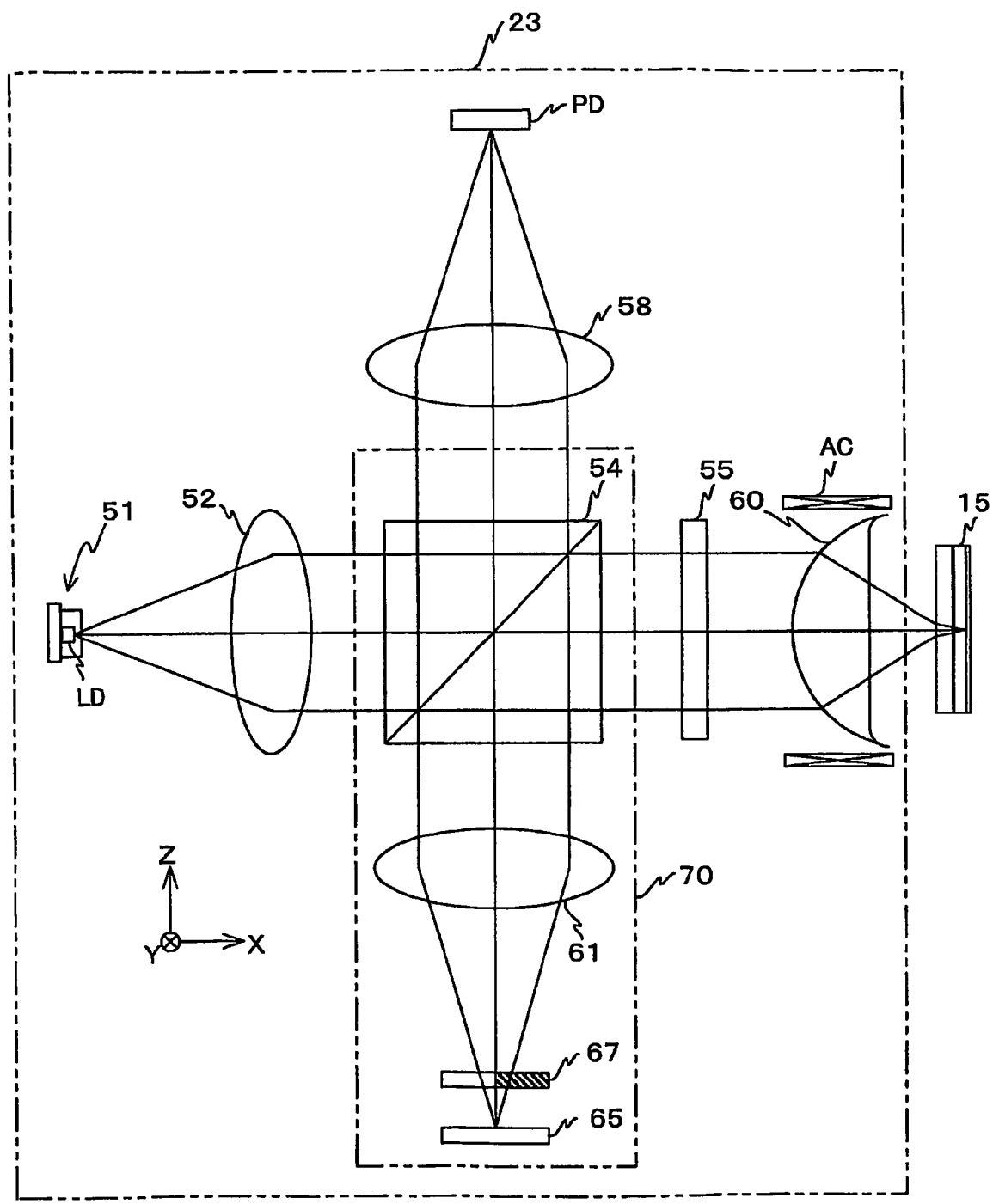
FIG. 29 is a schematic drawing for describing a second modified example of the optical pickup apparatus shown in FIG. 1 according to an embodiment of the present invention.

FIG. 29 shows another example of the optical pickup apparatus 23 according to an embodiment of the present invention. In the optical pickup apparatus 23 shown in FIG. 29, the condenser lens (detection lens) 58 and the optical detecting unit PD are disposed at the +Z side of the polarizing optical element 64, and the above-described ¼ wave plates 62, 63 and the polarizing optical element 64 are replaced by employing a ½ wave plate 67 and a mirror 65. In this case the optical system 70 includes the polarization beam splitter 54, the lens 61, the ½ wave plate 67, and the mirror 65.

Figure 30:
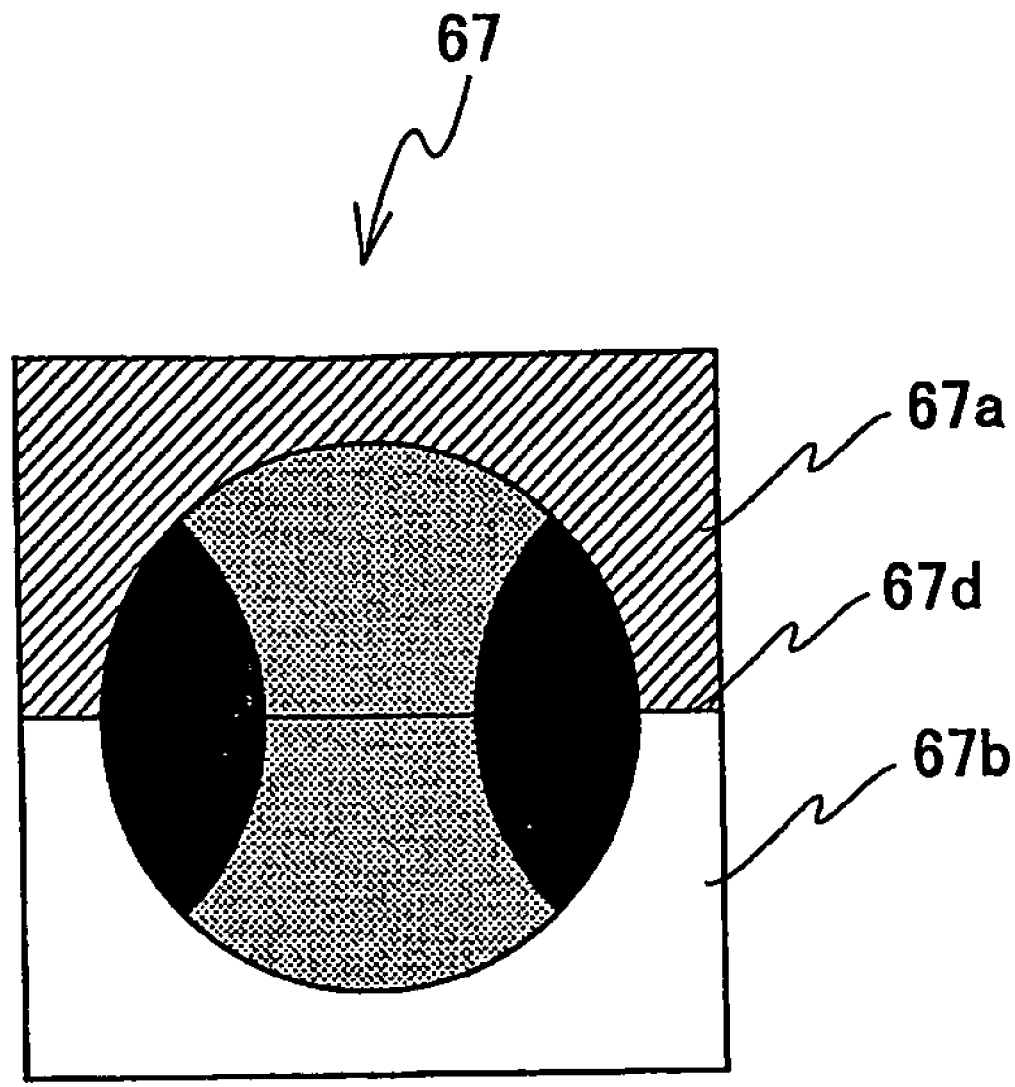
FIG. 30 is a schematic drawing for describing a ½ wave plate included in the optical system shown in FIG. 29 according to an embodiment of the present invention.

The ½ wave plate 67 is positioned at the −Z side of the lens 61 and is situated between the focus point $f_{+1}$ and the focus point $f_0$. For example, as shown in FIG. 30, the ½ wave plate 67 is divided into two areas (67a, 67b) by a dividing line 67d extending in the Y direction. In this example, the area on the +X side with respect to the dividing line 67d is indicated as area 67a, and the area on the −X side with respect to the dividing line 67d is indicated as area 67b. The area 67a provides a phase difference of +½ wavelength with respect to the beam incident on the ½ wave plate 67. The area 67b provides no phase difference with respect to the beam incident on the ½ wave plate 67. In a case where the objective lens 60 shifts in the tracking direction, the returning beam incident on the ½ wave plate 67 shifts to a direction corresponding to the tracking direction (in this example, the Y direction).

For example, a twist nematic liquid crystal, a sub-wavelength wire-grid, or a photonic crystal may be used as the ½ wave plate 67.

Figure 31:
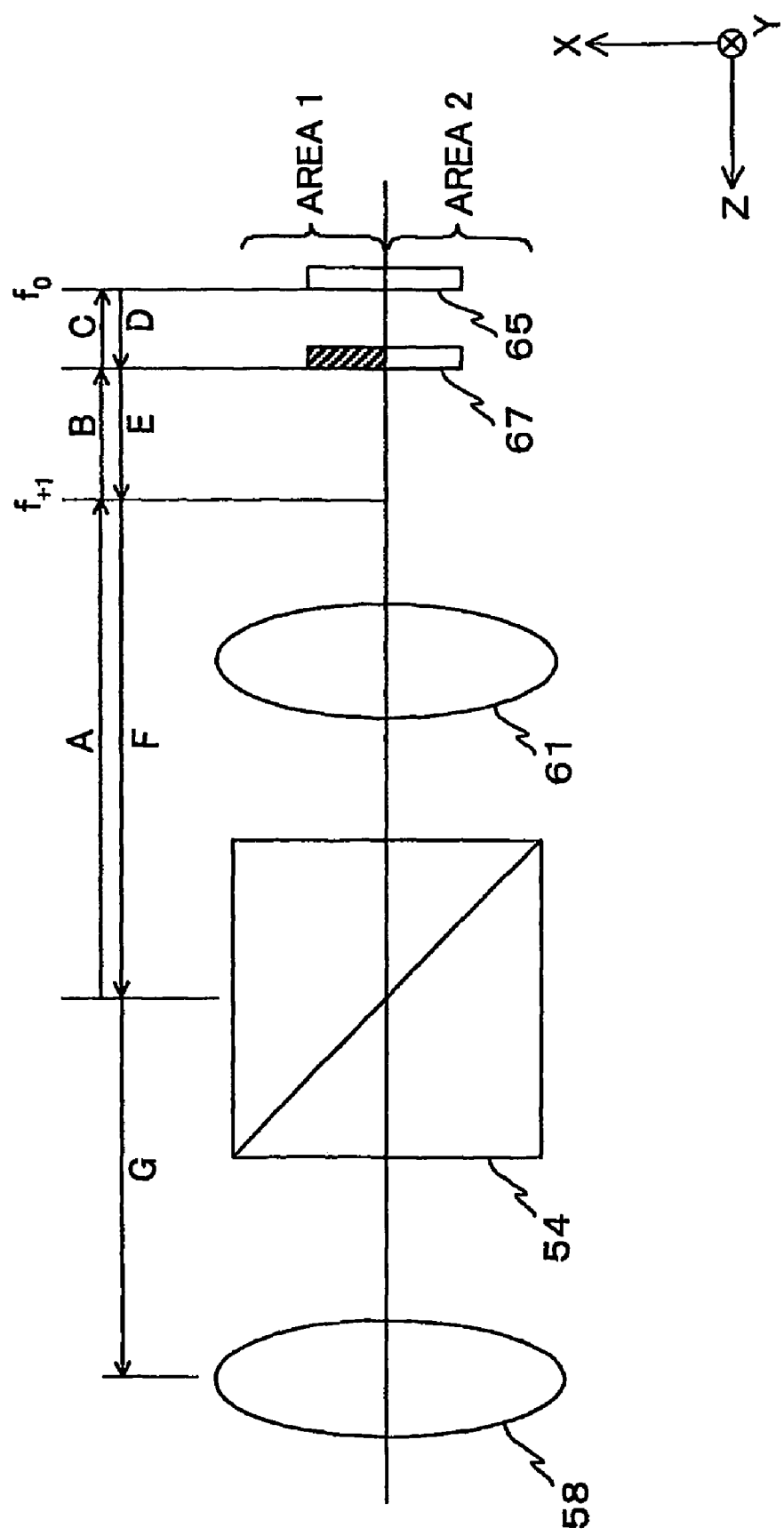
FIG. 31 is a schematic drawing for describing the operation (effect) of the optical system shown in FIG. 29 according to an embodiment of the present invention.

With reference to FIG. 31, the mirror 65 is situated at a focus point $f_0$. The mirror 65 reflects a beam from the area 67a of the ½ wave plate 67 to the area 67b of the ½ wave plate 67 and reflects a beam from the area 67b of the ½ wave plate 67 to the area 67a of the ½ wave plate 67.

Next, the operation of the above-described optical system according to an embodiment of the present invention is described with reference to FIGS. 31 and 32. Here, with respect to the optical axis direction of the lens 61, the optical path advancing from the polarization beam splitter 54 to the focus point $f_{+1}$ is referred to as "optical path A", the optical path advancing from the focus point $f_{+1}$ to the ½ wave plate 67 is referred to as "optical path B", the optical path advancing from the ½ wave plate 67 to the focus point $f_0$ is referred to as "optical path C", the optical path advancing from the focus point $f_0$ to the ¼ wave plate 67 is referred to as "optical path D", the optical path advancing from the ½ wave plate 67 to the focus point $f_{+1}$ is referred to as "optical path E", the optical path advancing from the focus point $f_{+1}$ to the polarization beam splitter 54 is referred to as "optical path F", and the optical path advancing from the polarization beam splitter 54 to the condenser lens 58 is referred to as "optical path G" (See FIGS. 31 and 32).

The beam reflected in the −Z direction by the polarization beam splitter 54 is condensed at the lens 61. Then, the reflected beam, which are transmitted through the lens 61, becomes incident on the ½ wave plate 67. As shown in FIG. 32, the signal light and the stray light included in the reflected beam are both S polarized light at the optical paths A, B. The ½ wave plate 67 provides a phase difference of +½ wave length with respect to the beam incident on the area 67a and provides no phase difference with respect to the beam incident on the area 67b. Thereby, the signal light and the stray light are both P polarized light in the area 1 at the optical path C and are both S polarized light in the area 2 at the optical path C.

Then, the beam from the ½ wave plate 67 becomes incident on the ½ wave plate 67. The mirror 65 reflects a beam from the area 67a of the ½ wave plate 67 to the area 67b of the ½ wave plate 67 and reflects a beam from the area 67b of the ½ wave plate 67 to the area 67a of the ½ wave plate 67. Thereby, in the area 1 at the optical path D, although the stray light remains as a P polarized light, the signal light becomes a S polarized light. Furthermore, in the area 2 at the optical path D, although the stray light remains as a S polarized light, the signal light becomes a P polarized light.

Then, the beam, which are reflected from the mirror 65, becomes incident on the ½ wave plate 67. The ½ wave plate 67 provides a phase difference of +½ wavelength with respect to the beam incident on the area 67a and provides no phase difference with respect to the beam incident on the area 67b.

Accordingly, in the optical paths E and F, the signal light becomes a P polarized light and the stray light becomes an S polarized light.

Then, the beam from the ½ wave plate 63 becomes incident on the polarization beam splitter 54 via the lens 61. The polarization beam splitter 54 only allows the P polarized components to transmit therethrough and be incident on the condenser lens 58. Accordingly, the beam at the optical path G only includes signal light components. Therefore, the effects of the above-described embodiment of the present invention can be attained. Hence, the number of components as well as the size of the optical pickup apparatus can be reduced.

Figure 33:
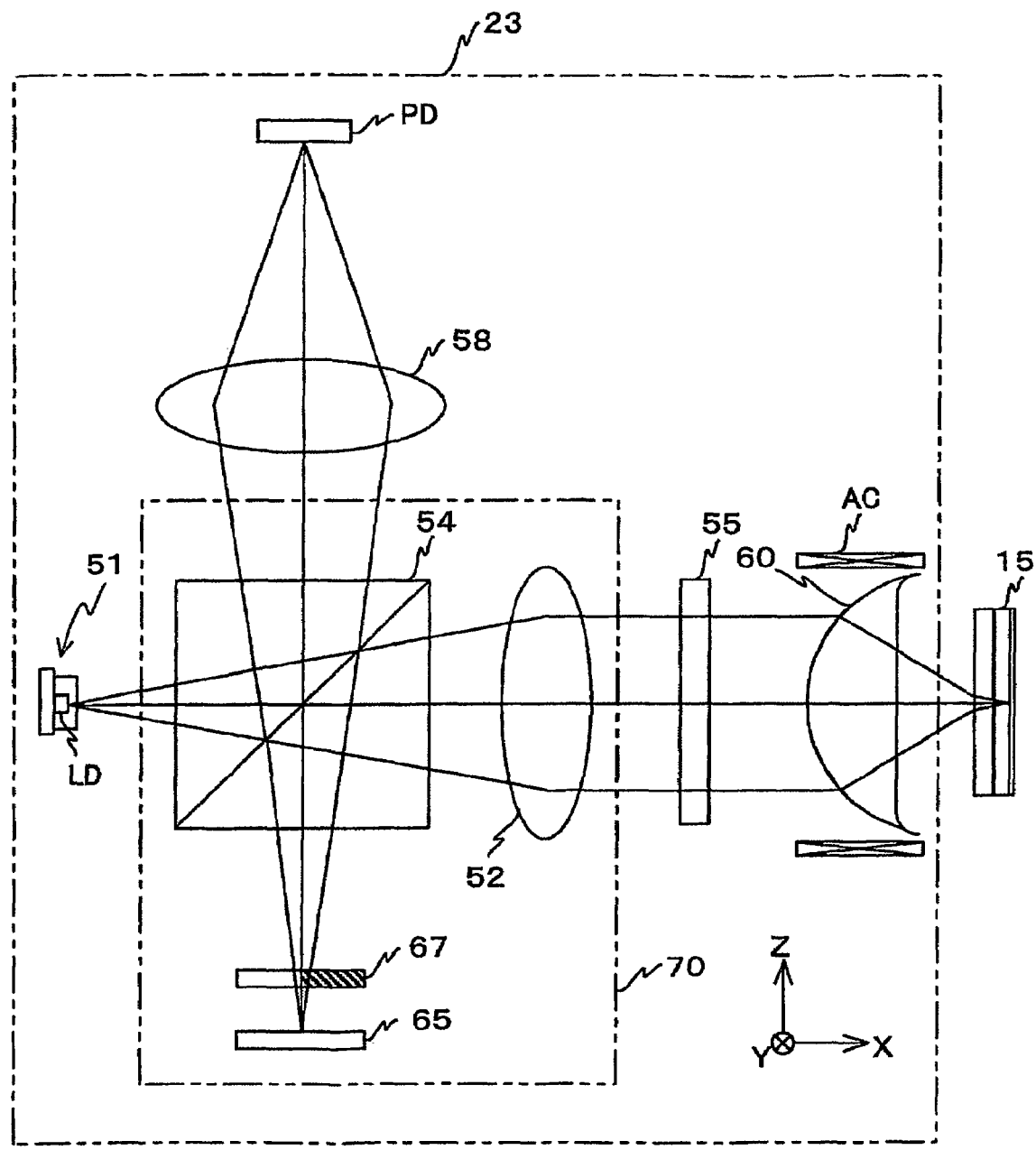
FIG. 33 is a schematic drawing for describing a third modified example of the optical pickup apparatus shown in FIG. 1 according to an embodiment of the present invention.
Figure 34:
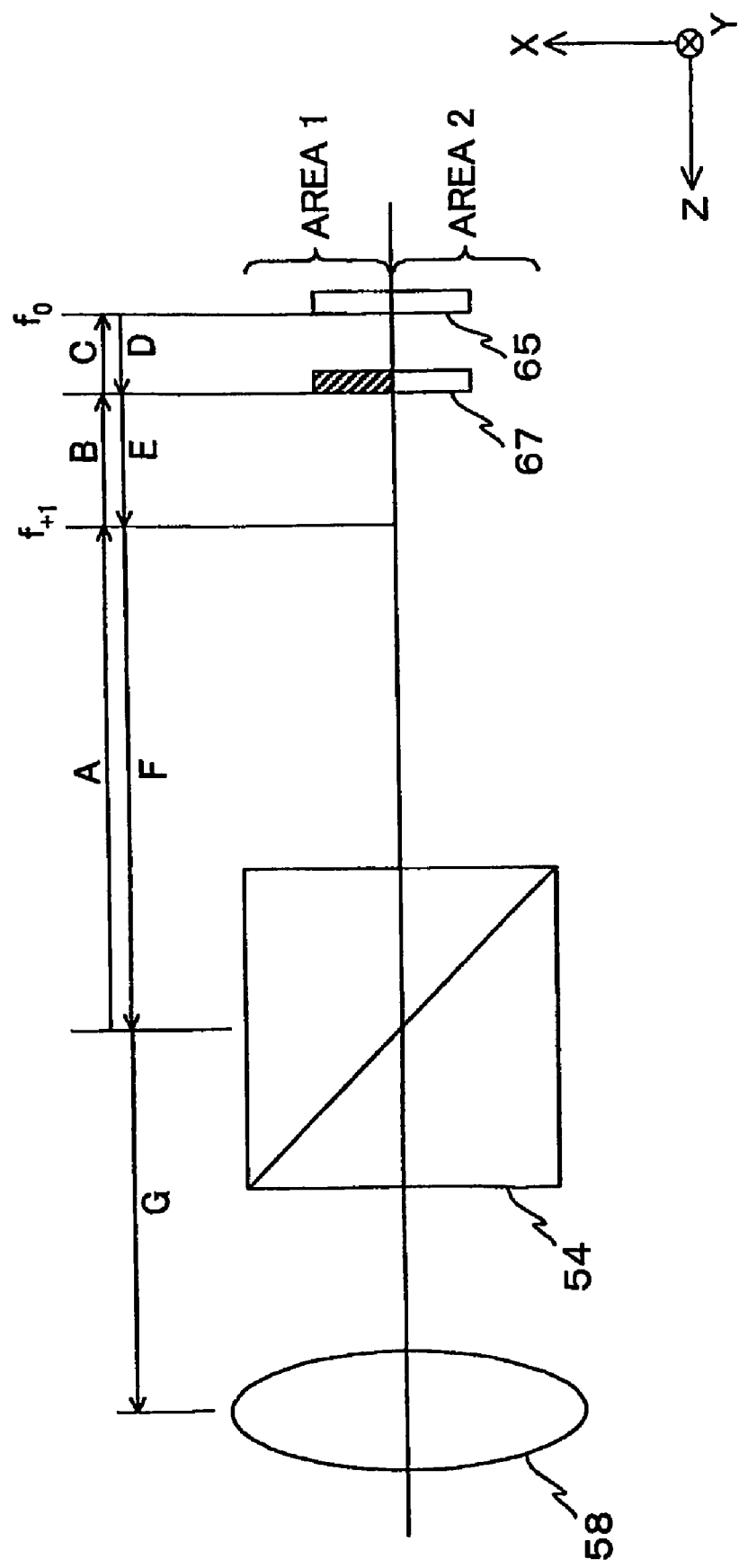
FIG. 34 is a schematic drawing for describing the operation (effect) of the optical system shown in FIG. 33 according to an embodiment of the present invention.

Alternatively, the coupling lens 52 may be disposed at the +X of the polarization beam splitter 54 as shown in FIG. 33. In this case, the coupling lens 52 provides the same functions as the lens 61 with respect to the reflected beam. That is, the optical system 70 in this case includes the polarization beam splitter 54, the coupling lens 52, the ½ wave plate 67, and the mirror 65. As shown in FIGS. 34 and 35, the optical system 70 in this case can attain the same effects as the optical system 70 shown in FIG. 29. Hence, the number of components as well as the size of the optical pickup apparatus can be further reduced.

Moreover, since the dividing lines of the ½ wave plate 67 match the direction corresponding to the tracking direction, the signal light and the stray light can be precisely separated even in case where the objective lens 60 shifts to the tracking direction.

In the optical system 70 shown in FIGS. 29 and/or 33, the ½ wave plate 67 and the mirror 65 may alternatively be formed as a united body. In this case, the ½ wave plate 67 and the mirror 65 may be formed as a united body via a transparent member TB having a refractive index greater than 1. Thereby, the assembly process and the positional adjustment process can be simplified.

Furthermore, in the optical system 70 shown in FIGS. 29 and/or 33, a transparent member TB having a refractive index greater than 1 may be provided between the focus point $f_{+1}$ and the $f_0$. Thereby, the assembly process and the positional adjustment process can be simplified.

Although the optical system 70 shown in FIGS. 29 and 33 uses the mirror 65 as a reflecting part, a prism may alternatively be used. That is, other reflecting parts may be employed as long as the reflecting part can reflect a beam from the area 67a of the ½ wave plate 67 to the area 67b of the ½ wave plate 67 and reflect a beam from the area 67b of the ½ wave plate 67 to the area 67a of the ½ wave plate 67.

Although the above-described embodiments of the present invention describe the objective lens as an focal system (infinite system), the objective lens may also be a focal system (finite system). Even in this case, the effects of the above-described embodiment of the present invention can be attained.

Although the optical disk apparatus 20 according to an embodiment of the present invention is described above as an apparatus that can record and reproduce information to/from the optical disk 15, the optical disk apparatus 20 includes other optical apparatuses as long as the apparatus can at least reproduce information of an optical disk.

Furthermore, although the optical disk 15 is described as having two layers, the optical disk 15 is not limited to having two layers. The optical disk 15 may alternatively have three or more layers. In this case, when the target recording layer is situated between two recording layers, the reflected beam includes a first stray light (first stray light components) which condenses at a position closer to the focus point of the signal light and a second stray light (second stray light components) which condenses at a position farther from the focus point of the signal light.

Furthermore, the optical disk 15 according to an embodiment of the present invention includes not only DVD type optical disks, but also CD type optical disks and next generation information recording media corresponding to a light beam having a wavelength of approximately 405 nm.

Furthermore, although the optical pickup apparatus 23 is described using an example of a single semiconductor laser, plural lasers may also be employed. For example, multiple semiconductor lasers that emit beams of different wavelengths may be used. In such a case, one semiconductor laser may emit a beam having a wavelength of approximately 405 nm, another semiconductor laser may emit a beam having a wavelength of approximately 660 nm, and yet another semiconductor laser may emit a beam having a wavelength of approximately 780 nm. In other words, the optical disk apparatus 20 according to an embodiment of the present invention includes an optical disk apparatus that is compatible with various optical disks of different standards, in which one of the optical disk may be an optical disk having plural recording layers.

Figure 36:
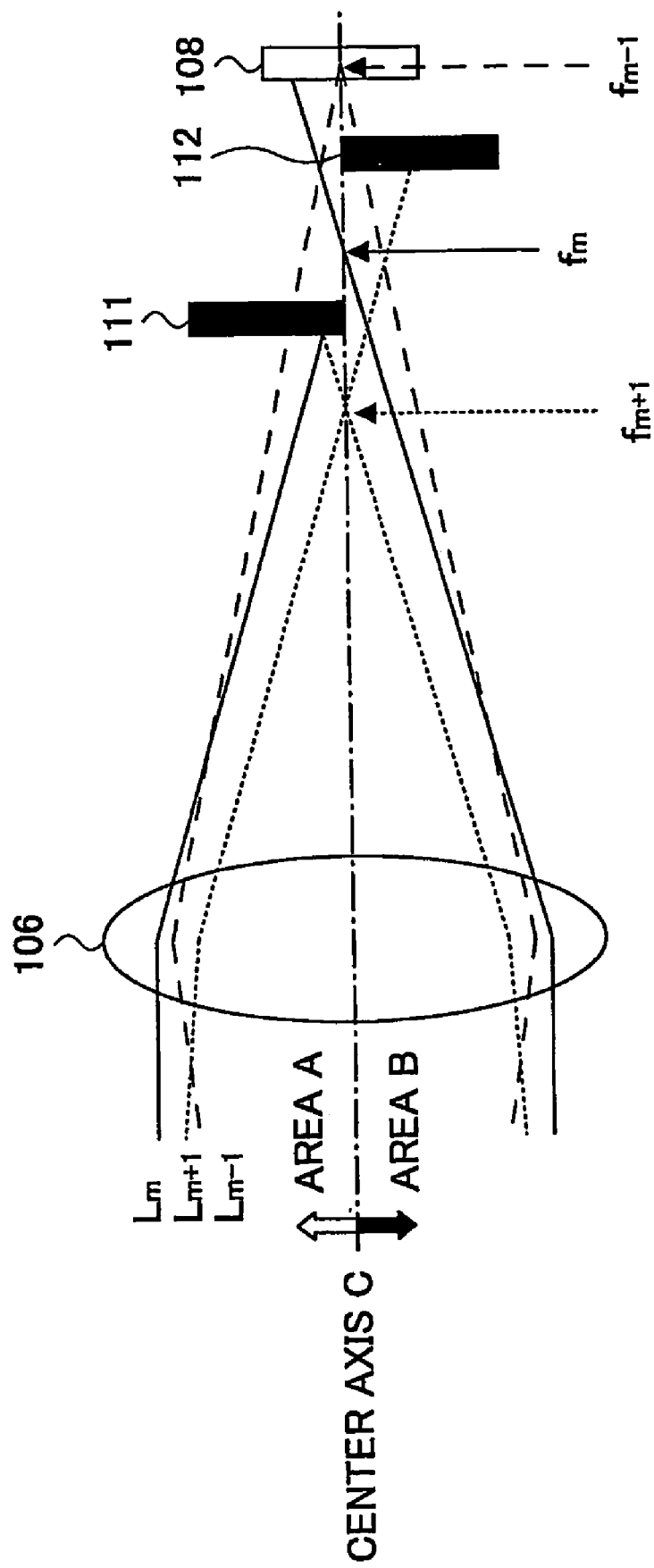
FIG. 36 is a schematic drawing for describing basic configuration of an optical pickup apparatus according to yet another embodiment of the present invention.

FIG. 36 is a schematic drawing showing an exemplary configuration of an optical detecting system 200 included in an optical pickup apparatus 23 according to yet another embodiment of the present invention. It is to be noted that like components are denoted with like reference numerals as of the above-described embodiments of the present invention and are further explained.

In FIG. 36, reference numeral 111 indicates a front shielding part, and reference numeral 112 indicates a rear shielding part. FIG. 36 is a cross-sectional view in a case of viewing from the tracking direction of the optical disk 15. The optical detecting system 200 is for separating and detecting the signal light and the stray light reflected from the optical disk 15.

In a case where a beam including a bundle of signal light rays (hereinafter also referred to as "signal light beam") and a bundle of stray light rays (hereinafter also referred to as "stray light beam") reflected from an optical disk 20 is incident on a condenser lens 106, the magnification of the beam differs depending on the position of the layer (surface) from which the beam is reflected. That is, among the beam incident on the condenser lens 106, the signal light beam Lm reflected from a target recording layer has a magnification different from that of the stray light beam Lm±n reflected from other layers of the optical disk 20 (besides the target recording layer) in a case where "m" is set as the layer counted from the top surface of a target recording layer, "m" is an integer in which its maximum value is the total number of layers of the recording medium 15, and "n" is a given integer (on condition that the relationships of n≧1 and m>n are satisfied). Accordingly, the focus point for each bundle transmitted through the condenser lens 106 is different. In this example, the focus point fm corresponds to the signal light beam Lm, and focus point fm±n corresponds to the stray light beam Lm±n. In this embodiment of the present invention, n is set to satisfy a relationship of n=1 for the sake of convenience. It is to be noted that there is no stray light on the negative (minus) side when m=1. On the other hand, there is no stray light on the positive (plus) side when m is the maximum value.

As described above with reference to FIGS. 50A and 50B, the position of the focus point fm is positioned at a fixed position in the optical detecting system regardless of the value of m owing to the fact that the signal light beam Lm is set to become parallel with respect to the optical axis of the condenser lens. Furthermore, unless there is a significant difference in the thickness of the intermediate layer the optical disks subjected to recording/reproduction, the space (distance) between the respective focus points fm+1, fm, and fm−1 can fall within a predictable range since the positions of the focus points fm+1 and fm−1 are defined in accordance with the thickness of the intermediate layer of the optical disk 15. In other words, it may be said that these focus points are substantially fixed points irrespective of the value of m.

The stray light beam Lm+n reflected from a layer situated farther from the objective lens 104 compared to the target recording layer to which a light beam is condensed (see FIGS. 51A and 51B) forms a focus point fm+n that is situated closer to the condenser lens 106 than the focus point fm of the signal light beam Lm. The focus point that is situated closest to the positive side of the focus point fm is fm+1. On the other hand, the stray light beam Lm−n reflected from a layer situated closer to the objective lens 104 compared to the target recording layer to which a light beam is condensed (see FIGS. 51A and 51B) forms a focus point fm−n that is situated closer to the optical detector 108 than the focus point fm of the signal light beam Lm. The focus point that is situated closest to the negative side of the focus point fm is fm−1.

Figure 37:
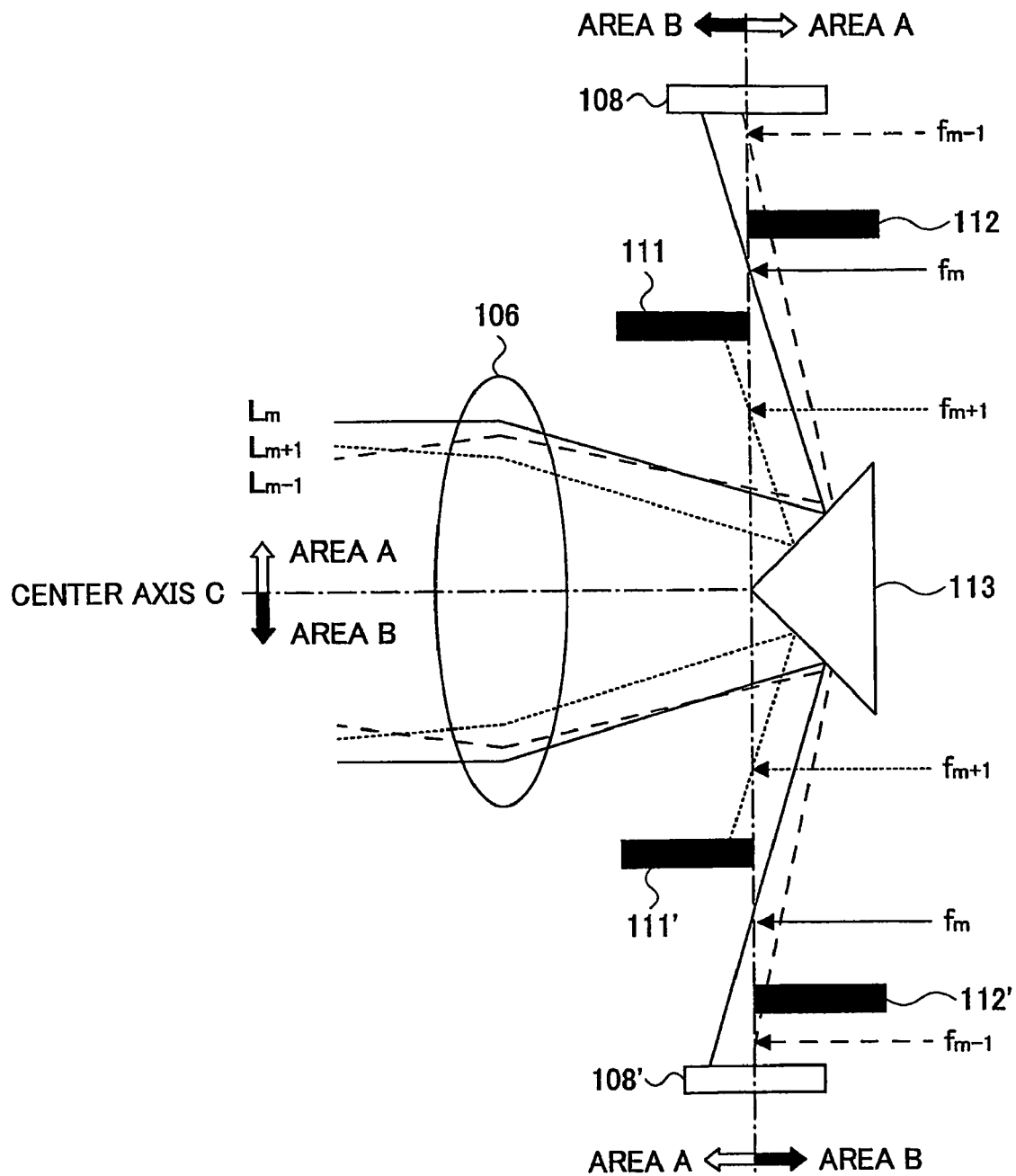
FIG. 37 is a schematic drawing of a configuration for preventing loss in the amount of light (light quantity) according to yet another embodiment of the present invention.

With reference to FIGS. 36 and 37, the upper half area with respect to the center axis C (optical axis of the condenser lens 106) of the propagating direction of the beam is referred to as "area A", and the lower half area with respect to the center axis C of the propagating direction of the beam is referred to as "area B". The front shielding part 111 according to an embodiment of the present invention is positioned between the focus point fm+1 and the focus point fm for shielding the beam transmitted through the condenser lens 106 in the area A. Furthermore, the rear shielding part 112 is positioned between the focus point fm and the focus point fm+1 for shielding the beam transmitted through the condenser lens 106 in the area B.

The signal light beam Lm and the stray light beam Lm−n included in the beam transmitted through the portion of the area A of the condenser lens 106 are shielded by the front shielding part 111. Since the stray light beam Lm+n is condensed (converged) before reaching the front shielding part 111, the position of the stray light beam Lm+n is inverted to the area B. Thereby, the stray light beam Lm+n is shielded at the rear shielding part 112.

The stray light beam Lm-n included in the beam transmitted through the portion of the area B of the condenser lens 106 is shielded at the rear shielding part 112. Since the stray light beam Lm+n is condensed (converged) before reaching the front shielding part 111, the position of the stray light beam Lm+n is inverted to the area A. Thereby, the stray light beam Lm+n is shielded at the front shielding part 111. The focus of the signal light beam Lm is joined at a point between the front shielding part 111 and the rear shielding part 112. Thereby, the position of the signal light beam Lm is inverted to the area A. Accordingly, only the signal light beam Lm is transmitted through the front and rear shielding parts 111 and 112 and is detected at the optical detector 118.

Although the front shielding part 111 is positioned on the side of the area A in the foregoing description, the signal light beam Lm transmitted through the portion of the area A of the condenser lens 106 can be detected by the optical detector 108 by positioning the front shielding part 111 on the side of the area B and positioning the rear shielding part 112 on the side of the area A.

The foregoing optical detecting system according to an embodiment of the present invention may also be applied to an optical system for recording and reading out information from an optical disk such as a dual layer optical disk.

Here, the layer of the optical disk 20 (in this example, a dual layer optical disk) which is situated closer to the objective lens 104 is referred to as the first layer L0, and the layer of the dual optical disk which is situated farther from the objective lens 104 is referred to as the second layer L1. In a case where the beam spot is formed on the first recording layer L0, the beam reflected from the optical disk 15 includes the signal light beam Lm of the first recording layer L0 and the stray light beam Lm+1 of the second recording layer L1. Since the single light bundle Lm is condensed at a point between the front shielding part 111 and the rear shielding part 112, the signal light beam Lm can reach the optical detector 108. Meanwhile, since the stray light beam Lm+1 is shielded by the rear shielding part 112 and the front shielding part 111, the stray light beam Lm+1 cannot reach the optical detector 108. Thereby, satisfactory signals can be obtained.

In a case where the beam spot is formed on the second recording layer L1, the beam reflected from the optical disk 15 includes the signal light beam Lm of the second recording layer L1 and the stray light beam Lm−1 of the first recording layer L1. Since the single light bundle Lm is condensed at a point between the front shielding part 111 and the rear shielding part 112, the signal light beam Lm can reach the optical detector 108. Meanwhile, since the stray light beam Lm−1 is shielded by the front shielding part 111 and the rear shielding part 112, the stray light beam Lm−1 cannot reach the optical detector 108. Thereby, satisfactory signals can be obtained.

Accordingly, the foregoing configuration according to the foregoing embodiment of the present invention can be suitably applied to a dual layer optical disk for removing stray light (stray light components). It is however to be noted that the configuration according to the yet another embodiment of the present invention can be applied to other multilayered recording media. Furthermore, although the rear shielding part is described and illustrated in the drawings as a component that is separate from the optical detector, the rear shielding part and the optical detector may be formed as a united body. Furthermore, the same effects may be attained by making a portion of the optical detector on the shielding side into a state unable to detect the beam incident on said portion (for example, providing an optical detecting area only at the area opposite to the area in which the rear shielding part is situated).

FIG. 37 is a schematic drawing of another configuration according to yet another embodiment of the present invention for preventing loss in the quantity of light (light, quantity). In FIG. 37, reference numeral 113 indicates a beam splitting part for splitting a beam. FIG. 37 shows another example of the optical detecting system 200 for separating and detecting signal light and stray light.

In this example, the optical detecting system 200 has a beam splitting part 113 provided between the condenser lens 106 and the front shielding part 112 for splitting incident beam into two areas (area A, area B). The beam splitting part 113 in this example is a reflecting unit. In this example, as shown in FIG. 37, the area A is situated on the right side of the bent center axis C with respect to the upward reflected beam and is situated on the left side of the bent center axis C with respect to the downward reflected beam. This also applies to the indications in the below-described drawings FIGS. 38-47A. Furthermore, it is to be noted that the optical systems and components situated below the beam splitting part is indicated by adding to an apostrophe "'" to its reference numerals.

This configuration with respect to the upper half area of the center axis (area A) is substantially the same as the configuration shown in FIG. 37 except that the corresponding areas for the front shielding part 111 and the rear shielding part 112 have their positions switched.

As shown in FIG. 37, the beam transmitted through the portion of the area A of the condenser lens 6 is reflected to the optical detector 108 by the beam-splitting part 113. The front shielding part 111 is positioned between the focus point fm+1 and the focus point fm for shielding the area B. The rear shielding part 112 is positioned between the focus point fm and the focus point fm−1 for shielding the area A. Since the stray light beam Lm+n is condensed before reaching the front shielding part 111, the position of the stray light beam Lm+n is inverted to the area B. Thereby, the stray light beam Lm+n is shielded at the front shielding part 111. The stray light beam Lm−n is shielded at the rear shielding part 112. The focus of the signal light beam Lm is joined at a point between the front shielding part 111 and the rear shielding part 112. Thereby, the position of the signal light beam Lm is inverted to the area B. Accordingly, only the signal light beam Lm is transmitted through the front and rear shielding parts 111 and 112 and is detected at the optical detector 108.

The beam transmitted through the portion of the area B of the condenser lens 6 is reflected to the optical detector 108' by the beam splitting part 113. The front shielding part 111' is positioned between the focus point fm+1 and the focus point fm for shielding the area A. The rear shielding part 112' is positioned between the focus point fm and the focus point fm−1 for shielding the area B. Since the stray light beam Lm+n is condensed before reaching the front shielding part 111', the position of the stray light beam Lm+n is inverted to the area A. Thereby, the stray light beam Lm+n is shielded at the front shielding part 111'. The stray light beam Lm−n is shielded at the rear shielding part 112'. The focus of the signal light beam Lm is joined at a point between the front shielding part 111' and the rear shielding part 112'. Thereby, the position of the signal light beam Lm is inverted to the area A. Accordingly, only the signal light beam Lm is transmitted through the front and rear shielding parts 111' and 112' and is detected at the optical detector 108'.

Since the signal light beam Lm transmitted through the portion of the area A of the condenser lens 6 can be detected at the optical detector 108 and the signal light beam Lm transmitted through the portion of the area B of the condenser lens 6 can be detected at the optical detector 108', the signal light beam included in a beam can be sufficiently detected.

Although the beam splitting part 13 is illustrated as a right-angle prism having two outer faces in FIG. 37, the beam splitting part 13 may also be a combination of two flat reflecting mirrors in which the crossing angle of the two flat reflecting mirrors is not limited to a right angle. In other words, in the beam splitting part 13, other reflectors such as the combination of two flat reflecting mirrors may alternatively be employed as long as the crossing position of its two flat reflecting mirrors matches the center axis C and its components (e.g. shielding part) are positioned so that they do not contact or obstruct other components.

Figure 38:
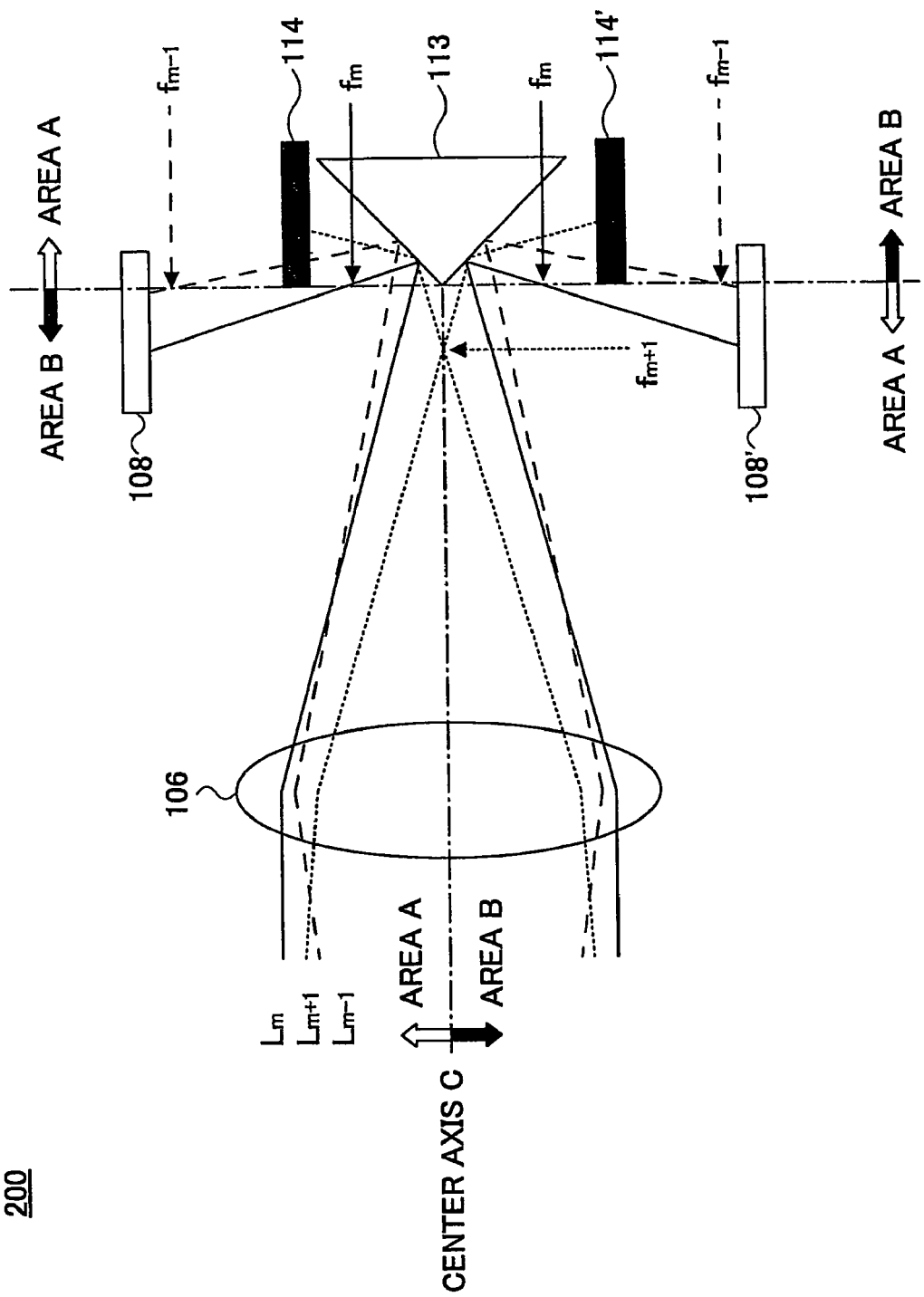
FIG. 38 is a schematic drawing for describing a modified example of an optical pickup apparatus according to yet another embodiment of the present invention.

FIG. 38 is a schematic drawing of another configuration according to yet another embodiment of the present invention. In FIG. 38, reference numeral 114 indicates a shielding part for shielding a beam. FIG. 38 shows another example of the optical detecting system 200 for separating and detecting signal light and stray light.

In this configuration, the position of the beam splitting part 113 is positioned farther from the condenser lens 106 so that the beam splitting part 113 is situated between the focus-point fm+1 and the focus point fm.

As a result, with respect to the beam reflected in the upward direction by the beam splitting part 113, the stray light beams of both Lm+1 and Lm−1 are situated in the area A. Meanwhile, the signal light beam Lm is situated in the area B after passing the focus point fm. Accordingly, a shielding part 114 is positioned at a position beyond the focus point fm with respect to the condenser lens 106 for shielding the area A. Thereby, only the signal light beam Lm is able to reach the optical detector 108.

This applies to the beam reflected in the downward direction, in which a shielding part 114' is positioned at a position beyond the focus point fm with respect to the condenser lens 106 for shielding the area B. Thereby, only the signal light beam Lm is able to reach the optical detector 108'.

Since the shielding parts 114, 114' provide the same functions as the rear shielding part 112, 112' shown in FIGS. 36 and 37, the shielding parts 114, 114' may be formed as a united body with the optical detecting parts 108, 108', respectively.

Figure 39:
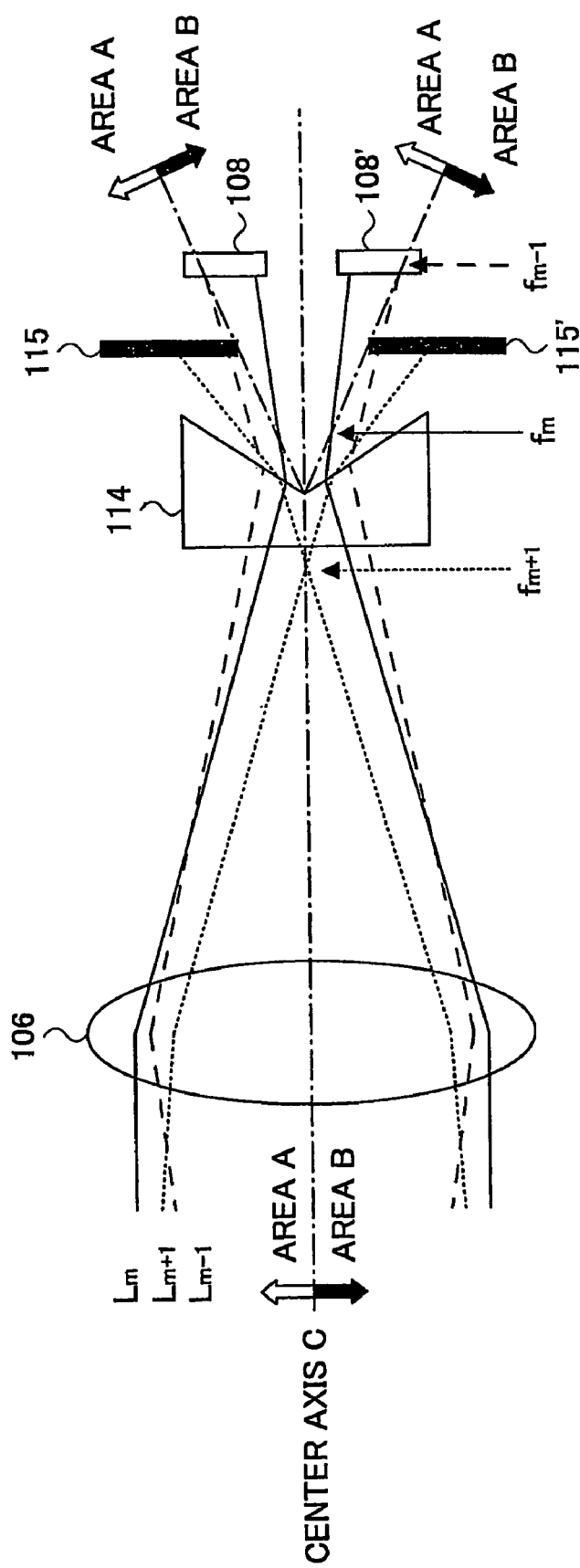
FIG. 39 is a schematic drawing for describing another modified example of an optical pickup apparatus according to yet another embodiment of the present invention.

FIG. 39 is a schematic drawing of another configuration according to yet another embodiment of the present invention. In FIG. 39, reference numeral 115 indicates another beam splitting part for splitting a beam. FIG. 39 shows another example of the optical detecting system 200 for separating and detecting signal light and stray light.

The beam splitting part 115 is positioned between the focus point fm+1 and the focus point fm for splitting the beam into two areas (area A, area B). As shown in FIG. 39, the beam splitting part 115 includes a pair of optical wedges in which the thinner sides of the optical wedges are matched so that the optical wedges are symmetric to each other with respect to center axis C (optical axis of the condenser lens 106).

In a case where the beam transmitted through the portion of the area A of the condenser lens 106 does not condense (converge) before reaching the beam splitting part 115, the beam is refracted and directed to the optical detector 108 by the beam splitting part 115. The shielding part 114 is positioned between the focus point fm and the focus point fm−1 for shielding the area A.

In a case where the beam transmitted through the portion of the area B of the condenser lens 106 does not condense (converge) before reaching the beam splitting part 115, the beam is refracted and directed to the optical detector 108' by the beam splitting part 115. The shielding part 114' is positioned between the focus point fm and the focus point fm−1 for shielding the area B.

Since the stray-light beam Lm+n transmitted through the portion of the area A of the condenser lens 106 is converged before reaching the beam splitting part 115, the position of the stray light beam Lm+n is inverted to the area B. Thereby, the stray light beam Lm+n is shielded at the shielding part 114'. The stray light beam Lm−n is shielded at the shielding part 114. The focus of the signal light beam Lm is joined at a point between the beam splitting part 115 and the shielding part 114. Thereby, the position of the signal light beam Lm is inverted to the area B. Accordingly, only the signal light beam LM is transmitted through the shielding part 114 and is detected at the optical detector 108.

Since the stray light beam Lm+n transmitted through the portion of the area B of the condenser lens 106 is converged before reaching the beam splitting part 115, the position of the stray light beam Lm+n is inverted to the area A. Thereby, the stray light beam Lm+n is shielded at the shielding part 114. The stray light beam Lm−n is shielded at the shielding part 114'. The focus of the signal light beam Lm is joined at a point between the beam splitting part 115 and the shielding part 114. Thereby, the position of the signal light beam Lm is inverted to the area A. Accordingly, only the signal light beam Lm is transmitted through the shielding part 114' and is detected at the optical detector 108'.

Since the signal light beam Lm transmitted through the portion of the area A of the condenser lens 106 can be detected at the optical detector 108 and the signal light beam Lm transmitted through the portion of the area B of the condenser lens 106 can be detected at the optical detector 108', the signal light beam included in a beam can be sufficiently detected. Furthermore, the configuration of the optical detecting system can be simplified since substantially all of the stray light beams Lm+n can be shielded by preparing the two of the same shielding parts 114, 114'.

Alternatively, the beam splitting part 115 may be situated closer to the condenser lens 106 than the focus point fm+1. In this case, the principle is substantially the same as the configuration shown in FIG. 37 in which the front and rear shielding parts are to be provided in correspondence with the respective split beam. In this case the rear shielding parts corresponding to the respective split beam may be formed as a united body since they are positioned close to each other.

Figure 40:
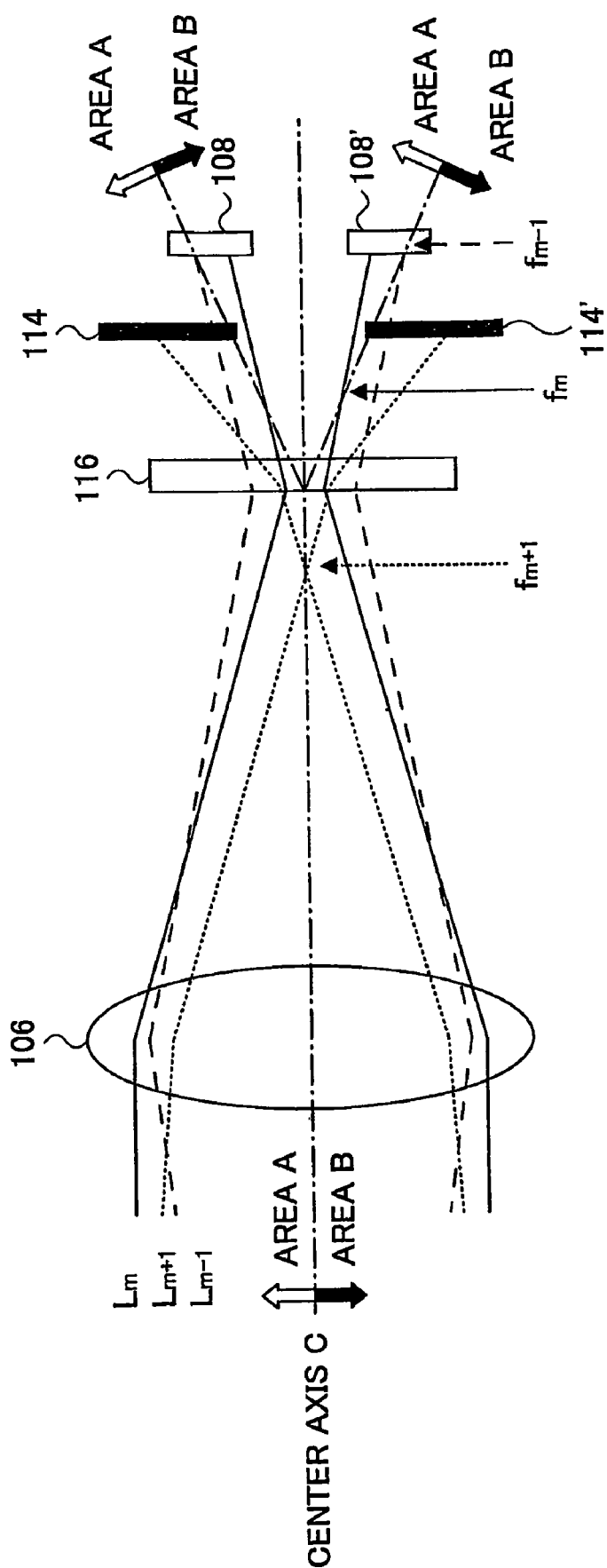
FIG. 40 is a schematic drawing for describing another modified example of an optical pickup apparatus according to yet another embodiment of the present invention.

FIG. 40 is a schematic drawing of another configuration according to yet another embodiment of the present invention. In FIG. 40, reference numeral 116 indicates a diffraction grating serving as a beam splitting part. FIG. 40 shows another example of the optical detecting system 200 for separating and detecting signal light and stray light.

The diffraction grating 116 used in this example is a blazed grating.

The blazed grating uses the Bragg diffraction conditions to enhance diffraction efficiency of a given order. Although the below-described grating is explained as blazed grating designed for a first order (−1 order, +1 order) diffraction, other order of diffraction may also be applied. Furthermore, it is preferred to employ a blazed grating that satisfies all Bragg conditions with respect to incident beam in a given cycle and not one of a tilted fixed cycle.

The diffraction grating 116 in this example provides different diffraction with respect to each area by generating a diffracted light exhibiting a strong +1 order diffraction with respect to the beam of the area A and generating a diffracted light exhibiting a strong −1 order diffraction with respect to the beam of the area B.

The beam splitting part (i.e. diffraction grating) 116 is positioned between the focus point fm+1 and the focus point fm for splitting the beam into two areas (area A, area B).

In a case where the beam transmitted through the portion of the area A of the condenser lens 106 does not condense (converge) before reaching the beam splitting part 116, the beam is diffracted and directed to the optical detector 108 by the beam splitting part 115. The shielding part 114 is positioned between the focus point fm and the focus point fm−1 for shielding the area A.

In a case where the beam transmitted through the portion of the area B of the condenser lens 106 does not condense (converge) before reaching the beam splitting part 116, the beam is diffracted and directed to the optical detector 108' by the beam splitting part 116. The shielding part 114' is positioned between the focus point fm and the focus point fm−1 for shielding the area B.

Since the stray light beam Lm+n transmitted through the portion of the area A of the condenser lens 106 is converged before reaching the beam splitting part 116, the position of the stray light beam Lm+n is inverted to the area B. Thereby, the stray light beam Lm+n is shielded at the shielding part 114'. The stray light beam Lm−n is shielded at the shielding part 114. The focus of the signal light beam Lm is joined at a point between the beam splitting part 116 and the shielding part 114. Thereby, the position of the signal light beam Lm is inverted to the area B. Accordingly, only the signal light beam Lm is transmitted through the shielding part 114 and is detected at the optical detector 108.

Since the stray light beam Lm+n transmitted through the portion of the area B of the condenser lens 106 is converged before reaching the beam splitting part 116, the position of the stray light beam Lm+n is inverted to the area A. Thereby, the stray light beam Lm+n is shielded at the shielding part 114. The stray light beam Lm−n is shielded at the shielding part 114'. The focus of the signal light beam Lm is joined at a point between the beam splitting part 116 and the shielding part 114. Thereby, the position of the signal light beam Lm is inverted to the area A. Accordingly, only the signal light beam Lm is transmitted through the shielding part 114' and is detected at the optical detector 108'.

Since the signal light beam Lm transmitted through the portion of the area A of the condenser lens 106 can be detected at the optical detector 108 and the signal light beam Lm transmitted through the portion of the area B of the condenser lens 106 can be detected at the optical detector 108', the signal light beam included in a beam can be sufficiently detected. Furthermore, the configuration of the optical detecting system can be simplified since substantially all of the stray light beams Lm+n can be shielded by preparing the two of the same shielding parts 114, 114'. Furthermore, the size of the configuration of the optical detecting system can be reduced since the blazed grating has a flat structure.

Alternatively, the beam splitting part 116 may be situated closer to the condenser lens 106 than the focus point fm+1. In this case, the principle is substantially the same as the configuration shown in FIG. 39 in which the front and rear shielding parts are to be provided in correspondence with the respective split beam.

Figure 41:
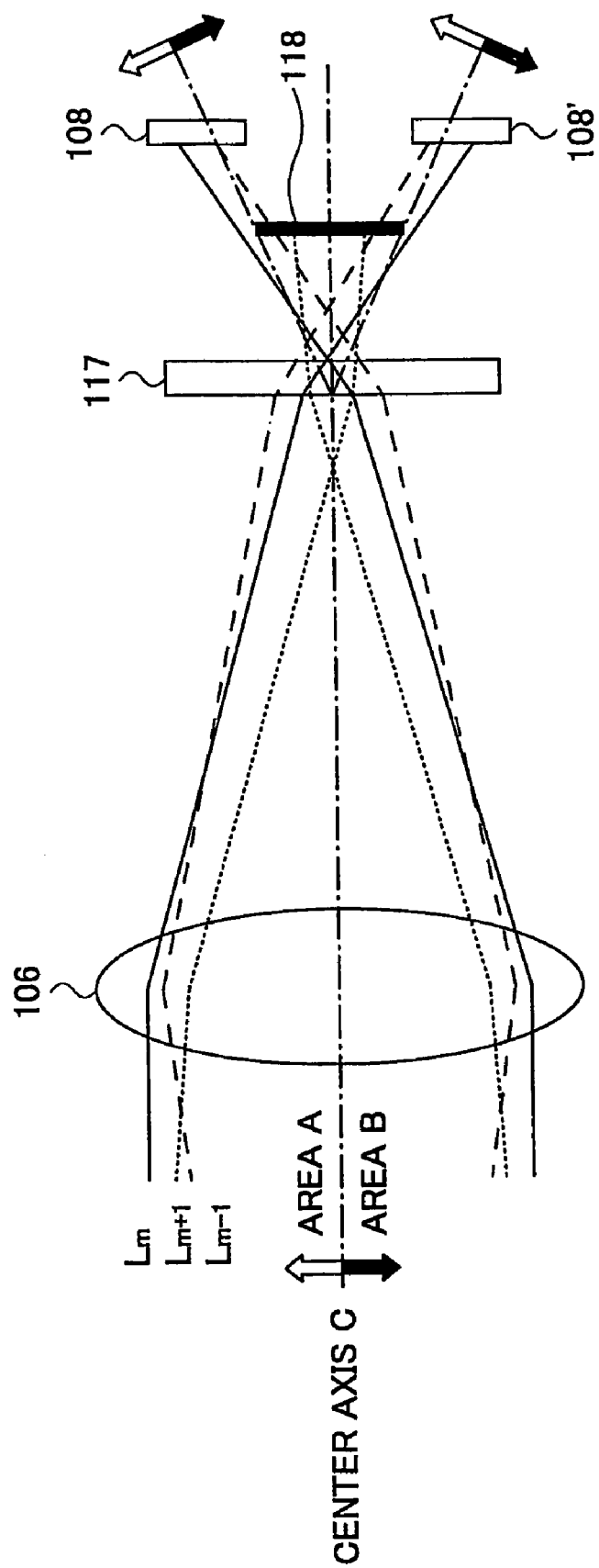
FIG. 41 is a schematic drawing for describing a further modified example of the optical pickup apparatus shown in FIG. 41 according to yet another embodiment of the present invention.

FIG. 41 is a modified example of the configuration shown in FIG. 40. In FIG. 41, reference numeral 117 indicates another diffraction grating, and reference numeral 118 indicates another shielding part. FIG. 41 shows another example of the optical detecting system 200 for separating and detecting signal light and stray light.

The diffraction grating 117 in this modified example provides different diffraction with respect to each area by generating a diffracted light exhibiting a strong −1 order diffraction with respect to the beam of the area A and generating a diffracted light exhibiting a strong +1 order diffraction with respect to the beam of the area B. Accordingly, each signal light beam diffracted at the diffraction grating (blazed grating) 117 once intersects before reaching the shielding part 118.

The beam splitting part (i.e. diffraction grating) 117 is positioned between the focus point fm+1 and the focus point fm for splitting the beam into two areas (area A, area B).

In a case where the beam transmitted through the portion of the area A of the condenser lens 106 does not condense (converge) before reaching the beam splitting part 117, the beam is diffracted and directed to the optical detector 108' by the beam splitting part 117. The shielding part 118 is positioned between the focus point fm and the focus point fm−1, in which a lower part 118a of the shielding part 118 shields the area A.

In a case where the beam transmitted through the portion of the area B of the condenser lens 106 does not condense (converge) before reaching the beam splitting part 117, the beam is diffracted and directed to the optical detector 108' by the beam splitting part 117. The shielding part 118 is positioned between the focus point fm and the focus point fm−1, in which an upper part 118b shields the area B.

Although the upper and lower parts 118a, 118b of the shielding part 118 may be provided as separate components, the upper and lower parts 118a, 118b are formed as a united body since they are situated close to each other.

Since the stray light beam Lm+n transmitted through the portion of the area A of the condenser lens 106 is converged before reaching the beam splitting part 117, the position of the stray light beam Lm+n is inverted to the area B. Thereby, the stray light beam Lm+n is shielded at the shielding part 118. The stray light beam Lm−n is shielded at the shielding part 118. The focus of the signal light beam Lm is joined at a-point between the beam splitting part 117 and the shielding part 118. Thereby, the position of the signal light beam Lm is inverted to the area B. Accordingly, only the signal light beam Lm is transmitted through the shielding part 118 and is detected at the optical detector 108'.

Since the stray light beam Lm+n transmitted through the portion of the area B of the condenser lens 106 is converged before reaching the beam splitting part 117, the position of the stray light beam Lm+n is inverted to the area A. Thereby, the stray light beam Lm+n is shielded at the shielding part 118. The stray light beam Lm−n is shielded at the shielding part 118. The focus of the signal light beam Lm is joined at a point between the beam splitting part 117 and the shielding part 118. Thereby, the position of the signal light beam Lm is inverted to the area A. Accordingly, only the signal light beam Lm is transmitted through the shielding part 118 and is detected at the optical detector 108.

Since the signal light beam Lm transmitted through the portion of the area A of the condenser lens 106 can be detected at the optical detector 108' and the signal light beam Lm transmitted through the portion of the area B of the condenser lens 106 can be detected at the optical detector 108, the signal light beam included in a beam can be sufficiently detected. Furthermore, the configuration of the optical detecting system can be simplified since substantially all of the stray light beams Lm+n can be shielded by preparing a single shielding part 118. Furthermore, the size of the configuration of the optical detecting system can be reduced since the blazed grating has a flat structure.

Alternatively, an optical path similar to the above-described configuration using the beam splitting part 118 may be obtained by using a configuration similar to the configuration using the beam splitting part 115 including a pair of optical wedges (see FIG. 39). In this case, however, the thicker sides of the optical wedges are matched so that the optical wedges are symmetric to each other with respect to center axis C (optical axis of the condenser lens 106). Accordingly, the refraction direction of the beam becomes opposite to that shown in FIG. 39, to thereby allow a single shielding part to be used.

Figure 42A:
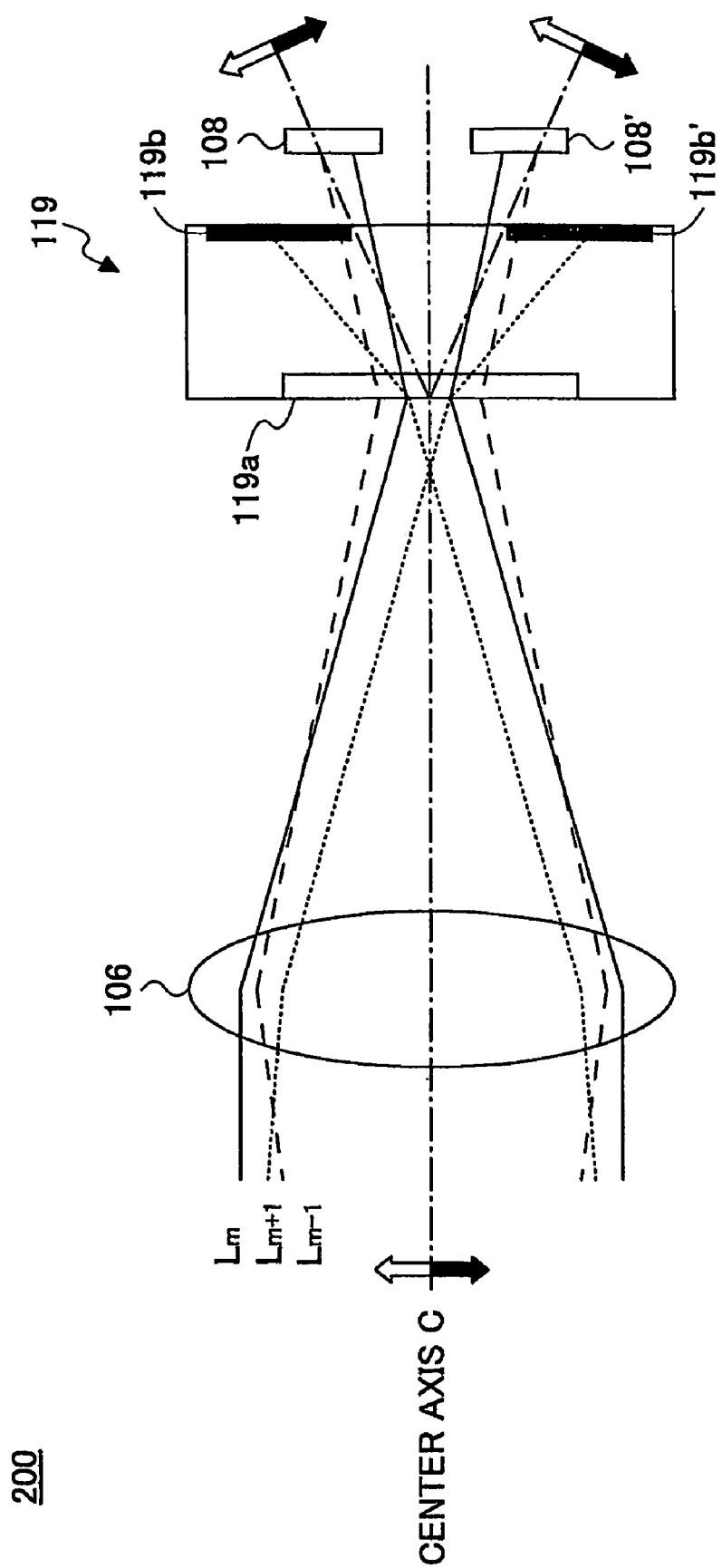
FIGS. 42A and 42B are schematic drawings for describing an example of forming the beam splitting part and the shielding part(s) shown in FIGS. 40 and 41 into a united body according to yet another embodiment of the present invention.
Figure 42B:
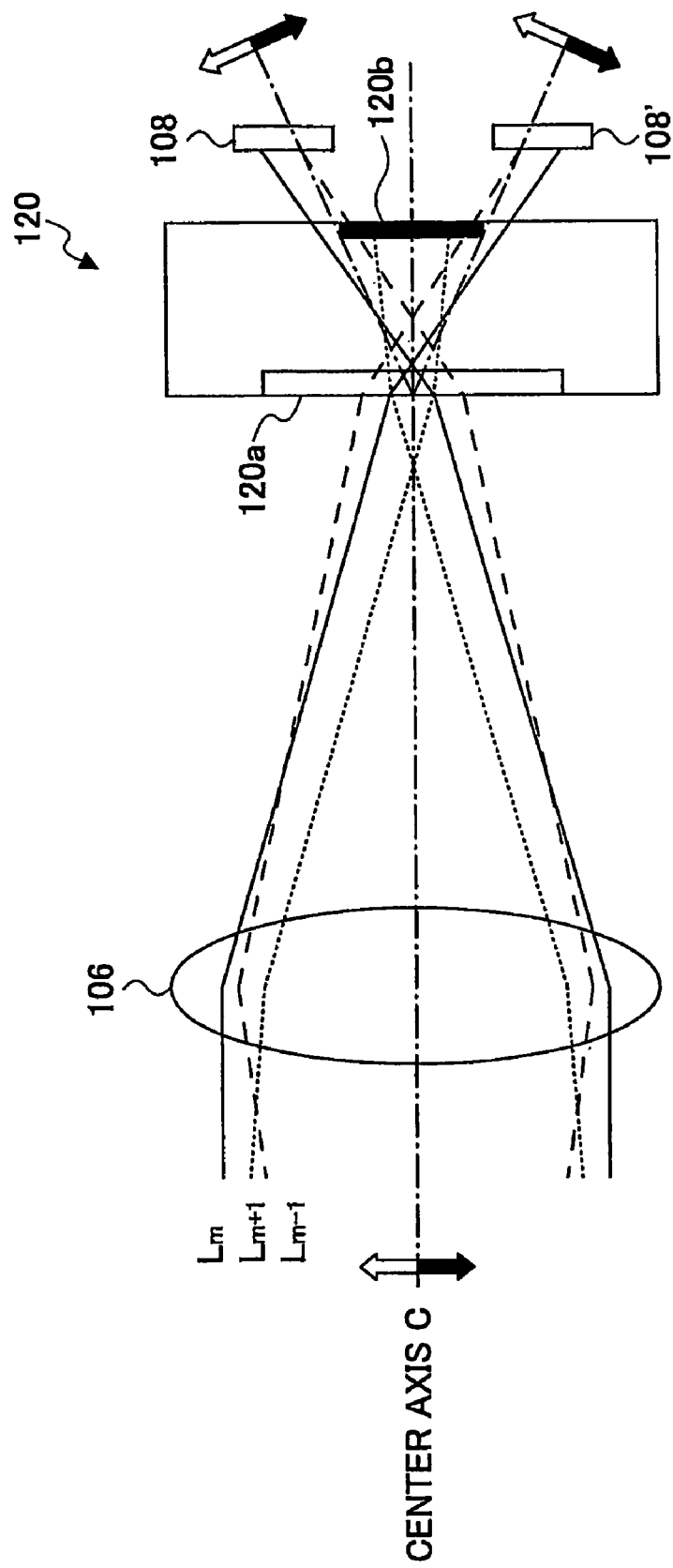

FIGS. 42A and 42B are schematic drawings of a configuration where a beam splitting part and a shielding part is formed as a united body. FIG. 42A corresponds to FIG. 40, and FIG. 42B corresponds to FIG. 41. In FIGS. 42A and 42B, reference numerals 119 and 120 indicate a beam splitting unit. FIGS. 42A and 42B show another example of the optical detecting system 200 for separating and detecting signal light and stray light.

In this example, by employing a diffraction grating 19a, 20a as a beam splitting part, the diffraction grating 19a, 20a and the shielding parts 19b, 19b', 20 can be mounted to form a united body. Thereby, the beam splitting unit 119, 120 can be provided as a single component.

Figure 43:
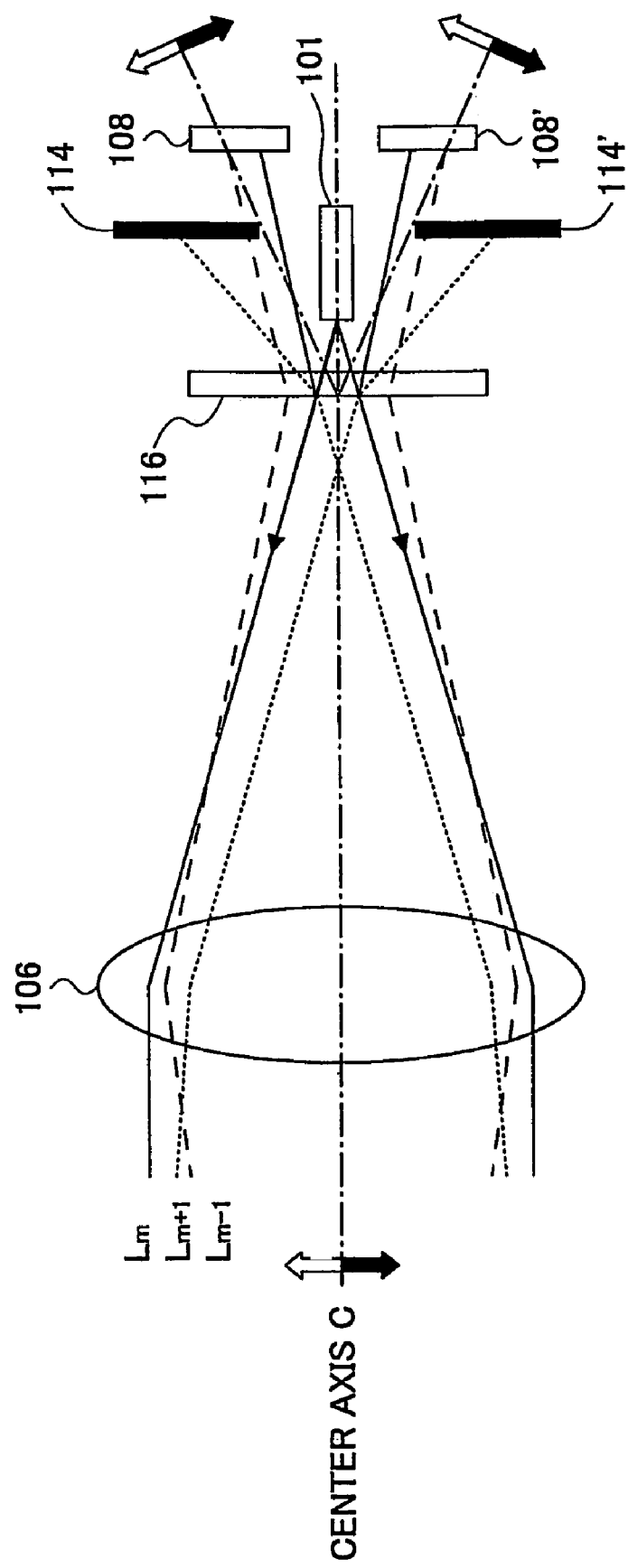
FIG. 43 is a schematic drawing for describing another modified example of an optical pickup apparatus according to yet another embodiment of the present invention.

FIG. 43 shows another example of the optical detecting system 200 for separating and detecting signal light and stray light.

In this example, the configuration shown in FIG. 40 is used. As shown in FIG. 43, a light source 101 is positioned between the shielding parts 114, 114'. Furthermore, a beam splitting part 116 used in this example is a blazed type polarization grating. The beam splitting part 116 allows a bundle of light emitted from the light source 101 in the polarizing direction to transmit therethrough without diffraction and diffracts a bundle of light emitted from the light source 101 in a direction perpendicularly intersecting with the polarization direction.

The beam emitted from the light source 101 is directed to the condenser lens 106 without being affected by the grating 116. Next, the operation after the beam is transmitted through the condenser lens 106 is described below (although not shown in the drawings). First, the beam, which is changed into parallel rays by the condenser lens 106, is circularly polarized by $\lambda/4$ wave plate and is condensed to an objective lens 104, to thereby be irradiated onto the optical disk 15. The signal light beam reflected from the optical disk 15 becomes parallel rays at the objective lens. By passing through the $\lambda/4$ wave plate, the parallel rays become linear polarized light that perpendicularly intersect with the polarization direction of the beam irradiated from the light source 101. The linear polarized rays are transmitted through the condenser lens 106, to thereby be split and diffracted by the diffraction grating of the beam splitting part 116. Accordingly, the diffracted rays are detected by the optical detectors 108, 108'.

As described above, the stray light beam reflected from the optical disk 15 can be shielded by the shielding parts 114 so that only the signal light beam can be detected at the optical detector 108, 108'.

The light source 101, the beam splitting part (diffraction grating) 116, the shielding part 114, and the optical detectors 108, 108' may be formed as a united body. Thereby, a small-sized optical pickup apparatus can be obtained.

Figure 44:
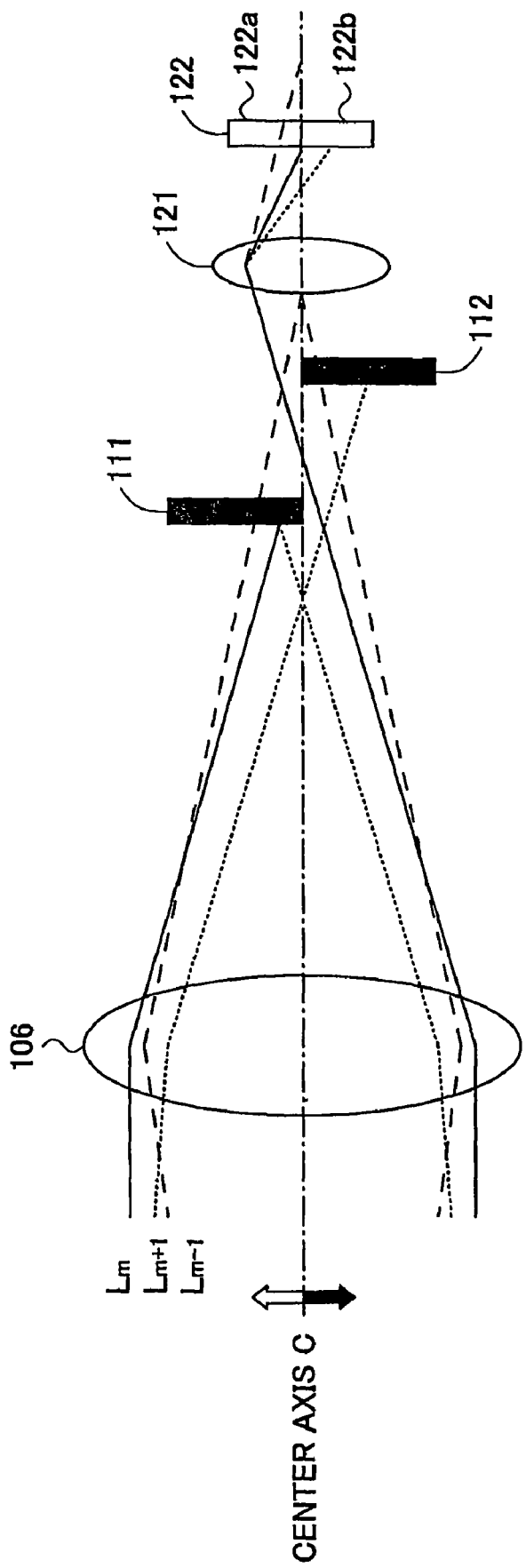
FIG. 44 is a schematic drawing for describing another modified example of an optical pickup apparatus according to yet another embodiment of the present invention.

FIG. 44 shows another example of the optical detecting system 200 for separating and detecting signal light and stray light.

In FIG. 44, reference numeral 121 indicates a second condenser lens, reference numeral 122 indicates a divided optical detector, reference letter S indicates an output signal received from the optical detector. FIG. 44 shows another example of the optical detecting system 200 for separating and detecting signal light and stray light and also for obtaining focus error signals.

In this example, the second condenser lens 121 is positioned between the rear shielding part 112 and the divided optical detector. The signal light beam Lm is detected at the divided optical detector 122 situated at the focus point of the signal light beam Lm.

Next, a method (principle) for obtaining focus error signal according to an embodiment of the present invention is described.

In a case where the beam transmitted through the objective lens 104 is condensed onto the optical disk 15, the signal light beam Lm reflected from the optical disk 15 is condensed to an area between an optical detector part 122a and an optical detector part 122b of the divided optical detector 122. The difference (Sa−Sb) between the output of the optical detector part 122a (Sa) and the output of the optical detector part 122b (Sb) becomes 0. Meanwhile, in a case where the objective lens 104 is positioned farther from the optical disk 15, the beam condensed at the second condenser lens 121 converges before reaching the divided optical detector 122 such that hemispherical beams become incident on the optical detector part 122*b* (illustrated with a dotted line on the right side of the second condenser lens 121 in FIG. 44). That is, the difference of output becomes less than 0 (Sa−Sb<0). On the other hand, in a case where the objective lens 104 is positioned closer to the optical disk 15, the beam condensed at the second condenser lens 121 converges after (beyond) the divided optical detector 122 such that hemispherical beams (prior to becoming condensed) become incident on the optical detector part 122*a* (illustrated with a broken line on the right side of the second condenser lens 121 in FIG. 44). That is, the difference of output becomes greater than 0 (Sa−Sb>0). Accordingly, by calculating the difference of output (Sa−Sb), signals indicating the focus of the objective lens 104 with respect to the optical disk 15 (focus error signals) can be obtained. In this case, the signal light beam can be obtained by Sa+Sb. The configuration of detecting focus error signal may be applied not only to the configuration shown in FIG. 36, but also to the configurations shown in FIGS. 37 to 42.

In this example, since the second condenser lens 121 is positioned between the rear shielding part 112 and the dividing optical detecting part 122, the rear shielding part 112 and the dividing optical detecting part 122 cannot be formed into a united body. It is, however, possible to form the second condenser lens 121 and the rear shielding part 112 as a united body. In the incident side of the second condenser lens 121, the second condenser lens 121 may have a lens function at least on one side with respect to the optical axis. The second condenser lens may be formed in various shapes as long as the beam do not transmit to the other side with respect to the optical axis.

Figure 45A:
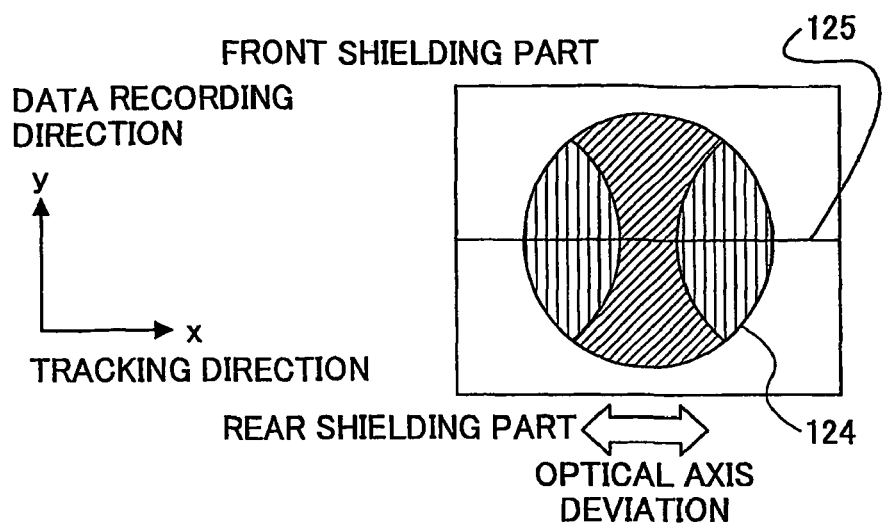
FIGS. 45A, 45B and 45C are schematic drawings for describing the positional relationships of the beam, the shielding part(s), and the beam splitting part according to yet another embodiment of the present invention.
Figure 45B:
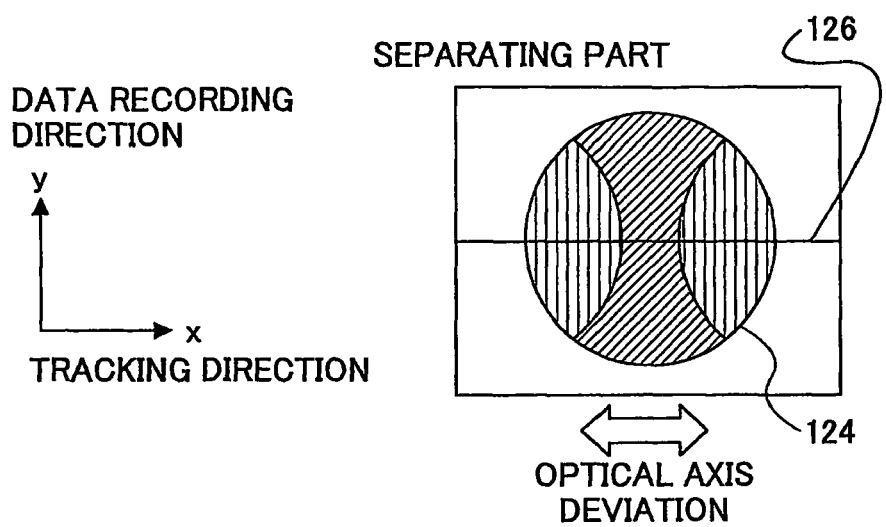
Figure 45C:
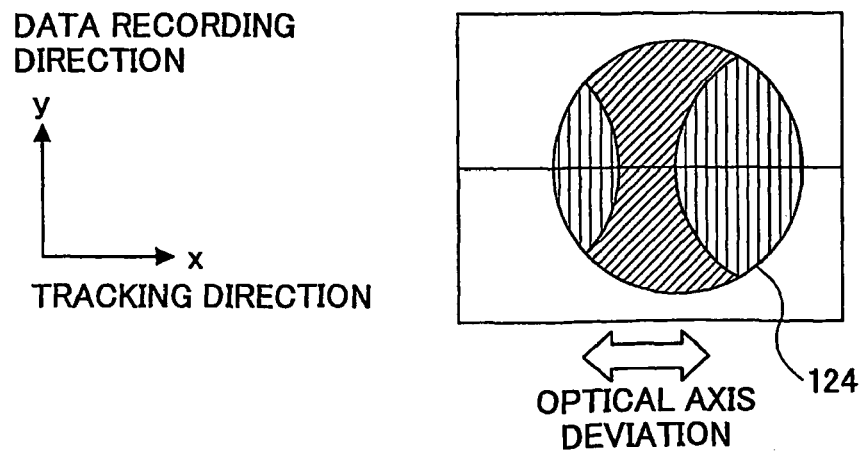

FIG. 45A-45C are schematic drawings for describing the positional relationships of the beam, the shielding part(s), and the beam splitting part according to an embodiment of the present invention. FIG. 45A shows the relationship between the front and rear shielding parts and the beam, FIG. 45B shows the relationships between the beam splitting part and the beam, and FIG. 45C shows a case where the optical axis deviates in the tracking direction with respect to FIGS. 45A and 45B.

In FIGS. 45A-45C, reference numeral 124 indicates a beam spot, reference numeral 125 indicates a dividing line, and reference numeral 126 indicates a beam splitting line.

FIGS. 45A-45C serve to describe another example of the optical detecting system 200 for separating and detecting signal light and stray light in which the absolute quantity of the signal light beam do not change even in case where the optical axis of the objective lens shifts in the tracking direction.

The beam reflected from the optical disk 15 is diffracted at the grooves of the optical disk 15, to thereby form a pattern similar to a shape of a baseball (track pattern) as shown in FIG. 45B. Among the areas delineated by curved lines in FIG. 45*b*, the center area is a pattern obtained from the light reflected from a track area of the optical disk 15, and the side areas are patterns obtained from light diffracted by the step (land) area provided on both sides of the track area. Typically, the side areas have a greater quantity of light than the center area. The following is described on the premise that the side areas have a greater quantity of light than the center area.

In this example, the dividing line 125 for dividing the beam for the front and rear shielding parts 111, 112 (see FIG. 45A) and the splitting line 126 for splitting the beam of the beam splitting part (See FIG. 45B) are oriented in the tracking direction of the signal light beam. As shown in FIG. 45C, in a case where the optical axis deviates in the tracking direction, the beam moves toward the direction of the dividing line 125 or the splitting line 126 with respect to the optical system. Accordingly, even in a case where the objective lens 104 shifts in the tracking direction and the optical axis occurs for the signal light beam, the distribution of the beam above and below the dividing line 125 and the splitting line 126 do not change. Therefore, signals can be satisfactorily detected without any change in the quantity of light of the signal light beams reaching the optical detector 122.

FIGS. 46A and 46B are drawings for describing an operation of obtaining track error signals. FIG. 46A is a ray diagram and FIG. 46B is a plan view of an optical detector according to an embodiment of the present invention. FIGS. 46A-46B serve to describe another example of the optical detecting system 200 for separating and detecting signal light and stray light and also obtaining track error signals.

In this example, another divided optical detector 122 (122*c*, 122*d*) detects signal light beam Lm. The divided optical detector 122 is divided into at least two areas along a data recording direction (Y direction) by the dividing line 125 or a line perpendicularly intersecting with the splitting line 126.

Next, a method (principle) for obtaining track error signal according to an embodiment of the present invention is described.

The signal light beam transmitted through the shielding part(s) becomes a hemispherical divergent beam and is detected at the divided optical detector 122.

In a case where a beam spot is formed on a center of a groove of the optical disk 15, the track pattern becomes symmetric at its left and right sides. Accordingly, the difference (Sc−Sd) between the output of the optical detector part 122*c* (Sc) and the output of the optical detector part 122*d* (Sd) is 0. In a case where the beam spot deviates from the center of the groove, the track patterns becomes non-symmetric at its left and right sides as shown in FIG. 45C. Accordingly, the difference Sc−Sd becomes greater than 0 (Sc−Sd>0) or less than 0 (Sc−Sd<0). Accordingly, by calculating the difference of output (Sc−Sd), signals indicating the position of the beam spot tracked on the optical disk 15 (track error signals) can be obtained. In this case, the signal light beam can be obtained by Sc+Sd.

Figure 47A:
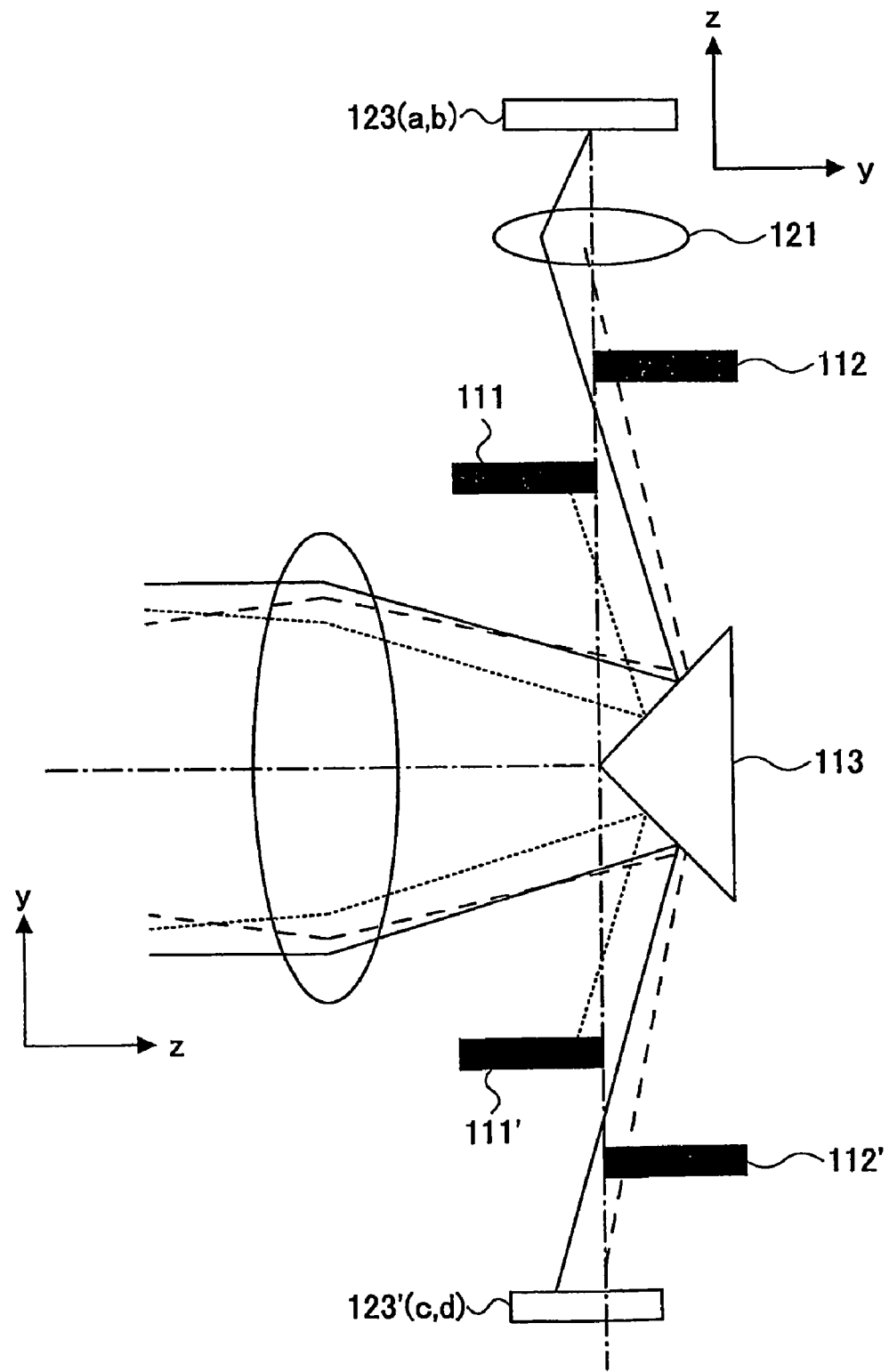
FIGS. 47A and 47B are schematic drawings showing an exemplary configuration for obtaining both focus error signals and track error signals according to yet another embodiment of the present invention.
Figure 47B:
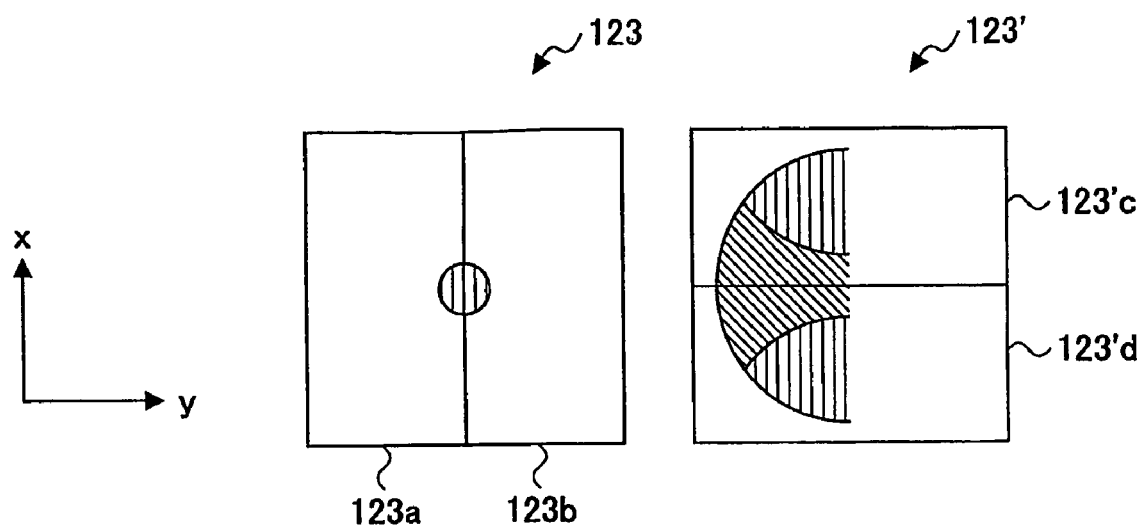

FIGS. 47A and 47B are schematic drawings for describing an operation of obtaining both the focus error signals and the track error signals. FIGS. 47A-47B serve to describe another example of the optical detecting system 200 for separating and detecting signal light and stray light and also obtaining focus error signals and track error signals.

In this example, the beam splitting part 113 is positioned between the condenser lens 106 and the front shielding part 111 for dividing the beam into two areas (area A and area B). This portion is the substantially the same as the configuration shown in FIG. 37. The condenser lens 106 is positioned between the rear shielding part 112 and the optical detector for receiving the signal light beam transmitted through the portion of the area A of the condenser lens 106. Thereby, at the focus point of the signal light beam Lm, the signal light beam Lm is detected at the divided optical detector 123 (123*a*, 123*b*). Furthermore, the signal light beam Lm transmitted through the portion of the area B of the condenser lens 106 is detected at the divided optical detector 123' (123' c, 123' d) which is divided into at least two parts along the data recording direction (Y direction in FIG. 47B).

Accordingly, respective signals can be obtained without stray light beams, in which the focus error signals are obtained by Sa−Sb, the track error signals are obtained by Sc−Sd, and the reproduction signals area obtained by Sa+Sb+ Sc+Sd.

Figure 53A:
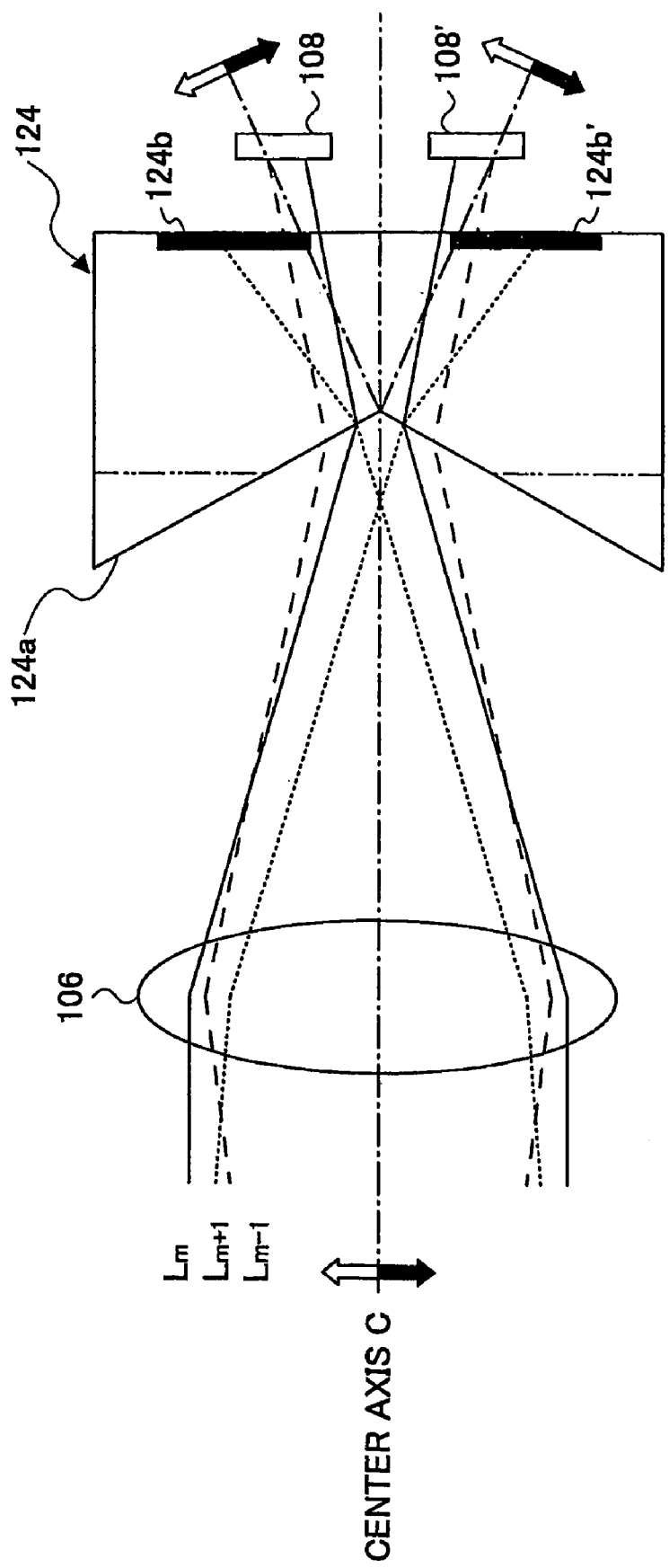
FIGS. 53A and 53B shows modified examples of the configuration shown in FIG. 39 where the beam splitting part and the shielding part are formed as a united body.
Figure 53B:
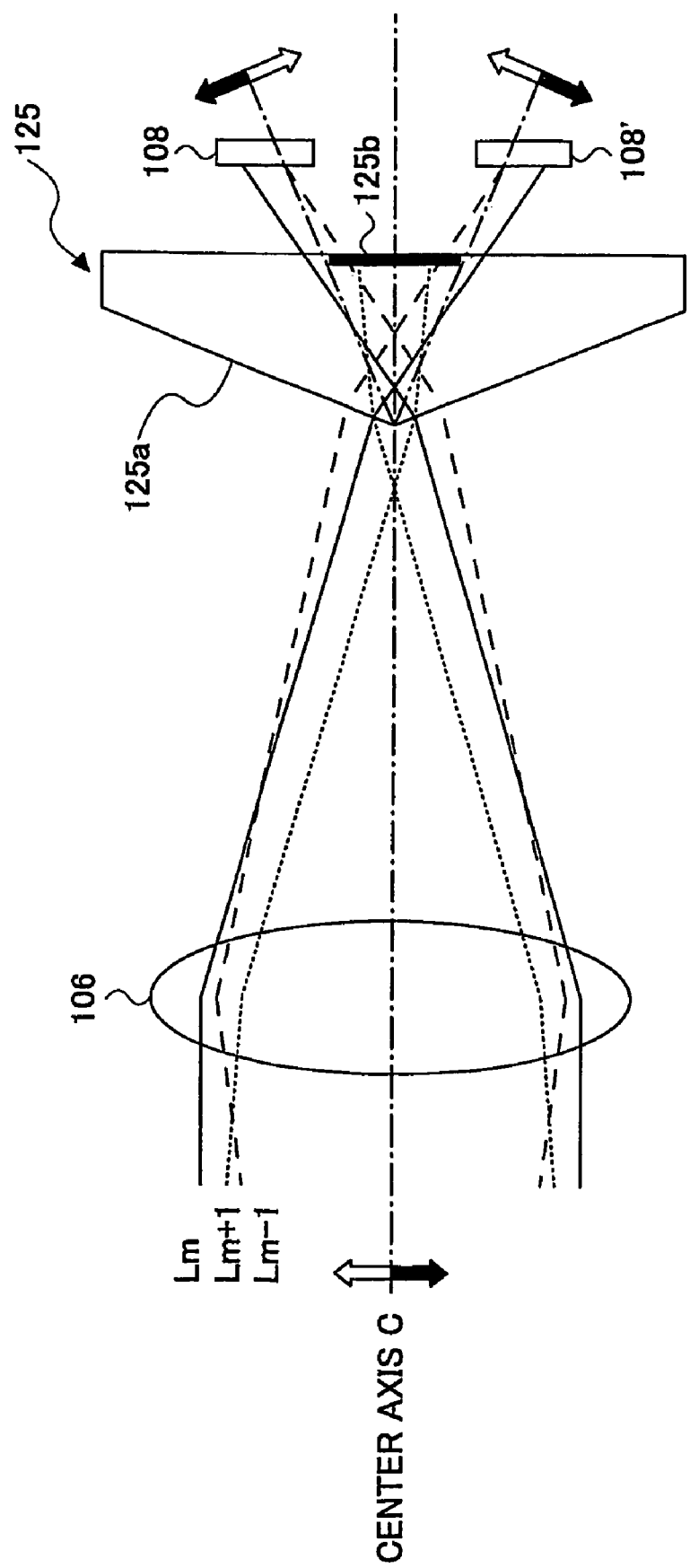

As another example, FIGS. 53A and 53B shows modified examples of the configuration shown in FIG. 39, in which the beam splitting part and the shielding part are formed as a united body.

In FIGS. 53A and 53B, reference numerals 124 and 125 indicate a beam splitting unit including a prism (124a, 125a) and a shielding part (124b, 125b). Since the operation of the configuration shown in FIGS. 53A and 53B is substantially the same as that shown in FIGS. 42A and 42B, further explanation thereof is omitted. In the configuration shown in FIG. 53A, although the thickness of the prism 124a of the beam splitting unit 124 may be large, a portion of the effective beam may be cut off (for example, see dash-dot line in FIG. 53A). Furthermore, it is to be noted that, although the beam may be refracted even after transmitting through the beam splitting unit, the refracted beam are omitted in the drawings.

FIG. 48 is a schematic drawing showing an overall configuration of an optical pickup apparatus according to yet another embodiment of the present invention. In FIG. 48, reference numeral 101 indicates a light source, reference numeral 102 indicates a coupling lens, reference numeral 103 indicates a detector and separating part, reference numeral 104 indicates an objective lens, reference numeral 105 indicates an optical disk, reference numeral 106 indicates a detecting lens, reference numeral 107 indicates a diffraction grating, and reference numeral 108 indicates an optical detector.

With reference to FIG. 48, the optical pickup according to an embodiment of the present invention includes, for example: a light source 101 for irradiating light for reading out and recording information from and to the optical disk 105; a coupling lens 102 for making the divergent beam from the light source 101 into substantially parallel beam; a detector and separating part 103 for separating the beam irradiated from the light source 101 to the optical disk 105 and the beam reflected from the optical disk 105; an objective lens 104 for condensing incident beam to/from the optical disk 105; a detecting lens 106 for condensing the beam reflected from a signal layer (recording layer) to an optical detector(s) 108; a diffraction grating 107 for generating focus error signals and tracking error signals for maintaining a predetermined position in the tracking direction; and the optical detector(s) 108 for obtaining signal information from the optical disk 105. The objective lens 104 in this example is driven in the optical axis direction by an actuator for focus a light beam to a spot on a signal information surface (recording surface) of the optical disk 105.

The beam irradiated from the light source 101 is made into substantially parallel rays at the coupling lens 103 and is transmitted through the detector and separating part 103, to thereby form a fine beam spot on the information recording surface (recording surface) of the optical disk 105. The beam reflected from the optical disk 105 is again made into substantially parallel rays by the objective lens 104, then is then reflected by the detector and separating part 103, then is condensed at the condenser lens 106, and then is diffracted by the diffraction grating 107, to thereby be detected by an optical detecting surface of the optical detector(s) 108.

In the foregoing example, the optical path (optical system) in which the beam are irradiated from the light source 101 to the optical disk 105 may be referred to as an irradiation path (optical irradiation system) or an advancing path. Meanwhile, the optical path (optical system) in which the beam are reflected from the optical disk 105 may be referred to as a detection path (optical detecting system) or a returning path.

Figure 49:
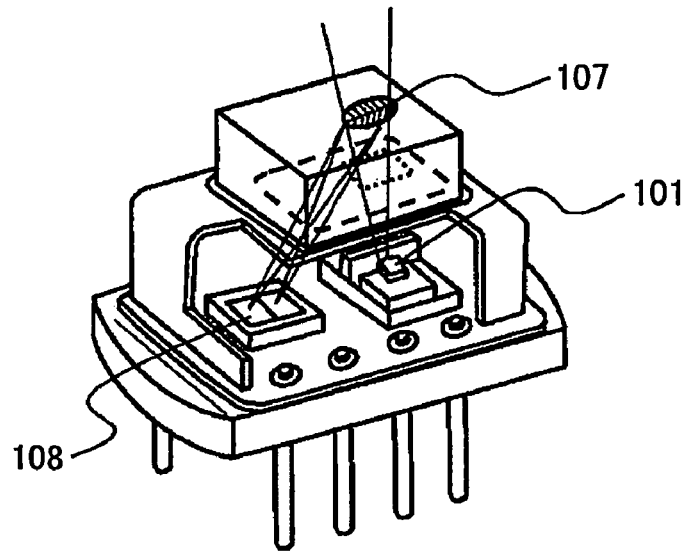
FIG. 49 is a schematic drawing for describing an example of an optical unit according to yet another embodiment of the present invention.
Figure 50:
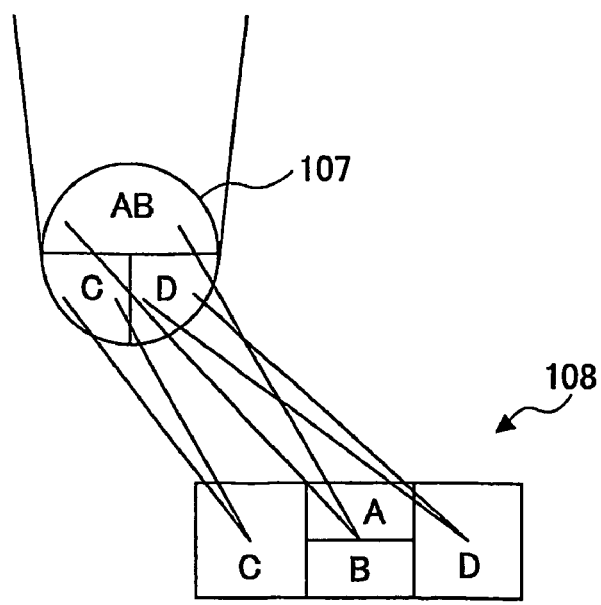
FIG. 50 is a schematic drawing for describing an example of a diffraction grating according to yet another embodiment of the present invention.
Figure 52:
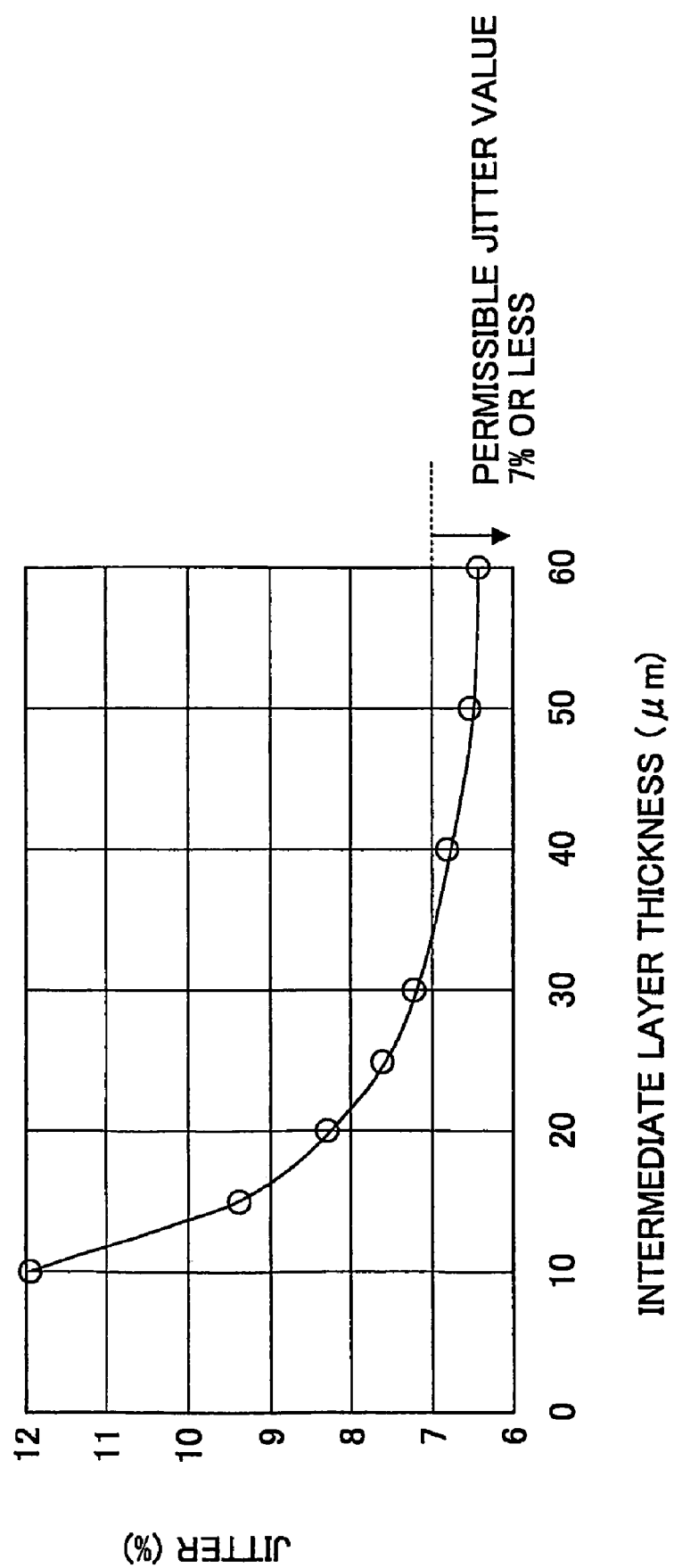
FIG. 52 is a graph showing the results of observing the degradation of jitter of signals reproduced from a first layer L' 0 in a case of reducing the thickness of an intermediate layer of a dual layer DVD disk.

An embodiment of an optical unit including, for example, the light source 101, the diffraction grating 107, and the optical detector is shown in FIG. 49. In this example, the divergent light irradiated from the light source 101 transmits through the diffraction grating 107, advances to a coupling lens (not shown) provided in the optical pickup, and to an optical disk (not shown). The beam reflected from the optical disk transmits again through the coupling lens and is incident on the diffraction grating 107 in the form of converged light. The diffraction grating 107 is divided (separated) into plural areas with respect to the incident beam. The beam, which is divided (separated) in correspondence with the divided areas, is received by the optical detector (divided optical detector) 108. In one example, as shown in FIG. 50, the diffraction grating 107 is divided into three parts. By detecting the light diffracted at the area AB (by using knife edge diffraction), focus error signals are obtained, and by receiving the light at respective areas C and D, tracking error signals are obtained.

Further, the present invention is not limited to these embodiments, but variations and modifications may be made without departing from the scope of the present invention.

The present application is based on Japanese Priority Application Nos. 2005-056976, 2005-070366, 2005-074031; 2005-103441, 2005-135509, and 2005-248548 filed on Mar. 2, 2005, Mar. 14, 2005, Mar. 15, 2005, Mar. 31, 2005, May 9, 2005, and Aug. 30, 2005, respectively, with the Japanese Patent Office, the entire contents of which are hereby incorporated by reference.

The invention claimed is:

1. An optical system for extracting signal light components from a beam including the signal light components and stray light components, the optical system comprising:
   a condensing optical element situated on an optical path of the beam for condensing the beam;
   a polarization changing unit including a combination of a polarization changing element and a reflecting part for changing the state of polarization of at least one of the signal light components and the stray light components included in the incident beam transmitted through the condensing optical element; and
   an extracting element for extracting the signal light components included in the beam transmitted through the polarization changing unit.

2. The optical system as claimed in claim 1,
   wherein the polarization changing element includes first and second areas that are divided by a line perpendicularly intersecting with the optical axis of the condensing optical element;
   wherein the polarization changing element is positioned between a first focus point and a second focus point that is situated closer to the condensing optical element than the first focus point;
   wherein the first focus point is a position at which the signal light components are condensed, and the second focus point is a position at which the stray light components are condensed;
   wherein the reflecting part is positioned at the first focus point.

3. The optical system as claimed in claim 2,
   wherein the polarization changing element has an optical characteristic of changing the polarization of the beam incident on at least one of the first area and the second area of the polarization changing element;
   wherein the reflecting part has an optical characteristic of reflecting the beam from the first area of the polarization changing element to the second area of the polarization changing element.

4. The optical system as claimed in claim 2, wherein the polarization changing element provides a phase change of +½ wavelength to the incident beam at the first area of the polarization changing element and provides no phase difference to the incident beam at the second area of the polarization changing element.

5. The optical system as claimed in claim 2, wherein the polarization changing element and the reflecting part are formed as a united body via a transparent member having a refractive index greater than 1.

6. The optical system as claimed in claim 2, further comprising a transparent member positioned between the first focus point and the second focus point, wherein the transparent member has a refractive index greater than 1.

7. An optical pickup apparatus comprising:
a light source for irradiating a beam;
an optical system including
an objective lens for condensing the beam to a target recording layer of an optical disk having a plurality of recording layers;
the optical system as claimed in claim 1; and
an optical detecting system for generating signals in accordance with the amount of light of the extracted signal light components.

8. The optical pickup apparatus as claimed in claim 7, wherein the extracting element is a beam splitter situated on an optical path between the light source and the objective lens, wherein the condensing optical element is a coupling lens situated on an optical path between the beam splitter and the objective lens.

9. The optical pickup apparatus as claimed in claim 7, wherein the dividing line for the polarization changing element extends in a direction corresponding to the tracking direction.

10. An optical disk apparatus comprising:
the optical pickup apparatus as claimed in claim 7; and
a processing apparatus for reading out information recorded in the optical disk in accordance with the signals generated by the optical detecting system.

* * * * *

UNITED STATES PATENT AND TRADEMARK OFFICE
CERTIFICATE OF CORRECTION

PATENT NO. : 7,660,226 B2  Page 1 of 1
APPLICATION NO. : 10/593409
DATED : February 9, 2010
INVENTOR(S) : Tetsuya Ogata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Twenty-eighth Day of December, 2010

David J. Kappos
*Director of the United States Patent and Trademark Office*